US012618162B2

(12) United States Patent
Novek

(10) Patent No.: US 12,618,162 B2
(45) Date of Patent: May 5, 2026

(54) ALKALI HYDROXIDE PRODUCTION FROM ALKALI SULFATE WITH HALOGEN OR CARBOXYLIC ACID INTERMEDIATES

(71) Applicant: INNOVATOR ENERGY LLC, Houston, TX (US)

(72) Inventor: Ethan Novek, Houston, TX (US)

(73) Assignee: INNOVATOR ENERGY LLC, Houston, TX (US)

( * ) Notice: Subject to any disclaimer, the term of this patent is extended or adjusted under 35 U.S.C. 154(b) by 0 days.

(21) Appl. No.: 19/284,273

(22) Filed: Jul. 29, 2025

(65) Prior Publication Data

US 2025/0354274 A1      Nov. 20, 2025

Related U.S. Application Data

(62) Division of application No. 19/035,434, filed on Jan. 23, 2025, now Pat. No. 12,416,086.

(60) Provisional application No. 63/661,367, filed on Jun. 18, 2024, provisional application No. 63/658,580, filed on Jun. 11, 2024, provisional application No.
(Continued)

(51) Int. Cl.
| | |
|---|---|
| *C07C 51/02* | (2006.01) |
| *B01D 61/42* | (2006.01) |
| *B01D 61/44* | (2006.01) |
| *C01C 1/02* | (2006.01) |
| *C01F 11/46* | (2006.01) |
(Continued)

(52) U.S. Cl.
CPC .............. *C25B 1/16* (2013.01); *B01D 61/422* (2013.01); *B01D 61/445* (2013.01); *C01C 1/028* (2013.01); *C01F 11/46* (2013.01); *C25B 3/07* (2021.01)

(58) Field of Classification Search
None
See application file for complete search history.

(56) References Cited

U.S. PATENT DOCUMENTS

2023/0382841 A1    11/2023  Novek

FOREIGN PATENT DOCUMENTS

| | | |
|---|---|---|
| JP | 9-67296 A | 3/1997 |
| WO | 2023/026261 A1 | 3/2023 |
(Continued)

OTHER PUBLICATIONS

Notification of Transmittal of the International Search Report and the Written Opinion of the International Searching Authority issued in PCT/US2025/012754, mailed Mar. 25, 2025, 13 pages.

*Primary Examiner* — Yun Qian
(74) *Attorney, Agent, or Firm* — HUNTON ANDREWS KURTH LLP

(57) ABSTRACT

The application pertains to processes for producing components such as an alkali hydroxide and a carboxylic acid. The processes generally comprise reacting a component comprising calcium carbonate, or calcium sulfide, or calcium hydroxide, or calcium oxide, or calcium weak acid, or any combination thereof with a component comprising a carboxylic acid to form a component comprising a calcium carboxylate and a component comprising carbon dioxide, or hydrogen sulfide, or water, or any combination thereof. At least a portion of the formed calcium carboxylate is reacted with a component comprising an alkali sulfate to form a component comprising an alkali carboxylate and a component comprising calcium sulfate. At least a portion of the formed alkali carboxylate is electrochemically reacted to form a component comprising an alkali hydroxide and a component comprising a carboxylic acid.

5 Claims, 6 Drawing Sheets

Related U.S. Application Data

63/654,185, filed on May 31, 2024, provisional application No. 63/623,954, filed on Jan. 23, 2024.

(51) Int. Cl.
*C25B 1/16* (2006.01)
*C25B 3/07* (2021.01)

(56) References Cited

FOREIGN PATENT DOCUMENTS

| WO | 2023/225089 A1 | 11/2023 |
| WO | 2023/043157 A1 | 2/2025 |

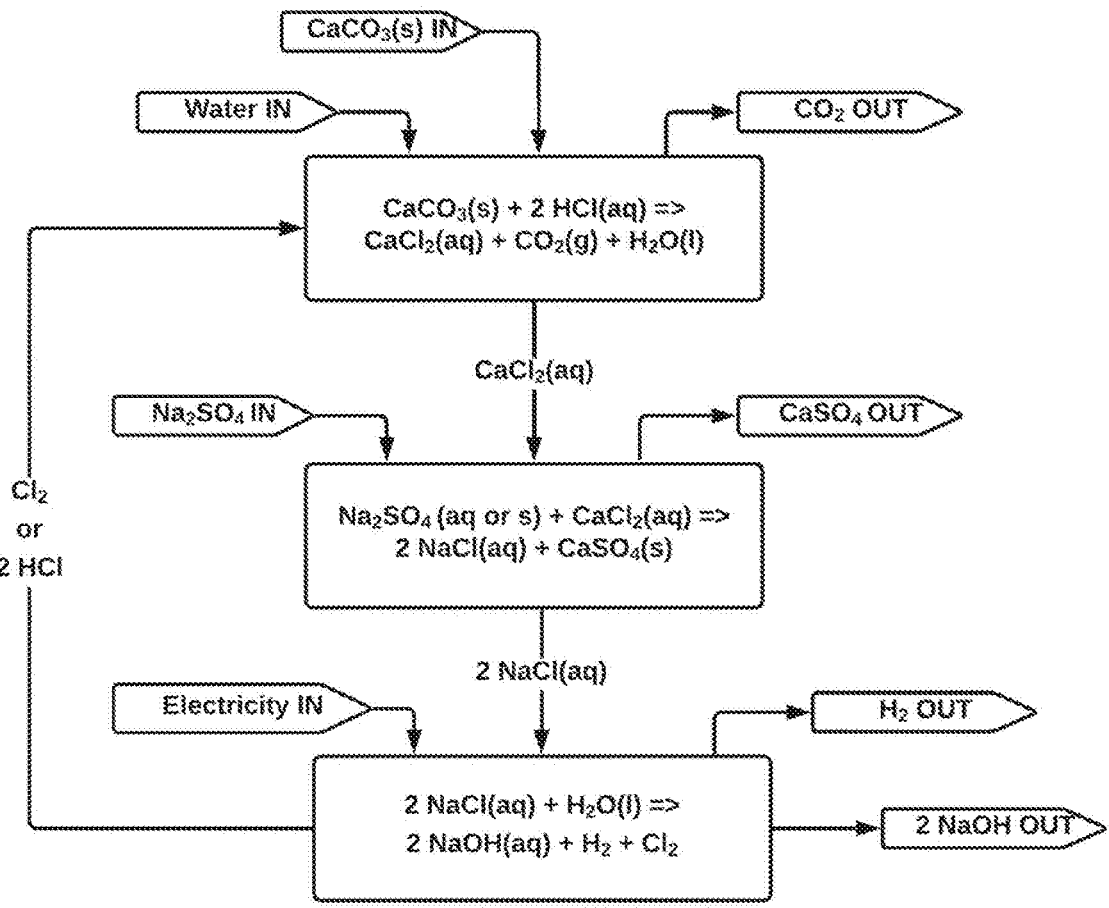
FIG. 1A (ABOVE)

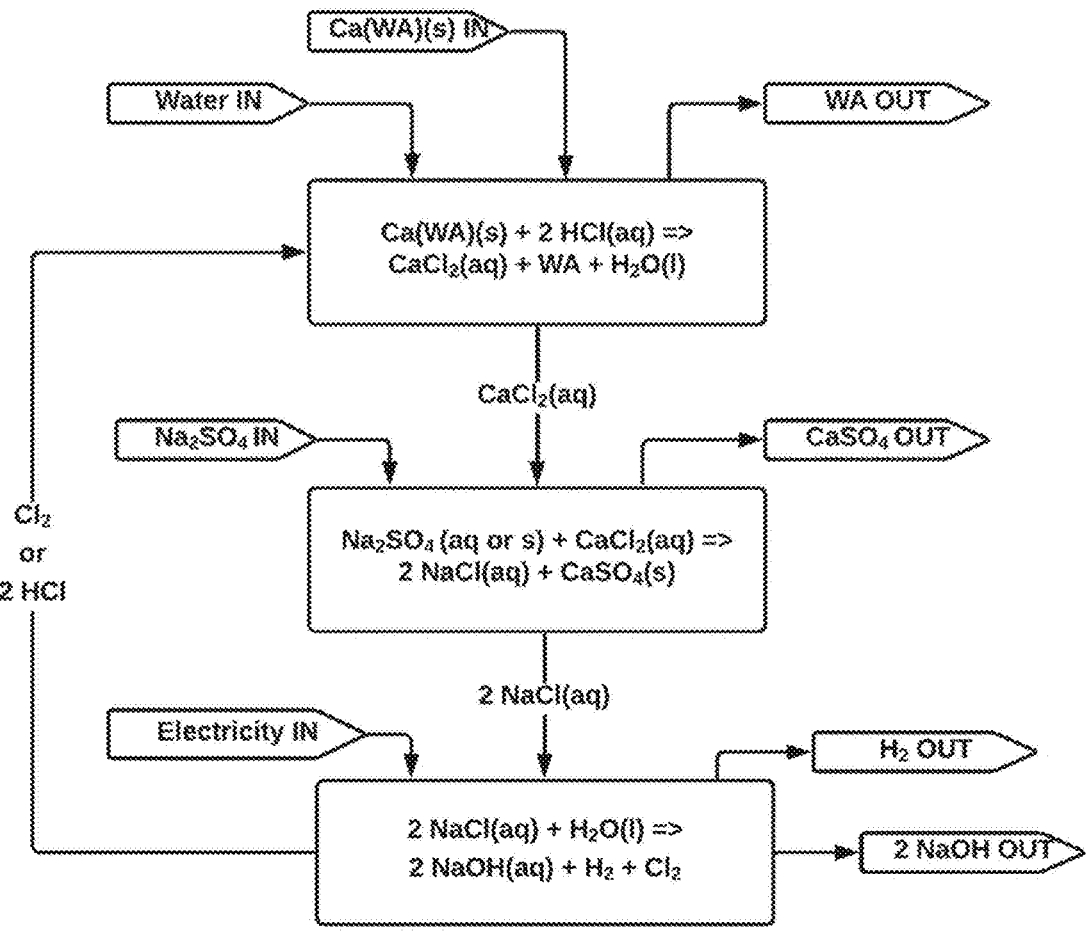
FIG. 1B (ABOVE)

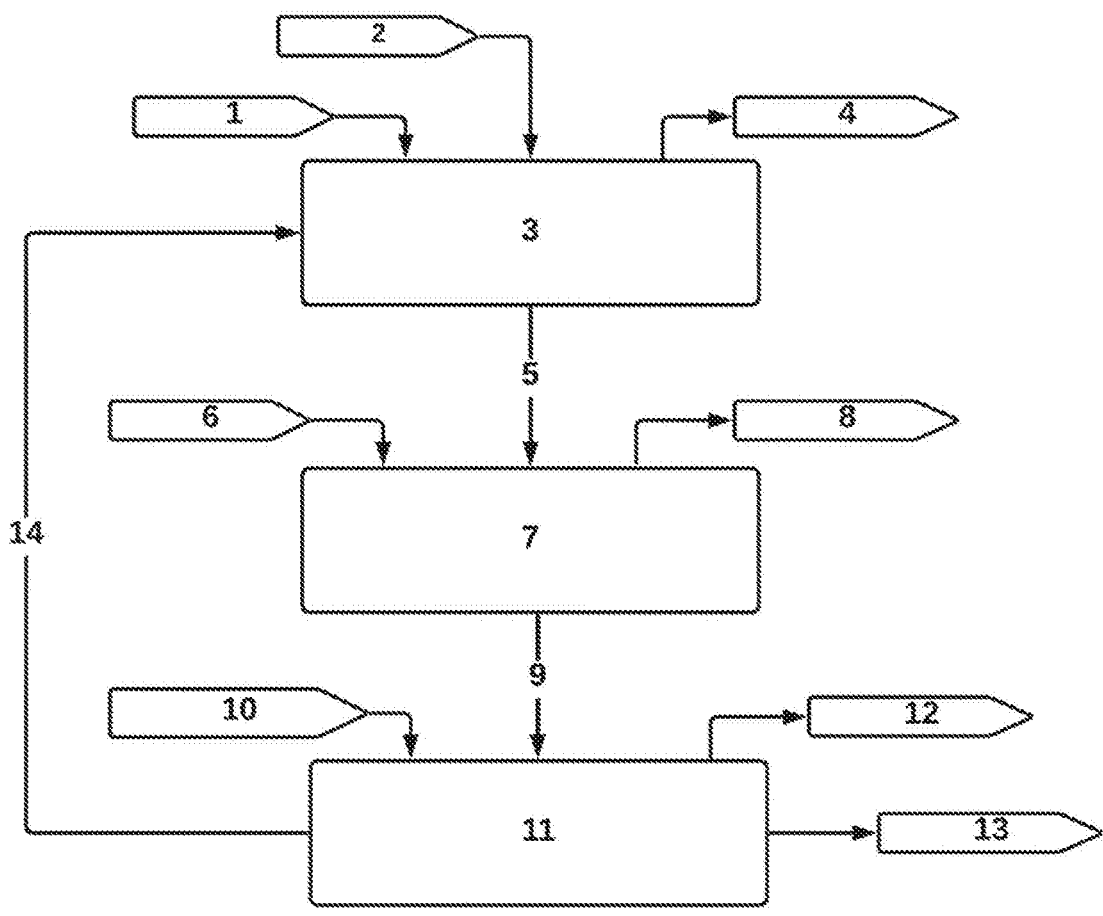
FIG. 1C (ABOVE)
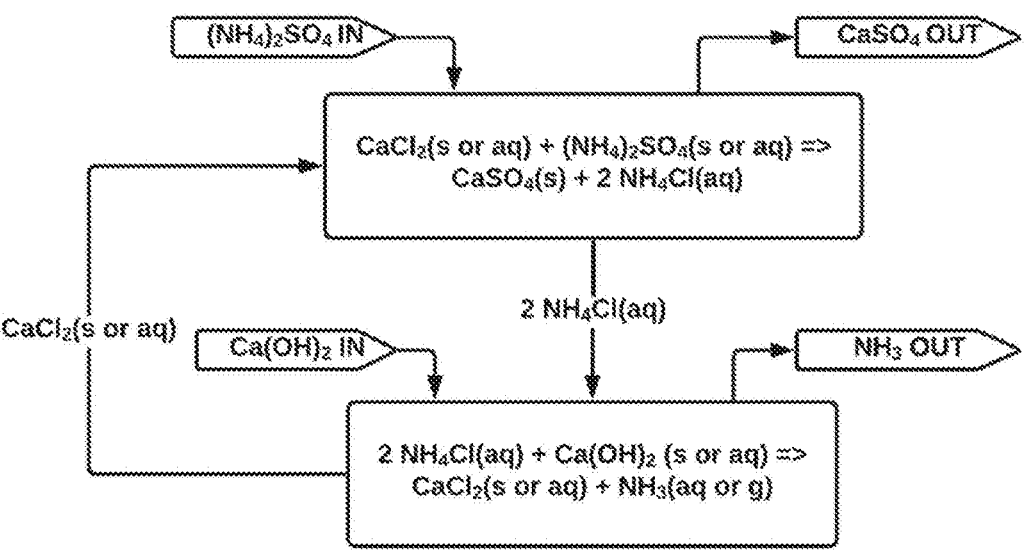
FIG. 2A (ABOVE)

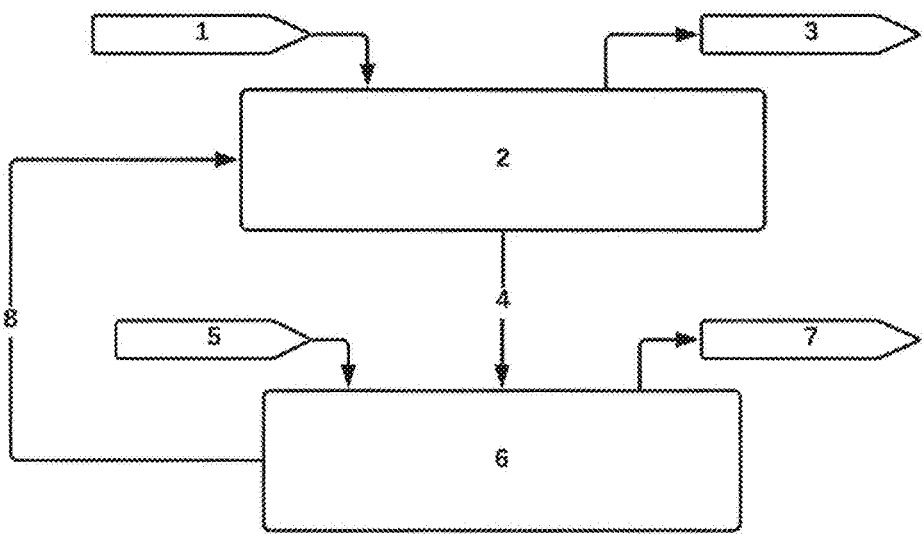
FIG. 2B (ABOVE)
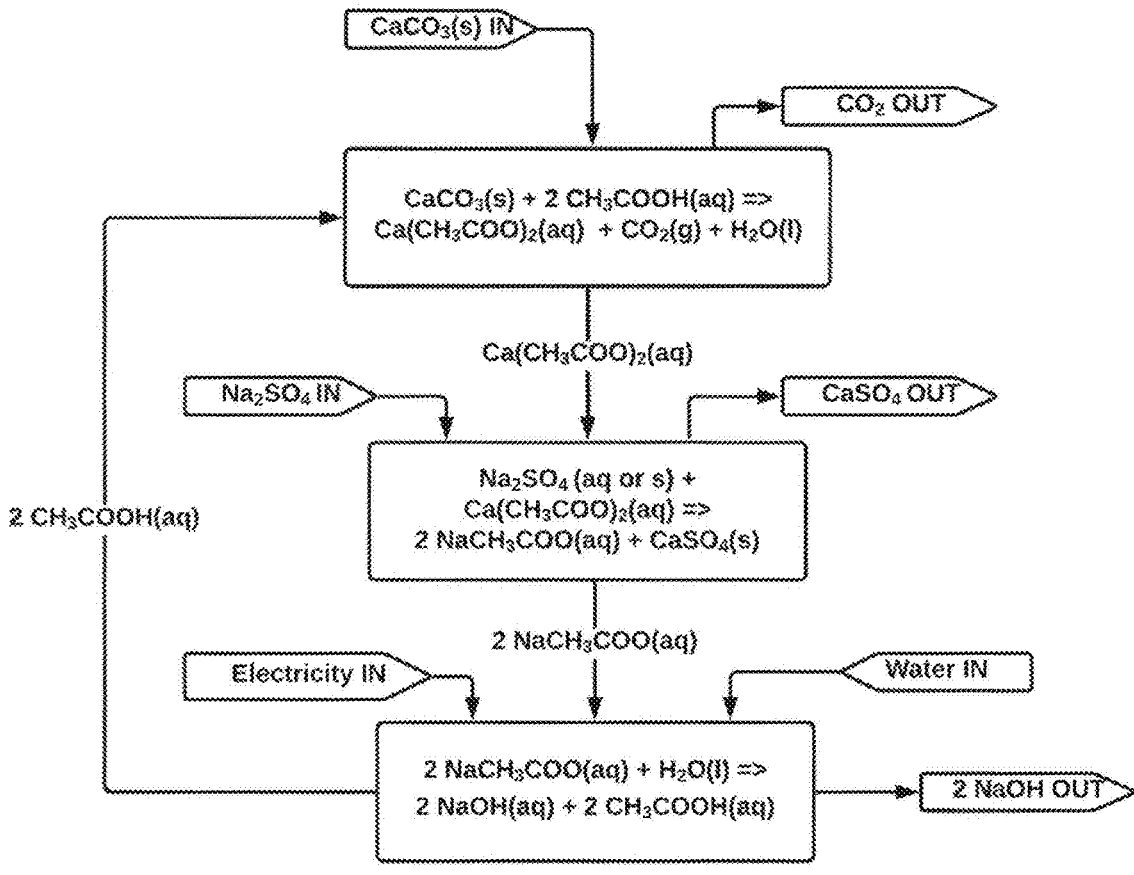
FIG. 3A (ABOVE)

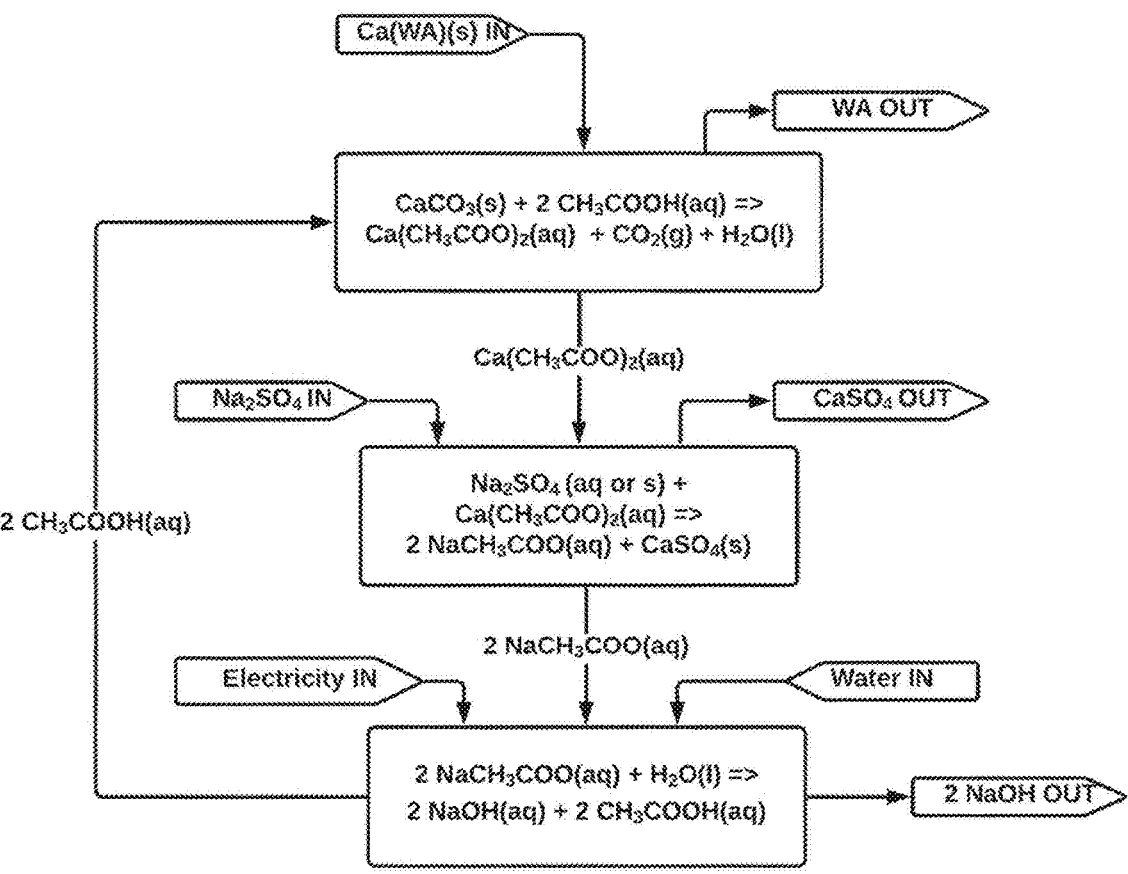
FIG. 3B (ABOVE)

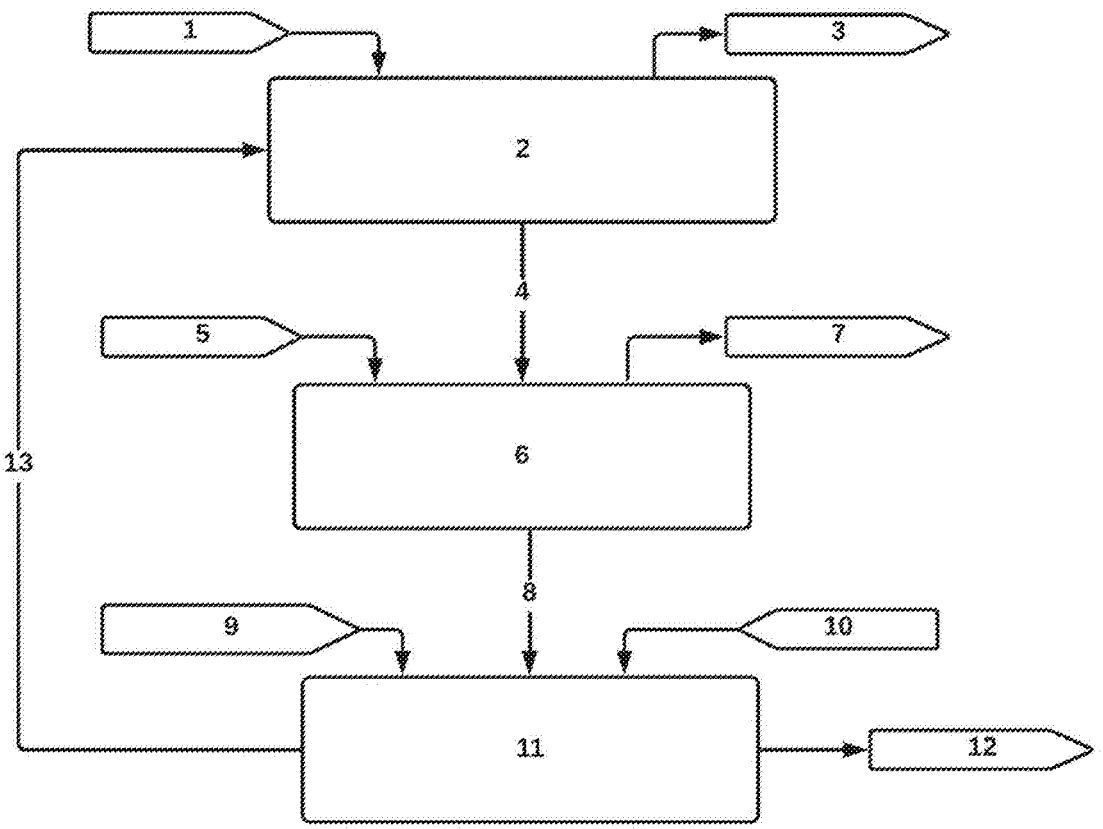
FIG. 3C (ABOVE)

1

ALKALI HYDROXIDE PRODUCTION FROM ALKALI SULFATE WITH HALOGEN OR CARBOXYLIC ACID INTERMEDIATES

CROSS-REFERENCE TO RELATED APPLICATIONS

The application is a Divisional application of U.S. patent application Ser. No. 19/035,434 filed Jan. 23, 2025, claims priority to U.S. provisional application 63/623,954 filed Jan. 23, 2024, which claims priority to U.S. provisional application 63/654,185 filed May 31, 2024, which claims priority to U.S. provisional application 63/658,580 filed Jun. 11, 2024, which claims priority to U.S. provisional application 63/661,367 filed Jun. 18, 2024, which applications are incorporated herein by reference.

This application is also related to the following patents and applications that are incorporated herein by reference: US2025/0019336; Ser. Nos. 12,017,985; 11,542,219; 11,512,036; 11,897,840; 11,236,033; 11,034,619; 11,897, 840; WO2023/225089; 12,017,985; US2025/0019253; WO2023/220380; 12,030,846; 12,030,847; and 11,174,169.

BACKGROUND AND SUMMARY

Sodium sulfate waste streams are a significant and growing problem. For example, significant sodium sulfate waste is and will be produced from lithium processing and lithium ion battery recycling. For example, it is estimated that for every 1 ton of lithium recycled from a lithium ion battery, at least 10 tons of sodium sulfate waste is produced. Sodium sulfate waste is also produced in a wide range of other industries which may include, but are not limited to, one or more or any combination of the following: lead acid battery production, or lead acid battery recycling, or rayon production, or textile production, or copper refining, or metal refining, or dye and pigment manufacturing, or carboxylic acid production, or ascorbic acid production, or desulfurization, or flue gas desulfurization, or refineries, or waste water treatment, or chemical plants, or lithium production, or lithium processing, or metal cathode production, or cathode material production, or hydrometallurgical processing, or explosives manufacturing, or neutralization, or acid neutralization, or oil & gas production, or produced water treatment, or fertilizer production, or food additive production, or mining, or metallurgy, or enhanced oil recovery, or leather tanning, or chrome, or drug synthesis, or pulp & paper manufacturing, or lithium ion battery production.

One of the challenges with recovering or converting some sodium sulfate waste streams into something of value, or disposing the sodium sulfate waste, or any combination thereof is the presence of significant impurities, which may comprise heavy metals such as cobalt, or nickel, or iron, or manganese, or any combination thereof. It may be difficult to separate or remove these impurities using, for example, nanofiltration or electrodialysis, because sodium sulfate is divalent and/or sodium sulfate being divalent may also be rejected by a nanofiltration membrane which may reduce the quality or capability of separation. Additionally, the presence of some impurities may foul or damage any electrochemical process employed to produce sodium hydroxide, which may make it challenging to perform any effective electrochemical production of sodium hydroxide.

One of the challenges with converting some sodium sulfate waste streams into sodium hydroxide is that current electrochemical methods for converting sodium sulfate into sodium hydroxide very expensive and energy intensive compared to producing sodium hydroxide from, for example, sodium chloride. It may be highly desirable to develop a process which converts the sodium sulfate into a sodium salt, such as sodium hydroxide, using less energy and/or can handle impurity laden sodium sulfate.

Additionally, the sodium sulfate waste may originate from sodium hydroxide or sodium carbonate inputs to, for example, a lithium processing or lithium ion battery recycling process or facility. It is of significant desire to develop a process which efficiently and effective transforms at least a portion of the sodium sulfate waste into sodium hydroxide or sodium carbonate, which may enable circularity or a circular economy, and/or may significantly reduce costs and/or significantly reduce waste produced by a lithium processing or lithium ion battery recycling process.

In some embodiments, the present invention may pertain to systems and methods for producing an alkali salt, such as alkali hydroxide, or alkali carbonate, or alkali bicarbonate, or any combination thereof, from an alkali sulfate. Some embodiments may comprise systems and methods for removing or separating a portion of impurities. Some embodiments may comprise lower energy consumption and/ or more impurity tolerant systems and methods for producing alkali products from alkali sulfates.

BRIEF DESCRIPTION OF DRAWINGS

FIG. 1A: A process for producing a chemical comprising an alkali hydroxide and/or a chemical comprising an alkaline earth sulfate from a chemical comprising an alkali sulfate and/or a chemical comprising an alkaline earth.

FIG. 1B: A process for producing a chemical comprising an alkali hydroxide and/or a chemical comprising an alkaline earth sulfate from a chemical comprising an alkali sulfate and/or a chemical comprising an alkaline earth.

FIG. 1C: A process for producing a chemical comprising an alkali hydroxide and/or a chemical comprising an alkaline earth sulfate from a chemical comprising an alkali sulfate and/or a chemical comprising an alkaline earth.

FIG. 2A: A process for producing a chemical comprising an ammonia and/or a chemical comprising an alkaline earth sulfate from a chemical comprising an ammonium sulfate and/or a chemical comprising an alkaline earth.

FIG. 2B: A process for producing a chemical comprising an ammonia and/or a chemical comprising an alkaline earth sulfate from a chemical comprising an ammonium sulfate and/or a chemical comprising an alkaline earth.

FIG. 3A: A process for producing a chemical comprising an alkali hydroxide and/or a chemical comprising an alkaline earth sulfate from a chemical comprising an alkali sulfate and/or a chemical comprising an alkaline earth.

FIG. 3B: A process for producing a chemical comprising an alkali hydroxide and/or a chemical comprising an alkaline earth sulfate from a chemical comprising an alkali sulfate and/or a chemical comprising an alkaline earth.

FIG. 3C: A process for producing a chemical comprising an alkali hydroxide and/or a chemical comprising an alkaline earth sulfate from a chemical comprising an alkali sulfate and/or a chemical comprising an alkaline earth.

DETAILED DESCRIPTION

Example Chemistry Description of Some Embodiments

Example Embodiment 1: Producing NaOH from $Na_2SO_4$, while producing magnesium oxide and hydrogen chloride or chloride or hydrochloric acid, a process which may comprise, for example, including, but not limited to, one or more or any combination of the following:

(1) At least partially reacting at least a portion of a material comprising an alkaline earth—weak acid anion with at least a portion of a chemical comprising an acid to form at least a portion of a solution comprising dissolved or aqueous phase alkaline earth—acid anion and a gas or solid or solution or liquid comprising a weak acid derivative:

For example, may include, but is not limited to, one or more or any combination of the following:

$$Alkaline\ Earth\ -\ Weak\ Acid\ Anion\ +\ Anion\ Acid\ \longrightarrow$$
$$Alkaline\ Earth\ -\ Anion\ +\ Weak\ Acid\ Anion\ Derivative$$

$$Alkaline\ Earth\ -\ Weak\ Acid\ Anion(s)\ +$$
$$Anion\ Acid(aq\ or\ g\ or\ l)\ \longrightarrow\ Alkaline\ Earth\ -\ Anion(aq)\ +$$
$$Weak\ Acid\ Anion\ Derivative\ (g\ or\ s\ or\ l\ or\ aq)$$

$$Ca(Weak\ Acid\ Anion)\ +\ Anion\ Acid\ \longrightarrow\ Ca(Anion)\ +$$
$$Weak\ Acid\ Derivative$$

$$Ca(Weak\ Acid\ Anion)(s)\ +\ Anion\ Acid(g\ or\ aq)\ \longrightarrow$$
$$Ca(Anion)(aq)\ +\ Weak\ Acid\ Derivative(g\ or\ aq\ or\ s)$$

$$CaCO_3\ +\ 2\ CH_3COOH\ \longrightarrow\ Ca(CH_3COO)_2\ +\ CO_2$$
$$CaCO_3(s)\ +\ 2\ CH_3COOH(aq)\ \longrightarrow\ Ca(CH_3COO)_2(aq)\ +$$
$$CO_2(g)$$
$$CaCO_3(s)\ +\ 2\ CH_2OO(aq)\ \longrightarrow\ Ca(HCOO)_2(aq)\ +\ CO_2(g)$$

(2) At least partially reacting at least a portion of a solution comprising dissolved or aqueous phase alkaline earth—acid anion with at least a portion of a salt or solid or solution comprising an alkali sulfate to form, for example, at least a portion of an alkali—acid anion salt and/or at least a portion of an alkaline earth sulfate.

For example, may include, but is not limited to, one or more or any combination of the following:

$$Alkali\ Sulfate\ +\ Alkaline\ Earth\text{-}Anion\ \longrightarrow\ Alkali\text{-}Anion\ +$$
$$Alkaline\ Earth\ Sulfate$$

$$Alkali\ Sulfate(s\ or\ aq)\ +\ Alkaline\ Earth\text{-}Anion(aq)\ \longrightarrow$$
$$Alkali\text{-}Anion(aq)\ +\ Alkaline\ Earth\ Sulfate(s)$$

$$Na_2SO_4\ +\ Ca(Anion)_2\ \longrightarrow\ 2\ Na(Anion)\ +\ CaSO_4$$
$$Na_2SO_4(s\ or\ aq)\ +\ Ca(Anion)_2(aq)\ \longrightarrow\ 2\ Na(Anion)(aq)\ +$$
$$CaSO_4(s\ or\ aq)$$

$$Na_2SO_4\ +\ Ca(CH_3COO)_2\ \longrightarrow\ 2\ NaCH_3COO\ +\ CaSO_4$$
$$Na_2SO_4(s\ or\ aq)\ +\ Ca(CH_3COO)_2(aq)\ \longrightarrow$$
$$2\ NaCH_3COO(aq)\ +\ CaSO_4(aq)$$
$$Na_2SO_4(s\ or\ aq)\ +\ Ca(CH_3COO)_2(aq)\ \longrightarrow$$
$$2\ NaCH_3COO(aq)\ +\ CaSO_4(s\ or\ aq)$$
$$Na_2SO_4(s\ or\ aq)\ +\ Ca(CH_2OO)_2(aq)\ \longrightarrow$$
$$2\ NaCH_2OO(aq)\ +\ CaSO_4(s)$$

4

-continued
$$Na_2SO_4(s\ or\ aq)\ +\ Ca(CH_3COO)_2(aq)\ \longrightarrow$$
$$2\ NaCH_3COO(aq)\ +\ CaSO_4(s\ or\ aq)$$

(2—Separation) At least partially separate at least a portion of an alkaline earth sulfate from, for example, at least a portion of an alkali-anion salt employing, for example, a solid-liquid separation:

For example, may include, but is not limited to, one or more or any combination of the $$Alkali\ -\ Anion\ +\ Alkaline\ Earth\ -\ Sulfate\ \longrightarrow$$
$$Alkali\ -\ Anion(at\ least\ partially\ separated)\ +\ Alkaline\ Earth\ -$$
$$Sulfate(at\ least\ partially\ separated)$$

$$Alkali\ -\ Anion(aq)\ +\ Alkaline\ Earth\ -\ Sulfate(s)\ \longrightarrow$$
$$Alkali\ -\ Anion(aq)(at\ least\ partially\ separated)\ +\ Alkaline\ Earth\ -$$
$$Sulfate(s)(at\ least\ partially\ separated)$$

$$2\ Na(Anion)\ +\ CaSO_4\ \longrightarrow$$
$$2\ Na(Anion)(at\ least\ partially\ separated)\ +$$
$$CaSO_4(at\ least\ partially\ separated)$$

$$2\ Na(Anion)(aq)\ +\ CaSO_4(s)\ \longrightarrow$$
$$2\ Na(Anion)(aq)(at\ least\ partially\ separated)\ +$$
$$CaSO_4(s)(at\ least\ partially\ separated)$$

$$2\ NaCH_3COO\ +\ CaSO_4\ \longrightarrow$$
$$2\ NaCH_3COO)(at\ least\ partially\ separated)\ +$$
$$CaSO_4(at\ least\ partially\ separated)$$

$$2\ NaCH_3COO(aq)\ +\ CaSO_4(s)\ \longrightarrow$$
$$2\ NaCH_3COO(aq)(at\ least\ partially\ separated)\ +$$
$$CaSO_4(s)(at\ least\ partially\ separated)$$

$$2\ NaCH_3COO(aq)\ +\ CaSO_4(s\ or\ aq)\ \longrightarrow$$
$$2\ NaCH_3COO(aq)(at\ least\ partially\ separated)\ +$$
$$CaSO_4(s\ or\ aq)(at\ least\ partially\ separated)$$

$$2\ NaCH_2COO(aq)\ +\ CaSO_4(s)\ \longrightarrow$$
$$2\ NaCH_2COO(aq)(at\ least\ partially\ separated)\ +$$
$$CaSO_4(s)(at\ least\ partially\ separated)$$

$$Na_2SO_4(s\ or\ aq)\ +\ Ca(CH_3COO)_2(aq)\ \longrightarrow$$
$$2\ NaCH_3COO(aq)(at\ least\ partially\ separated)\ +$$
$$CaSO_4(s\ or\ aq)(at\ least\ partially\ separated)$$

(2—Reaction or Treatment for Separation) At least partially add or react at least a portion of an alkali carbonate, or hydroxide, or sulfite, or sulfide, or a salt of with an anion which may form a low solubility salt with an alkaline earth, or any combination thereof to or with the solution comprising at least a portion of an alkali-anion salt to react with at least a portion of any residual alkaline-earth to form, for example, at least a portion of a precipitate or solid comprising an alkaline-earth:

For example, may include, but is not limited to, one or more or any combination of the Alkali - Anion Salt + Alkaline Earth - Sulfate + Alkali -

(Anion which forms low solubility in salt with an alkaline earth) $\longrightarrow$ Alkali - Anion Salt + Alkali - Sulfate + Alkaline Earth -

(Anion which forms low solubility in salt with an alkaline earth)

Alkali - Anion Salt(aq) + Alkaline Earth - Sulfate(aq) + Alkali -

(Anion which forms low solubility in salt with an alkaline earth)(aq) $\longrightarrow$ Alkali - Anion Salt(aq) + Alkali - Sulfate(aq) + Alkaline Earth -

(Anion which forms low solubility in salt with an alkaline earth)(s)

$2\,Na(Anion) + CaSO_4 + Na_2CO_3 \longrightarrow 2\,Na(Anion) + Na_2SO_4 + CaCO_3$ $2\,Na(Anion) + CaSO_4 + Na_2SO_3 \longrightarrow 2\,Na(Anion) + Na_2SO_4 + CaSO_3$ $2\,Na(Anion) + CaSO_4 + NaHCO_3 \longrightarrow 2\,Na(Anion) + Na_2SO_4 + CaCO_3 + CO_2$ $2\,Na(Anion) + CaSO_4 + Na_2S \longrightarrow 2\,Na(Anion) + Na_2SO_4 + CaS$ $2\,NaCH_3COO + CaSO_4 + Na_2CO_3 \longrightarrow 2\,NaCH_3COO + Na_2SO_4 + CaCO_3$ $2\,NaCH_3COO + CaSO_4 + Na_2SO_3 \longrightarrow 2\,NaCH_3COO + Na_2SO_4 + CaSO_3$ $2\,NaCH_3COO + CaSO_4 + 2\,NaHCO_3 \longrightarrow 2\,NaCH_3COO + Na_2SO_4 + CaCO_3$ $2\,NaCH_3COO + CaSO_4 + Na_2S \longrightarrow 2\,NaCH_3COO + Na_2SO_4 + CaS$ $2\,Na(Anion)(aq) + CaSO_4(aq) + Na_2CO_3(s\ or\ aq) \longrightarrow 2\,Na(Anion)(aq) + Na_2SO_4(aq) + CaCO_3(s)$ $2\,Na(Anion)(aq) + CaSO_4(aq) + Na_2SO_3(s\ or\ aq) \longrightarrow 2\,Na(Anion)(aq) + Na_2SO_4(aq) + CaSO_3(s)$ $2\,Na(Anion)(aq) + CaSO_4(aq) + 2\,NaHCO_3(s\ or\ aq) \longrightarrow 2\,Na(Anion)(aq) + Na_2SO_4(aq) + CaCO_3(s) + CO_2(g)$ $2\,Na(Anion)(aq) + CaSO_4(aq) + Na_2S(s\ or\ aq) \longrightarrow 2\,Na(Anion)(aq) + Na_2SO_4(aq) + CaS(s)$ $2\,NaCH_3COO(aq) + CaSO_4(aq) + Na_2CO_3(s\ or\ aq) \longrightarrow 2\,NaCH_3COO(aq) + Na_2SO_4(aq) + CaCO_3(s)$ $2\,NaCH_3COO(aq) + CaSO_4(aq) + Na_2SO_3(aq) \longrightarrow 2\,NaCH_3COO(aq) + Na_2SO_4(aq) + CaSO_3(s)$ $2\,NaCH_3COO(aq) + CaSO_4(aq) + 2\,NaHCO_3(s\ or\ aq) \longrightarrow 2\,NaCH_3COO(aq) + Na_2SO_4(aq) + CaCO_3(s) + CO_2(g)$ -continued $2\,NaCH_3COO(aq) + CaSO_4(aq) + Na_2S(s\ or\ aq) \longrightarrow 2\,NaCH_3COO(aq) + Na_2SO_4(aq) + CaS(s)$ Note: In some embodiments, calcium carbonate or calcium sulfite produced and/or separated may be transferred to a process step which may employ calcium carbonate or calcium sulfite.

(2—Separation of Precipitate) At least partially separating at least a portion of any precipitate or solid comprising an alkaline-earth employing, for example, a solid-liquid separation:

For example, may include, but is not limited to, one or more or any combination of the following:

Alkali - Anion Salt + Alkali Sulfate + [Alkaline-Earth - Low Solubility Anion] $\longrightarrow$ Alkali - Anion Salt + Alkali Sulfate + [Alkaline-Earth - Low Solubility Anion](at least partially separated)

Alkali - Anion Salt(aq) + Alkali Sulfate(aq) + [Alkaline-Earth - Low Solubility Anion](s) $\longrightarrow$ Alkali - Anion Salt(aq) + Alkali Sulfate(aq) + [Alkaline-Earth - Low Solubility Anion](s)(at least partially separated)

$2\,Na(Anion)(aq) + Na_2SO_4(aq) + CaCO_3(s) \longrightarrow 2\,Na(Anion)(aq) + Na_2SO_4(aq) + CaCO_3(s)(at\ least\ partially\ separated)$ $2\,Na(Anion)(aq) + Na_2SO_4(aq) + CaSO_3(s) \longrightarrow 2\,Na(Anion)(aq) + Na_2SO_4(aq) + CaSO_3(s)(at\ least\ partially\ separated)$ $2\,Na(Anion)(aq) + Na_2SO_4(aq) + CaCO_3(s) + CO_2(g) \longrightarrow 2\,Na(Anion)(aq) + Na_2SO_4(aq) + CaSO_3(s)(at\ least\ partially\ separated)$ $2\,Na(Anion)(aq) + Na_2SO_4(aq) + CaS(s) \longrightarrow 2\,Na(Anion)(aq) + Na_2SO_4(aq) + CaSO_3(s)(at\ least\ partially\ separated)$ $2\,NaCH_3COO(aq) + Na_2SO_4(aq) + CaCO_3(s) \longrightarrow 2\,NaCH_3COO(aq) + Na_2SO_4(aq) + CaSO_3(s)(at\ least\ partially\ separated)$ $2\,NaCH_3COO(aq) + Na_2SO_4(aq) + CaSO_3(s) \longrightarrow 2\,NaCH_3COO(aq) + Na_2SO_4(aq) + CaSO_3(s)(at\ least\ partially\ separated)$ $2\,NaCH_3COO(aq) + Na_2SO_4(aq) + CaCO_3(s) + CO_2(g) \longrightarrow 2\,NaCH_3COO(aq) + Na_2SO_4(aq) + CaSO_3(s)(at\ least\ partially\ separated)$ $2\,NaCH_3COO(aq) + Na_2SO_4(aq) + CaS(s) \longrightarrow 2\,NaCH_3COO(aq) + Na_2SO_4(aq) + CaSO_3(s)(at\ least\ partially\ separated)$ (2—Separation) At least partially separate at least a portion of divalent salts, or divalent ions, or multivalent ions, or heavy metal salts, or impurities, or any combination thereof from, for example, at least a portion of an alkali-anion salt or alkali-monovalent anion salt employing, for example, nanofiltration:

For example, may include, but is not limited to, one or more or any combination of the following:

Alkali - Anion Salt + [Heavy Metal Impurities, and/or Divalent Ions and/or Multivalent Ions and/or Other Impurities] $\longrightarrow$

[Separate Permeate comprising Alkali - Anion Salt] +

[Separate Retentate comprising (Heavy Metal Impurities, and/or Divalent Ions and/or Multivalent Ions and/or Other Impurities) and/or Alkali Sulfate]

2 Na(Anion) + [Heavy Metal Impurities, and/or Divalent Ions and/or Multivalent Ions and/or Other Impurities] $\longrightarrow$

[Separate Permeate comprising 2Na(Anion)] +

[Separate Retentate comprising (Heavy Metal Impurities, and/or Divalent Ions and/or Multivalent Ions and/or Other Impurities) and/or $Na_2SO_4$]

2 Na(Anion) + $Na_2SO_4$ + [Heavy Metal Impurities, and/or Divalent Ions and/or Multivalent Ions and/or Other Impurities] $\longrightarrow$

[Separate Permeate comprising 2Na(Anion)] +

[Separate Retentate comprising (Heavy Metal Impurities, and/or Divalent Ions and/or Multivalent Ions and/or Other Impurities) and/or $Na_2SO_4$]

2 Na(Anion) + $Na_2SO_4$(aq) + [Heavy Metal Impurities, and/or Divalent Ions and/or Multivalent Ions and/or Other Impurities](aq) $\longrightarrow$

[Separate Permeate comprising 2Na(Anion)](aq) +

[Separate Retentate comprising (Heavy Metal Impurities, and/or Divalent Ions and/or Multivalent Ions and/or Other Impurities) and/or $Na_2SO_4$](aq)

2 $NaCH_3COO$ + [Heavy Metal Impurities, and/or Divalent Ions and/or Multivalent Ions and/or Other Impurities] $\longrightarrow$

[Separate Permeate comprising 2$NaCH_3COO$] +

[Separate Retentate comprising (Heavy Metal Impurities, and/or Divalent Ions and/or Multivalent Ions and/or Other Impurities) and/or $Na_2SO_4$]

2 $NaCH_3COO$ + $Na_2SO_4$ + [Heavy Metal Impurities, and/or Divalent Ions and/or Multivalent Ions and/or Other Impurities] $\longrightarrow$

[Separate Permeate comprising 2$NaCH_3COO$] +

[Separate Retentate comprising (Heavy Metal Impurities, and/or Divalent Ions and/or Multivalent Ions and/or Other Impurities) and/or $Na_2SO_4$]

2 $NaCH_3COO$(aq) + $Na_2SO_4$(aq) + [Heavy Metal Impurities, and/or Divalent Ions and/or Multivalent Ions and/or Other Impurities](aq) $\longrightarrow$

[Separate Permeate comprising 2$NaCH_3COO$](aq) +

[Separate Retentate comprising (Heavy Metal Impurities, and/or Divalent Ions and/or Multivalent Ions and/or Other Impurities) and/or $Na_2SO_4$](aq)

Note: In some embodiments, a nanofiltration process may form at least a portion of a retentate comprising at least a portion of divalent salts, or divalent ions, or multivalent ions, or heavy metal salts, or impurities, or any combination thereof and/or a permeate comprising a solution comprising alkali-anion salt or alkali-monovalent anion salt.

(2—Treatment of Retentate) At least partially add at least a portion of a chemical comprising an acid to at least a portion of the solution comprising a retentate to, for example, react with at least a portion of any residual alkali-anion salt and/or form, for example, at least a portion of anion acid or anion derivative acid:

For example, may include, but is not limited to, one or more or any combination of the following:

[Heavy Metal Impurities. and/or Divalent Ions and/or Multivalent Ions and/or Other Impurities] + 2 Na(Anion) + Acid #2 → [Heavy Metal Impurities, and/or Divalent Ions and/or Multivalent Ions and/or Other Impurities] + 2 Na(Acid #2 Anion) + Anion Acid

[Heavy Metal Impurities. and/or Divalent Ions and/or Multivalent Ions and/or Other Impurities] + 2 Na(Anion) + Stronger Acid → [Heavy Metal Impurities, and/or Divalent Ions and/or Multivalent Ions and/or Other Impurities] + 2 Na(Stronger Acid Anion) + Anion Acid -continued

[Heavy Metal Impurities, and/or Divalent Ions and/or Multivalent Ions and/or Other Impurities](aq) + 2 Na(Anion)(aq) + Stronger Acid(aq) → [Heavy Metal Impurities, and/or Divalent Ions and/or Multivalenl Ions and/or Other Impurities](aq) + 2 Na(Stronger Acid Anion)(aq) + Anion Acid(aq or g or l)

[Heavy Metal Impurities, and/or Divalent Ions and/or Multivalent Ions and/or Other Impurities](aq) + 2 $NaCH_3COO$(aq) + 2 HCl(aq) → [Heavy Metal Impurities, and/or Divalent Ions and/or Multivalent Ions and/or Other Impurities](aq) + 2 NaCl(aq) + 2 $CH_3COOH$(aq or g or l)

[Heavy Metal Impurities, and/or Divalent Ions and/or Multivalent Ions and/or Other Impurities](aq) + 2 $NaCH_3COO$(aq) + $SO_2$(g or aq) → [Heavy Metal Impurities, and/or Divalent Ions and/or Multivalent Ions and/or Other Impurities](aq) + $Na_2SO_3$(aq) + 2 $CH_3COOH$(aq or g or l)

[Heavy Metal Impurities, and/or Divalent Ions and/or Multivalem Ions and/or Other Impurities](aq) + 2 $NaCH_3COO$(aq) + $H_2SO_4$(g or aq) → [Heavy Metal Impurities, and/or Divalent Ions and/or Multivalent Ions and/or Other Impurities](aq) + $Na_2SO_4$(aq) + 2 $CH_3COOH$(aq or g or l)

(2—Recovery of Useful or Valuable or Desired Chemical from Retentate) At least partially recovering or separating or removing at least a portion of a useful or valuable or desired chemical from the retentate or treated retentate:

For example, may include, but is not limited to, one or more or any combination of the following:

[Heavy Metal Impurities, and/or Divalent Ions and/or Multivalent Ions and/or Other Impurities]   +   2 Na(Acid #2 Anion)   +   Anion Acid   ⟶

[Heavy Metal Impurities, and/or Divalent Ions and/or Multivalent Ions and/or Other Impurities and/or 2 Na(Acid #2 Anion)]   +

[Anion Acid + Solvent Water]

[Heavy Metal Impurities, and/or Divalent Ions and/or Multivalent Ions and/or Other Impurities](aq)   +   2 Na(Acid #2 Anion)(aq)   +

Anion Acid(aq)   ⟶   [Heavy Metal Impurities, and/or Divalent Ions and/or Multivalent Ions and/or Other Impurities and/or 2 Na(Acid #2 Anion)](s)   +

[Separate Anion Acid + Solvent Water](aq)

[Heavy Metal Impurities, and/or Divalent Ions and/or Multivalent Ions and/or Other Impurities](aq)   +   2 Na(Acid #2 Anion)(aq)   +

Anion Acid(aq)   ⟶   [Heavy Metal Impurities, and/or Divalent Ions and/or Multivalent Ions and/or Other Impurities and/or 2 Na(Acid #2 Anion)](s)   +

[Separate Anion Acid](aq)

[Heavy Metal Impurities, and/or Divalent Ions and/or Multivalent Ions and/or Other Impurities]   +   2 NaCl   +   2 $CH_3OOH$   ⟶

[Heavy Metal Impurities, and/or Divalent Ions and/or Multivalent Ions and/or Other Impurities and/or 2 NaCl]   +   [2 $CH_3OOH$ + Solvent Water]

[Heavy Metal Impurities, and/or Divalent Ions and/or Multivalent Ions and/or Other Impurities](aq)   +   2 NaCl(aq)   +   2 $CH_3OOH$(aq)   ⟶

[Heavy Metal Impurities, and/or Divalent Ions and/or Multivalent Ions and/or Other Impurities and/or 2 NaCl](s)   +   [2 $CH_3OOH$ + Solvent Water](aq)

[Heavy Metal Impurities, and/or Divalent Ions and/or Multivalent Ions and/or Other Impurities](aq)   +   2 NaCl(aq)   +   2 $CH_3OOH$(aq)   ⟶

[Heavy Metal Impurities, and/or Divalent Ions and/or Multivalent Ions and/or Other Impurities and/or 2 NaCl](s)   +   2 $CH_3OOH$(aq)

Note: In some embodiments, anion acid may be recovered or separated by distillation because, for example, the vapor pressure of some anion acids may enable distillation or vaporization or condensation simultaneous to or with the distillation or vaporization or condensation of solvent water, which may result in a solution, or condensate, or distillate comprising aqueous anion acid. In some embodiments, anion acid, such as acetic acid or formic acid, may be recovered or separated by distillation because, for example, the vapor pressure of some anion acids, such as acetic acid or formic acid, may enable distillation or vaporization or condensation simultaneous to or with the distillation or vaporization or condensation of solvent water, which may result in a solution, or condensate, or distillate comprising aqueous anion acid, such as aqueous acetic acid or formic acid.

(2—Reacting Chemical Recovered from Retentate and/or Concentrating) At least partially reacting at least a portion of the useful or valuable or desired chemical recovered from retentate or treated retentate and/or concentrating:

For example, may include, but is not limited to, one or more or any combination of the following:

[Anion Acid]   +   [Alkaline-Earth Base]   ⟶

Alkaline-Earth - Anion Salt

[Anion Acid](aq)   +   [Alkaline-Earth Base](s)   ⟶

Alkaline-Earth - Anion Salt(s or aq)

[Anion Acid](aq)   +   [Alkaline-Earth Base](s or aq)   ⟶

Alkaline-Earth - Anion Salt(aq)

Alkaline-Earth - Anion Salt(aq)   ⟶

Alkaline-Earth - Anion Salt(aq)
    (concentrated RO or NF retentate)(separate)   +   (Solvent Water(separate)

-continued

Alkaline-Earth - Anion Salt(aq)   ⟶

Alkaline-Earth - Anion Salt(aq)(concentrated)(seperate)   +

Solvent Water(distillate or condensate)(separate)

Alkaline-Earth - Anion Salt(aq)   ⟶

Alkaline-Earth - Anion Salt(s)(separate)   +   Solvent Water(separate)

[Anion Acid](aq)   +   [Alkaline-Earth Base]   ⟶

Alkaline-Earth - Anion Salt

[Anion Acid](aq)   +   [Alkaline-Earth Base](s)   ⟶

Alkaline-Earth - Anion Salt(s or aq)

[Anion Acid](aq)   +   [Alkaline-Earth Base](s or aq)   ⟶

Alkaline-Earth - Anion Salt(aq)

Alkaline-Earth - Anion Salt(aq)   ⟶

Alkaline-Earth - Anion Salt(aq)
    (concentrated RO or NF retentate)(separate)   +   (Solvent Water(separate)

Alkaline-Earth - Anion Salt(aq)   ⟶

Alkaline-Earth - Anion Salt(aq)(concentrated)(separate)   +

Solvent Water(distillate or condensate)(separate)

Alkaline-Earth - Anion Salt(aq)   ⟶

Alkaline-Earth - Anion Salt(s)(separate)   +   Solvent Water(separate)

[Anion Acid]   +   [Alkali-Earth Base]   ⟶   Alkali - Anion Salt

[Anion Acid](aq)   +   [Alkali-Earth Base](s)   ⟶

Alkali-Earth - Anion Salt(s or aq)

[Anion Acid](aq)   +   [Alkali-Earth Base](s or aq)   ⟶

Alkali-Earth - Anion Salt(aq)

Alkali - Anion Salt(aq)   ⟶

11

-continued

Alkali - Anion Salt(aq)(concentrated RO or NF retentate)(separate) + Solvent Water(permeate separate)

Alkali - Anion Salt(aq) ⟶ Anion Salt(aq)(concentrated)(separate) + Solvent Water(distillate or condensate)(separate)

Alkali - Anion Salt(aq) ⟶ Alkali - Anion Salt(s)(separate) + Solvent Water(separate)

$2\ CH_3COOH + CaCO_3 \longrightarrow Ca(CH_3COO)_2 + CO_2$ $2\ CH_3COOH(aq) + CaCO_3(s) \longrightarrow Ca(CH_3COO)_2(aq\ or\ s) + CO_2(g)$ $Ca(CH_3COO)_2(aq) \longrightarrow$
Ca(CH₃COO)₂(aq)(concentrated RO or NF retentate)(separate) + Solvent Water(permeate, separate)

$Ca(CH_3COO)_2(aq) \longrightarrow$
Ca(CH₃COO)₂(aq)(concentrated)(separate) + Solvent Water(distillate or condensate)(separate)

$Ca(CH_3COO)_2(aq) \longrightarrow Ca(CH_3COO)_2(s)(separate) +$ Solvent Water(g or l or s)(separate)

$2\ CH_3COOH + Na_2CO_3 \longrightarrow 2\ NaCH_3COO + CO_2$ $2\ CH_3COOH(aq) + Na_2CO_3(s) \longrightarrow 2\ NaCH_3COO(aq\ or\ s) + CO_2(g)$ $2\ NaCH_3COO(aq) \longrightarrow$
2 NaCH₃COO(aq)(concentrated RO or NF retentate)(separate) + Solvent Water(permeate, separate)

$2\ NaCH_3COO(aq) \longrightarrow 2\ NaCH_3COO(aq)(concentrated)(separate) +$ Solvent Water(distillate or condensate)(separate)

$2\ NaCH_3COO(aq) \longrightarrow 2\ NaCH_3COO(s)(separate) +$ Solvent Water(g or l or s) (separate)

(3) At least partially reacting at least a portion of a solution or salt comprising an alkali anion salt with at least a portion of a gas comprising sulfur dioxide, to form, for example, at least a portion of a solution or salt comprising an alkali sulfite or bisulfite and/or at least a portion of a solution or acid or vapor comprising an anion acid.

For example, may include, but is not limited to, one or more or any combination of the following:

[Alkali-Anion] + SO₂ ⟶ Alkali Sulfite + Anion Acid

[Alkali-Anion](aq) + SO₂ (g or aq) ⟶ Alkali Sulfite(aq or s) + Anion Acid(aq or g)

$2\ NaCH_3COO + SO_2 \longrightarrow Na_2SO_3 + 2\ CH_3COOH$ $2\ NaCH_3COO(aq) + SO_2(g\ or\ aq) \longrightarrow Na_2SO_3(aq\ or\ s) + 2\ CH_3COOH(aq\ or\ g)$ $2\ NaCH_3COO(aq) + SO_2(g) \longrightarrow Na_2SO_3(aq) + 2\ CH_3COOH(aq)$

12

(3—Separating) At least partially separating at least a portion of an anion acid from at least a portion of an alkali sulfite or bisulfite:

For example, may include, but is not limited to, one or more or any combination of the following:

Alkali Sulfate + Anion Acid ⟶ Alkali Sulfite(separate) + Anion Acid(separate)

Alkali Sulfite(aq) + Anion Acid(aq) ⟶ Alkali Sulfite(s) + Anion Acid(aq)(separate)

$Na_2SO_3 + 2\ CH_3COOH \longrightarrow Na_2SO_3(separate) + 2\ CH_3COOH(separate)$ $Na_2SO_3(aq) + 2\ CH_3COOH(aq) \longrightarrow Na_2SO_3(s)(separate) + 2\ CH_3COOH(aq)\ (separate)$ $Na_2SO_3(aq) + 2\ CH_3COOH(aq) \longrightarrow Na_2SO_3(s)(retentate) + 2\ CH_3COOH(aq)\ (permeate)$ (4) At least partially reacting at least a portion of a salt or solution comprising an alkali sulfite with at least a portion of a salt or solution comprising an alkaline-earth chloride or alkaline-earth halide, to form, for example, at least a portion of a salt or solution comprising an alkali chloride or alkali halide and/or at least a portion of a solid or solution comprising an alkali earth sulfite.

For example, may include, but is not limited to, one or more or any combination of the following:

$Na_2SO_3 + MgCl_2 \longrightarrow MgSO_3 + 2\ NaCl$ $Na_2SO_3(aq\ or\ s) + MgCl_2(aq) \longrightarrow MgSO_3(s)+ 2\ NaCl(aq)$ $Na_2SO_3 + CaCl_2 \longrightarrow X\alpha SO_3 + 2\ NaCl$ $Na_2SO_3(aq\ or\ s) + CaCl_2(aq) \longrightarrow X\alpha SO_3(s)+ 2\ NaCl(aq)$ Note: In some embodiments, MgCl₂ may comprise an input or feed.

(4—Separating) At least partially separate at least a portion of a salt or solution comprising an alkali chloride or alkali halide from at least a portion of a solid or solution comprising an alkali sulfite, for example, employing a solid-liquid separation.

For example, may include, but is not limited to, one or more or any combination of the following:

$MgSO_3 + 2\ NaCl \longrightarrow MgSO_3(separate) + 2\ NaCl(separate)$ $MgSO_3(s) + 2\ NaCl(aq) \longrightarrow MgSO_3(s)(separate) + 2\ NaCl(aq)(separate)$ $CaSO_3 + 2\ NaCl \longrightarrow CaO_3(separate) + 2\ NaCl(separate)$ $CaSO_3(s) + 2\ NaCl(aq) \longrightarrow X\alpha SO_3(s)(separate) + 2\ NaCl(aq)(separate)$ (4—Separating) At least partially treating and/or purifying a solution comprising an alkali chloride or alkali halide. For example, in some embodiments, adding chemicals to facilitate the precipitation or removal of at least a portion of residual dissolved alkaline-earth. For example, in some embodiments, employing nanofiltration or other membrane separation to separate or remove at least a portion of any, for example, residual divalent ions, or sulfite, or sulfate, or any combination thereof:

For example, may include, but is not limited to, one or more or any combination of the following:

$2\,NaOH(s\ or\ aq)\ +\ MgSO_3(aq)\ +\ 2\,NaCl(aq) \longrightarrow$
$\qquad\qquad 2\,NaCl(aq)\ +\ Na_2SO_3(aq)\ +\ Mg(OH)_2(s)$ $Na_2CO_3(s\ or\ aq)\ +\ MgSO_3(aq)\ +\ 2\,NaCl(aq) \longrightarrow$
$\qquad\qquad 2\,NaCl(aq)\ +\ Na_2SO_3(aq)\ +\ MgCO_3(s)$ $2\,NaCl(aq)\ +\ Na_2SO_3(aq)\ +\ Mg(OH)_2(s) \longrightarrow$
$\qquad [2\,NaCl(aq)\ +\ Na_2SO_3(aq)](separate)\ +\ Mg(OH)_2(s)(separate)$ $2\,NaCl(aq)\ +\ Na_2SO_3(aq)\ +\ MgCO_3(s) \longrightarrow$
$\qquad [2\,NaCl(aq)\ +\ Na_2SO_3(aq)](separate)\ +\ MgCO_3(s)(separate)$ $2\,NaCl(aq)\ +\ Na_2SO_3(aq) \longrightarrow 2\,NaCl(aq)(separate)\ +$
$\qquad\qquad\qquad Na_2SO_3(aq)(separate)$ For Example: Using nanofiltration to separate at least a portion of $Na_2SO_3(aq)(separate)$ (5) At least partially decomposing at least a portion of a material comprising an alkaline earth sulfite to form, for example, an at least a portion of a material comprising an alkaline earth oxide and/or at least a portion of a gas or fluid or chemical comprising sulfur dioxide.

For example, may include, but is not limited to, one or more or any combination of the following:

• Alkaline Earth - Sulfite → Alkaline Earth - Oxide + Sulfur Dioxide
• Alkaline Earth - Sulfite(s) → Alkaline Earth - Oxide(s) + Sulfur Dioxide(g)
• $MgSO_3 \rightarrow MgO + SO_2$
• $MgSO_3(s) \rightarrow MgO(s) + SO_2(g)$ Note: In some embodiments, MgO may comprise a product.

(6) At least a portion of a solution comprising sodium chloride may be at least partially transformed into chlor-alkali products using an electrochemical cell or process. For example, at least a portion of a salt comprising sodium chloride may be transformed by one or more or any combination of the following:

For example, may include, but is not limited to, one or more or any combination of the following:

$2\,NaCl(aq) + H_2O(1) \rightarrow 2\,NaOH(aq) + 2\,HCl(g\ or\ aq)$
$2\,NaCl(aq) + H_2O(1) \rightarrow 2\,NaOH(aq) + 2\,H_2(g) + 2\,Cl(g)$
$2\,H_2(g) + 2\,Cl(g) \rightarrow 2\,HCl(g\ or\ aq)$ Example Embodiment 2: Producing a chemical comprising NaOH from a chemical comprising $Na_2SO_4$ with Halide Intermediate, a process which may comprise, for example, including, but not limited to, one or more or any combination of the following:

(1) Reacting a Material Comprising an Alkaline Earth with an Acid:

For example, may include, but is not limited to, one or more or any combination of the following:

$Ca(Weak\ Acid\ Anion)(s)\ +\ HCl(g\ or\ aq) \longrightarrow CaCl_2(aq)\ +$
$\qquad\qquad\qquad Weak\ Acid\ Derivative$ $Calcium\ Silicate\ +\ HCl(g\ or\ aq) \longrightarrow CaCl_2(aq)\ +$
$\qquad\qquad\qquad Silicon\ Oxide\ Derivative$ $CaCO_3(s)\ +\ HCl(g\ or\ aq) \longrightarrow CaCl_2(aq)\ +\ CO_2(g)$ (2) At least partially reacting at least a portion of a solution comprising dissolved or aqueous phase alkaline earth—acid anion with at least a portion of a salt or solid or solution comprising an alkali sulfate to form, for example, at least a portion of an alkali—acid anion salt and/or at least a portion of an alkaline earth sulfate.

For example, may include, but is not limited to, one or more or any combination of the following:

• Alkali Sulfate + Alkaline Earth - Anion → Alkali - Anion + Alkaline Earth Sulfate
• Alkali Sulfate(s or aq) + Alkaline Earth - Anion(aq) → Alkali - Anion(aq) + Alkaline Earth Sulfate(s)
• $Na_2SO_4 + Ca(Anion)_2 \rightarrow 2\,Na(anion) + CaSO_4$
• $Na_2SO_4(s\ or\ aq) + Ca(Anion)_2(aq) \rightarrow 2\,Na(anion)(aq) + CaSO_4(s\ or\ aq)$
• $Na_2SO_4 + CaCl_2 \rightarrow 2\,NaCl + CaSO_4$
• $Na_2SO_4(s\ or\ aq) + CaCl_2(aq) \rightarrow 2\,NaCl(aq) + CaSO_4(aq)$
• $Na_2SO_4(s\ or\ aq) + CaCl_2(aq) \rightarrow 2\,NaCl(aq) + CaSO_4(s\ or\ aq)$
• $Na_2SO_4(s\ or\ aq) + CaCl_2(aq) \rightarrow 2\,NaCl(aq) + CaSO_4(s)$
• $Na_2SO_4(s\ or\ aq) + CaCl_2(aq) \rightarrow 2\,NaCl(aq) + CaSO_4(s\ or\ aq)$ (2—Separation) At least partially separate at least a portion of an alkaline earth sulfate from, for example, at least a portion of an alkali-anion salt employing, for example, a solid-liquid separation:

For example, may include, but is not limited to, one or more or any combination of the following:

$Alkali\ -\ Anion\ +\ Alkaline\ Earth\ -\ Sulfate \longrightarrow Alkali\ -$
$Anion(at\ least\ partially\ separated)\ +\ Alkaline\ Earth\ -$
$\qquad\qquad Sulfate(at\ least\ partially\ separated)$ $Alkali\ -\ Anion(aq)\ +\ Alkaline\ Earth\ -\ Sulfate(s) \longrightarrow Alkali\ -$
$Anion(aq)(at\ least\ partially\ separated)\ +\ Alkaline\ Earth\ -$
$\qquad\qquad Sulfate(s)(at\ least\ partially\ separated)$ $2\ Na(Anion)\ +\ CaSO_4 \longrightarrow 2$
$Na(Anion)(at\ least\ partially\ separated)\ +$
$\qquad\qquad CaSO_4(at\ least\ partially\ separated)$ $2\ Na(Anion)(aq)\ +\ CaSO_4(s) \longrightarrow 2$
$Na(Anion)(aq)(at\ least\ partially\ separated)\ +$
$\qquad\qquad CaSO_4(at\ least\ partially\ separated)$ $2\ NaCl\ +\ CaSO_4 \longrightarrow 2\ NaCl\ (at\ least\ partially\ separated)\ +$
$\qquad\qquad CaSO_4(at\ least\ partially\ separated)$ -continued $2 \ NaCl(aq) \ + \ CaSO_4(s) \longrightarrow 2$ $NaCl(aq)(\text{at least partially separated}) \ +$ $CaSO_4(s)(\text{at least partially separated})$ $2 \ NaCl(aq) \ + \ CaSO_4(aq) \longrightarrow 2$ $NaCl(aq)(\text{at least partially separated}) \ +$ $CaSO_4(aq)(\text{at least partially separated})$ $2 \ NaCl(aq) \ + \ CaSO_4(s \ or \ aq) \longrightarrow 2$ $NaCl(aq)(\text{at least partially separated}) \ +$ $CaSO_4(s \ or \ aq)(\text{at least partially separated})$ (2—Reaction or Treatment for Separation) At least partially add or react at least a portion of an alkali carbonate, or hydroxide, or sulfite, or sulfide, or a salt of with an anion which may form a low solubility salt with an alkaline earth, or any combination thereof to or with the solution comprising at least a portion of an alkali-anion salt to react with at least a portion of any residual alkaline-earth to form, for example, at least a portion of a precipitate or solid comprising an alkaline-earth:

For example, may include, but is not limited to, one or more or any combination of the following:

$Alkali\text{-}Anion \ Salt \ + \ Alkaline \ Earth\text{-}Sulfate \ +$ $Alkali\text{-}(\text{Anion which forms low solubility in salt with an alkaline earth}) \longrightarrow$ $Alkali\text{-}Anion \ Salt \ + \ Alkali\text{-}Sulfate \ +$ $Alkaline \ Earth\text{-}(\text{Anion which forms low solubility in salt with an alkaline earth})$ $Alkali\text{-}Anion \ Salt(aq) \ + \ Alkaline \ Earth\text{-}Sulfate(aq) \ +$ $Alkali\text{-}(\text{Anion which forms low solubility in salt with an alkaline earth})(aq) \longrightarrow$ $Alkali\text{-}Anion \ Salt(aq) \ + \ Alkali\text{-}Sulfate(aq) \ +$ $Alkaline \ Earth\text{-}(\text{Anion which forms low solubility in salt with an alkaline earth})(s)$ $2 \ Na(Anion) \ + \ CaSO_4 \ + \ Na_2CO_3 \longrightarrow$ $2 \ Na(Anion) \ + \ Na_2SO_4 \ + \ CaCO_3$ $2 \ Na(Anion) \ + \ CaSO_4 \ + \ Na_2SO_3 \longrightarrow$ $2 \ Na(Anion) \ + \ Na_2SO_4 \ + \ CaSO_3$ $2 \ Na(Anion) \ + \ CaSO_4 \ + \ 2 \ NaHCO_3 \longrightarrow$ $2 \ Na(Anion) \ + \ Na_2SO_4 \ + \ CaCO_3 \ + \ CO_2$ $2 \ Na(Anion) \ + \ CaSO_4 \ + \ Na_2S \longrightarrow$ $2 \ Na(Anion) \ + \ Na_2SO_4 \ + \ CaS$ $2 \ NaCl \ + \ CaSO_4 \ + \ Na_2CO_3 \longrightarrow$ $2 \ NaCl \ + \ Na_2SO_4 \ + \ CaCO_3$ $2 \ NaCl \ + \ CaSO_4 \ + \ Na_2SO_3 \longrightarrow$ $2 \ NaCl \ + \ Na_2SO_4 \ + \ CaSO_3$ $2 \ NaCl \ + \ CaSO_4 \ + \ 2 \ NaHCO_3 \longrightarrow$ $2 \ NaCl \ + \ Na_2SO_4 \ + \ CaCO_3 \ + \ CO_2$ -continued $2 \ NaCl \ + \ CaSO_4 \ + \ Na_2S \longrightarrow$ $2 \ NaCl \ + \ Na_2SO_4 \ + \ CaS$ $2 \ Na(Anion)(aq) \ + \ CaSO_4(aq) \ + \ Na_2CO_3(s \ or \ aq) \longrightarrow$ $2 \ Na(Anion)(aq) \ + \ Na_2SO_4(aq) \ + \ CaCO_3(s)$ $2 \ Na(Anion)(aq) \ + \ CaSO_4(aq) \ + \ Na_2SO_3(s \ or \ aq) \longrightarrow$ $2 \ Na(Anion)(aq) \ + \ Na_2SO_4(aq) \ + \ CaSO_3(s)$ $2 \ Na(Anion)(aq) \ + \ CaSO_4(aq) \ + \ 2 \ NaHCO_3(s \ or \ aq) \longrightarrow$ $2 \ Na(Anion)(aq) \ + \ Na_2SO_4(aq) \ + \ CaCO_3(s) \ + \ CO_2(g)$ $2 \ Na(Anion)(aq) \ + \ CaSO_4(aq) \ + \ Na_2S(s \ or \ aq) \longrightarrow$ $2 \ Na(Anion)(aq) \ + \ Na_2SO_4(aq) \ + \ CaS(s)$ $2 \ NaCl(aq) \ + \ CaSO_4(aq) \ + \ Na_2CO_3(s \ or \ aq) \longrightarrow$ $2 \ NaCl(aq) \ + \ Na_2SO_4(aq) \ + \ CaCO_3(s)$ $2 \ NaCl(aq) \ + \ CaSO_4(aq) \ + \ Na_2SO_3(aq) \longrightarrow$ $2 \ NaCl(aq) \ + \ Na_2SO_4(aq) \ + \ CaSO_3(s)$ $2 \ NaCl(aq) \ + \ CaSO_4(aq) \ + \ 2 \ NaHCO_3(s \ or \ aq) \longrightarrow$ $2 \ NaCl(aq) \ + \ Na_2SO_4(aq) \ + \ CaCO_3(s) \ + \ CO_2(g)$ $2 \ NaCl(aq) \ + \ CaSO_4(aq) \ + \ Na_2S(s \ or \ aq) \longrightarrow$ $2 \ NaCl(aq) \ + \ Na_2SO_4(aq) \ + \ CaS(s)$ Note: In some embodiments, calcium carbonate or calcium sulfite produced and/or separated may be transferred to a process step which may employ calcium carbonate or calcium sulfite.

(2—Separation of Precipitate) At least partially separating at least a portion of any precipitate or solid comprising an alkaline-earth employing, for example, a solid-liquid separation:

For example, may include, but is not limited to, one or more or any combination of the following:

$Alkali \ - \ Anion \ Salt \ + \ Alkali \ Sulfate \ +$ $[Alkaline\text{-}Earth \ - \ Low \ Solubility \ Anion] \longrightarrow$ $Alkali \ - \ Anion \ Salt \ + \ Alkali \ Sulfate \ +$ $[Alkaline\text{-}Earth \ - \ Low \ Solubility \ Anion](\text{at least partially separated})$ $Alkali \ - \ Anion \ Salt(aq) \ + \ Alkali \ Sulfate(aq) \ +$ $[Alkaline\text{-}Earth \ - \ Low \ Solubility \ Anion](s) \longrightarrow$ $Alkali \ - \ Anion \ Salt(aq) \ + \ Alkali \ Sulfate(aq) \ +$ $[Alkaline\text{-}Earth \ - \ Low \ Solubility \ Anion](s)(\text{at least partially separated})$ $2 \ Na(Anion)(aq) \ + \ Na_2SO_4(aq) \ + \ CaCO_3(s) \longrightarrow$ $2 \ Na(Anion)(aq) \ + \ Na_2SO_4(aq) \ +$ $CaCO_3(s)(\text{at least partially separated})$ $2 \ Na(Anion)(aq) \ + \ Na_2SO_4(aq) \ + \ CaSO_3(s) \longrightarrow$ $2 \ Na(Anion)(aq) \ + \ Na_2SO_4(aq) \ +$ $CaSO_3(s)(\text{at least partially separated})$ $2 \ Na(Anion)(aq) \ + \ Na_2SO_4(aq) \ + \ CaCO_3(s) \ + \ CO_2(g) \longrightarrow$ $2 \ Na(Anion)(aq) \ + \ Na_2SO_4(aq) \ +$ $CaSO_3(s)(\text{at least partially separated})$ -continued 2 Na(Anion)(aq) + Na$_2$SO$_4$(aq) + CaS(s) $\longrightarrow$ 2 Na(Anion)(aq) + Na$_2$SO$_4$(aq) +

CaSO$_3$(s)(at least partially separated)

2 NaCl(aq) + Na$_2$SO$_4$(aq) + CaCO$_3$(s) $\longrightarrow$

2 NaCl(aq) + Na$_2$SO$_4$(aq) + CaSO$_3$(s)(at least partially separated)

2 NaCl(aq) + Na$_2$SO$_4$(aq) + CaSO$_3$(s) $\longrightarrow$

2 NaCl(aq) + Na$_2$SO$_4$(aq) + CaSO$_3$(s)(at least partially separated)

2 NaCl(aq) + Na$_2$SO$_4$(aq) + CaCO$_3$(s) + CO$_2$(g) $\longrightarrow$

2 NaCl(aq) + Na$_2$SO$_4$(aq) + CaSO$_3$(s)(at least partially separated)

2 NaCl(aq) + Na$_2$SO$_4$(aq) + CaS(s) $\longrightarrow$

2 NaCl(aq) + Na$_2$SO$_4$(aq) + CaSO$_3$(s)(at least partially separated)

(2—Separation) At least partially separate at least a portion of divalent salts, or divalent ions, or multivalent ions, or heavy metal salts, or impurities, or any combination thereof from, for example, at least a portion of an alkali-anion salt or alkali-monovalent anion salt employing, for example, nanofiltration:

For example, may include, but is not limited to, one or more or any combination of the following:

Alkali-Anion Salt + [Heavy Metal Impurities, and/or Divalent Ions and/or Multivalent Ions and/or Other Impurities] $\longrightarrow$

[Separate Permeate comprising Alkali-Anion Salt] +

[Separate Retentate comprising (Heavy Metal Impurities, and/or Divalent Ions and/or Multivalent Ions and/or Other Impurities) and/or Alkali Sulfate]

2 Na(Anion) + [Heavy Metal Impurities, and/or Divalent Ions and/or Multivalent Ions and/or Other Impurities] $\longrightarrow$

[Separate Permeate comprising 2Na(Anion)] +

[Separate Retentate comprising (Heavy Metal Impurities, and/or Divalent Ions and/or Multivalent Ions and/or Other Impurities) and/or Na$_2$SO$_4$]

2 Na(Anion) + Na$_2$SO$_4$ + [Heavy Metal Impurities, and/or Divalent Ions and/or Multivalent Ions and/or Other Impurities] $\longrightarrow$

[Separate Permeate comprising 2Na(Anion)] +

[Separate Retentate comprising (Heavy Metal Impurities, and/or Divalent Ions and/or Multivalent Ions and/or Other Impurities) and/or Na$_2$SO$_4$]

2 Na(Anion)(aq) + Na$_2$SO$_4$(aq) + [Heavy Metal Impurities, and/or Divalent Ions and/or Multivalent Ions and/or Other Impurities](aq) $\longrightarrow$

[Separate Permeate comprising 2Na(Anion)](aq) +

[Separate Retentate comprising (Heavy Metal Impurities, and/or Divalent Ions and/or Multivalent Ions and/or Other Impurities) and/or Na$_2$SO$_4$](aq)

2 NaCl + [Heavy Metal Impurities, and/or Divalent Ions and/or Multivalent Ions and/or Other Impurities] $\longrightarrow$

[Separate Permeate comprising 2NaCl] +

[Separate Retentate comprising (Heavy Metal Impurities, and/or Divalent Ions and/or Multivalent Ions and/or Other Impurities) and/or Na$_2$SO$_4$]

-continued

2 NaCl + Na$_2$SO$_4$ + [Heavy Metal Impurities, and/or Divalent Ions and/or Multivalent Ions and/or Other Impurities] $\longrightarrow$

[Separate Permeate comprising 2NaCl] +

[Separate Retentate comprising (Heavy Metal Impurities, and/or Divalent Ions and/or Multivalent Ions and/or Other Impurities) and/or Na$_2$SO$_4$]

2 NaCl(aq) + Na$_2$SO$_4$(aq) + [Heavy Metal Impurities, and/or Divalent Ions and/or Multivalent Ions and/or Other Impurities](aq) $\longrightarrow$

[Separate Permeate comprising 2NaCl](aq) +

[Separate Retentate comprising (Heavy Metal Impurities, and/or Divalent Ions and/or Multivalent Ions and/or Other Impurities) and/or Na$_2$SO$_4$](aq)

Note: In some embodiments, a nanofiltration process may form at least a portion of a retentate comprising at least a portion of divalent salts, or divalent ions, or multivalent ions, or heavy metal salts, or impurities, or any combination thereof and/or a permeate comprising a solution comprising alkali—anion salt or alkali—monovalent anion salt.

(3) A solution comprising sodium chloride may be transformed into chlor-alkali products using an electrochemical cell or process or electrochemistry. For example, sodium chloride may be transformed by one or more or any combination of the following:

For example, may include, but is not limited to, one or more or any combination of the following:

2 NaCl(aq) + H$_2$O(l) $\rightarrow$ 2 NaOH(aq) + 2 HCl(aq)

2 NaCl(aq) + H$_2$O(l) $\rightarrow$ 2 NaOH(aq) + 2 H$_2$(g) + 2 Cl(g)

2 H$_2$(g) + 2 Cl(g) $\rightarrow$ 2 HCl(g or aq)

Example Embodiment 3: Producing NaOH from Na$_2$SO$_4$ with Anion Intermediate, a process which may comprise, for example, including, but not limited to, one or more or any combination of the following:

For example, may include, but is not limited to, one or more or any combination of the following:

Reacting a material comprising an alkaline earth with an acid to form a solution comprising dissolved or aqueous phase calcium—acid anion:

For example, may include, but is not limited to, one or more or any combination of the following:

Ca(Weak Acid Anion)(s) + Anion Acid(g or aq) $\longrightarrow$

Ca(Anion)(aq) + Weak Acid Derivative

CaCO$_3$(s) + 2CH$_3$COOH(aq) $\longrightarrow$ Ca(CH$_3$COO)$_2$(aq) + CO$_2$(g)

Reacting a solution or solid comprising an at least partially soluble alkaline earth—acid anion salt with a chemical comprising alkali sulfate to form a portion of a chemical comprising an alkaline earth sulfate and/or a portion of a solution comprising alkali—anion salt.

For example, may include, but is not limited to, one or more or any combination of the following:

$$Na_2SO_4(\text{s or aq}) + Ca(Anion) \rightarrow 2\ Na(Anion)(aq) + CaSO_4(s)$$
$$Na_2SO_4(\text{s or aq}) + Ca(Anion) \rightarrow Na_2(Anion)(aq) + CaSO_4(s)$$
$$Na_2SO_4(\text{s or aq}) + Ca(CH_3COO)_2(aq) \rightarrow 2\ NaCH_3COO(aq) + CaSO_4(s)$$

A solution comprising alkali—anion may be transformed into products using an electrochemical process. For example, a chemical comprising alkali—anion may be transformed by, including, but not limited to, one or more or any combination of the following:

For example, may include, but is not limited to, one or more or any combination of the following:

- $2\ Alkali(Anion)(aq) + H_2O(l) \rightarrow 2\ Alkali(OH)(aq) + 2\ Anion\ Acid(g\ or\ l\ or\ aq)$
- $2\ Na(Anion)(aq) + H_2O(l) \rightarrow 2\ NaOH(aq) + 2\ Anion\ Acid(g\ or\ l\ or\ aq)$
- $2\ Na(Anion)(aq) + H_2O(l) \rightarrow 2\ NaOH(aq) + 2\ Anion\ Acid(g\ or\ l\ or\ aq)$
- $2\ NaCH_3COO(aq) + H_2O(l) \rightarrow 2\ NaOH(aq) + 2\ CH_3COO(aq\ or\ g)$
- $2\ NaCH_3COO(aq) + H_2O(l) \rightarrow 2\ NaOH(aq) + 2\ H_2(g) + 2\ CH_3COO(aq\ or\ g)$
- $2\ Na_2SO_3(aq) + H_2O(l) \rightarrow 2\ NaOH(aq) + 2\ SO_2(aq\ or\ g)$
- $2\ Na_2SO_3(aq) + H_2O(l) \rightarrow 2\ NaOH(aq) + 2\ H_2(g) + 2\ SO_2(aq\ or\ g)$ Example Embodiment 4: Producing NaOH from $Na_2SO_4$ with Anion Intermediate and Sulfur Dioxide, a process which may comprise, for example, including, but not limited to, one or more or any combination of the following:

For example, may include, but is not limited to, one or more or any combination of the following:

Reacting a material comprising calcium with an acid to form a solution comprising dissolved or aqueous phase calcium—acid anion:

$$Ca(\text{Weak Acid Anion})(s) + \text{Anion Acid (g or aq)} \longrightarrow$$
$$Ca(Anion)(aq) + \text{Weak Acid Derivative}$$
$$CaCO_3(s) + 2\ CH_3COOH(aq) \longrightarrow Ca(CH_3COO)_2(aq) + CO_2(g)$$

Reacting a solution or solid comprising an at least partially soluble calcium—acid anion salt with a solid or solution comprising sodium sulfate to form at least a portion of a precipitate comprising calcium sulfate and/or at least a portion of a solution comprising sodium—anion salt.

$$Na_2SO_4(\text{s or aq}) + Ca(Anion) \rightarrow 2\ Na(Anion)(aq) + CaSO_4(s)$$
$$Na_2SO_4(\text{s or aq}) + Ca(Anion) \rightarrow 2\ Na_2(Anion)(aq) + CaSO_4(s)$$
$$Na_2SO_4(\text{s or aq}) + Ca(CH_3COO)_2(aq) \rightarrow 2\ NaCH_3COO(aq) + CaSO_4(s)$$

React at least a portion of sodium—anion with at least a portion of sulfur dioxide to form at least a portion of sodium sulfite or sodium bisulfite.

$$2\ Na(Anion) + SO_2 \rightarrow Na_2SO_3 + Anion\ Acid$$
$$2\ NaCH_3COO(aq) + SO_2(\text{g or aq}) \rightarrow Na_2SO_3(aq) + CH_3COOH(aq)$$

A solution comprising sodium-anion may be transformed into at least a portion of a valuable or desirable chemical using, for example, an electrochemical cell or process or electrochemistry. For example, a chemical comprising sodium sulfite may be transformed by one or more or any combination of the following:

$$Na_2SO_3(aq) + H_2O(l) \rightarrow 2\ NaOH(aq) + 2\ H_2(g) + 2\ SO_2(aq\ or\ g)$$
$$Na_2SO_3(aq) + H_2O(l) \rightarrow 2\ NaOH(aq) + H_2SO_3(aq\ or\ g)$$

Example Embodiment 5: Producing NaOH from $Na_2SO_4$, while producing magnesium oxide and hydrogen chloride or chloride or hydrochloric acid, a process which may comprise, for example, including, but not limited to, one or more or any combination of the following:

(1) At least partially reacting at least a portion of a material comprising an alkaline earth—weak acid anion with at least a portion of a chemical comprising an acid to form at least a portion of a solution comprising dissolved or aqueous phase alkaline earth—acid anion and a gas or solid or solution or liquid comprising a weak acid derivative:

For example, may include, but is not limited to, one or more or any combination of the following:

$$\text{Alkaline Earth - Weak Acid Anion} + \text{Anion Acid} \rightarrow \text{Alkaline Earth -}$$
$$\text{Anion} + \text{Weak Acid Anion Derivative}$$
$$\text{Alkaline Earth - Weak Acid Anion}(s) + \text{Anion Acid}(aq\ or\ g\ or\ l) \rightarrow$$
$$\text{Alkaline Earth - Anion}(aq) +$$
$$\text{Weak Acid Anion Derivative (g or s or l or aq)}$$
$$Ca(\text{Weak Acid Anion}) + \text{Anion Acid} \rightarrow Ca(Anion) + \text{Weak Acid Derivative}$$
$$Ca(\text{Weak Acid Anion})(s) + \text{Anion Acid}(\text{g or aq}) \rightarrow Ca(Anion)(aq) +$$
$$\text{Weak Acid Derivative(g or aq or s)}$$
$$CaCO_3 + 2\ CH_3COOH \rightarrow Ca(CH_3COO)_2 + CO_2$$
$$CaCO_3(s) + 2\ CH_3COOH(aq) \rightarrow Ca(CH_3COO)_2(aq) + CO_2(g)$$
$$CaCO_3(s) + 2\ CH_2OO(aq) \rightarrow Ca(CHOO)_2(aq) + CO_2(g)$$

(2) At least partially reacting at least a portion of a solution comprising dissolved or aqueous phase alkaline earth—acid anion with at least a portion of a salt or solid or solution comprising an alkali sulfate to form, for example, at least a portion of an alkali—acid anion salt and/or at least a portion of an alkaline earth sulfate.

For example, may include, but is not limited to, one or more or any combination of the following:

$$\text{Alkali Sulfate} + \text{Alkaline Earth-Anion} \longrightarrow + \text{Alkali-Anion} +$$
$$\text{Alkaline Earth Sulfate}$$
$$\text{Alkali Sulfate}(\text{s or aq}) + \text{Alkaline Earth-Anion}(aq) \longrightarrow$$
$$\text{Alkali-Anion}(aq) + \text{Alkaline Earth Sulfate}(s)$$
$$Na_2SO_4 + Ca(Anion)_2 \longrightarrow 2\ Na(Anion) + CaSO_4$$
$$Na_2SO_4\ (\text{s or aq}) + Ca(Anion)_2(aq) \longrightarrow$$
$$2\ Na(Anion)(aq) + CaSO_4(\text{s or aq})$$
$$Na_2SO_4 + Ca(CH_3COO)_2 \longrightarrow 2\ NaCH_3COO + CaSO_4$$

-continued $$Na_2SO_4(s\ or\ aq)\ +\ Ca(CH_3COO)_2(aq)\ \longrightarrow\ 2\ NaCH_3COO(aq)\ +\ CaSO_4(aq)$$

$$Na_2SO_4\ (s\ or\ aq)\ +\ Ca(CH_3COO)_2(aq)\ \longrightarrow\ 2\ NaCH_3COO(aq)\ +\ CaSO_4(s\ or\ aq)$$

$$Na_2SO_4\ (s\ or\ aq)\ +\ Ca(CH_2OO)_2(aq)\ \longrightarrow\ 2\ NaCH_2OO(aq)\ +\ CaSO_4(s)$$

$$Na_2SO_4\ (s\ or\ aq)\ +\ Ca(CH_3COO)_2(aq)\ \longrightarrow\ 2\ NaCH_3COO(aq)\ +\ CaSO_4(s\ or\ aq)$$

(2—Separation) At least partially separate at least a portion of an alkaline earth sulfate from, for example, at least a portion of an alkali—anion salt employing, for example, a solid-liquid separation:

For example, may include, but is not limited to, one or more or any combination of the following:

$$Alkali\text{-}Anion\ +\ Alkaline\ Earth\text{-}Sulfate\ \longrightarrow\ Alkali\text{-}Anion(at\ least\ partially\ separated)\ +\ Alkaline\ Earth\text{-}Sulfate(at\ least\ partially\ separated)$$

$$Alkali\text{-}Anion(aq)\ +\ Alkaline\ Earth\text{-}Sulfate(s)\ \longrightarrow\ Alkali\text{-}Anion(aq)(at\ least\ partially\ separated)\ +\ Alkaline\ Earth\text{-}Sulfate(s)(at\ least\ partially\ separated)$$

$$2\ Na(Anion)\ +\ CaSO_4\ \longrightarrow\ 2\ Na(Anion)(at\ least\ partially\ separated)\ +\ CaSO_4(at\ least\ partially\ separated)$$

$$2\ Na(Anion)(aq)\ +\ CaSO_4(s)\ \longrightarrow\ 2\ Na(Anion)(aq)(at\ least\ partially\ separated)\ +\ CaSO_4(s)(at\ least\ partially\ separated)$$

$$2\ NaCH_3COO\ +\ CaSO_4\ \longrightarrow\ 2\ NaCH_3COO)(at\ least\ partially\ separated)\ +\ CaSO_4(at\ least\ partially\ separated)$$

$$2\ NaCH_3COO(aq)\ +\ CaSO_4(s)\ \longrightarrow\ 2\ NaCH_3COO(aq)(at\ least\ partially\ separated)\ +\ CaSO_4(s)(at\ least\ partially\ separated)$$

$$2\ NaCH_3COO(aq)\ +\ CaSO_4(s\ or\ aq)\ \longrightarrow\ 2\ NaCH_3COO(aq)(at\ least\ partially\ separated)\ +\ CaSO_4(s\ or\ aq)(at\ least\ partially\ separated)$$

$$2\ NaCH_2OO(aq)\ +\ CaSO_4(s)\ \longrightarrow\ 2\ NaCH_2OO(aq)(at\ least\ partially\ separated)\ +\ CaSO_4(s)(at\ least\ partially\ separated)$$

$$Na_2SO_4(s\ or\ aq)\ +\ Ca(CH_3COO)_2(aq)\ \longrightarrow\ 2\ NaCH_3COO(aq)(at\ least\ partially\ separated)\ +\ CaSO_4(s\ or\ aq)(at\ least\ partially\ separated)$$

(2—Reaction or Treatment for Separation) At least partially add or react at least a portion of an alkali carbonate, or hydroxide, or sulfite, or sulfide, or a salt of with an anion which may form a low solubility salt with an alkaline earth, or any combination thereof to or with the solution comprising at least a portion of an alkali—anion salt to react with at least a portion of any residual alkaline-earth to form, for example, at least a portion of a precipitate or solid comprising an alkaline-earth:

For example, may include, but is not limited to, one or more or any combination of the following:

$$Alkali\ \text{-}\ Anion\ Salt\ +\ Alkaline\ Earth\ \text{-}\ Sulfate\ +\ Alkali\ \text{-}\ (Anion\ which\ forms\ low\ solubility\ in\ salt\ with\ an\ alkaline\ earth)\ \longrightarrow$$
$$Alkali\ \text{-}\ Anion\ Salt\ +\ Alkali\ \text{-}\ Sulfate\ +\ Alkaline\ Earth\ \text{-}\ (Anion\ which\ forms\ low\ solubility\ in\ salt\ with\ an\ alkaline\ earth)$$

$$Alkali\ \text{-}\ Anion\ Salt(aq)\ +\ Alkaline\ Earth\ \text{-}\ Sulfate(aq)\ +\ Alkali\ \text{-}\ (Anion\ which\ forms\ low\ solubility\ in\ salt\ with\ an\ alkaline\ earth)(aq)\ \longrightarrow$$
$$Alkali\ \text{-}\ Anion\ Salt(aq)\ +\ Alkali\ \text{-}\ Sulfate(aq)\ +\ Alkaline\ Earth\ \text{-}\ (Anion\ which\ forms\ low\ solubility\ in\ salt\ with\ an\ alkaline\ earth)(s)$$

$$2\ Na(Anion)\ +\ CaSO_4\ +\ Na_2CO_3\ \longrightarrow\ 2\ Na(Anion)\ +\ Na_2SO_4\ +\ CaCO_3$$

$$2\ Na(Anion)\ +\ CaSO_4\ +\ Na_2SO_3\ \longrightarrow\ 2\ Na(Anion)\ +\ Na_2SO_4\ +\ CaSO_3$$

$$2\ Na(Anion)\ +\ CaSO_4\ +\ 2\ NaHCO_3\ \longrightarrow\ 2\ Na(Anion)\ +\ Na_2SO_4\ +\ CaCO_3\ +\ CO_2$$

$$2\ Na(Anion)\ +\ CaSO_4\ +\ Na_2S\ \longrightarrow\ 2\ Na(Anion)\ +\ Na_2SO_4\ +\ CaS$$

$$2\ NaCH_3COO\ +\ CaSO_4\ +\ Na_2CO_3\ \longrightarrow\ 2\ NaCH_3COO\ +\ Na_2SO_4\ +\ CaCO_3$$

$$2\ NaCH_3COO\ +\ CaSO_4\ +\ Na_2CO_3\ \longrightarrow\ 2\ NaCH_3COO\ +\ Na_2SO_4\ +\ CaSO_3$$

$$2\ NaCH_3COO\ +\ CaSO_4\ +\ 2\ NaHCO_3\ \longrightarrow\ 2\ NaCH_3COO\ +\ Na_2SO_4\ +\ CaCO_3\ +\ CO_2$$

$$2\ NaCH_3COO\ +\ CaSO_4\ +\ Na_2S\ \longrightarrow\ 2\ NaCH_3COO\ +\ Na_2SO_4\ +\ CaS$$

$$2\ Na(Anion)(aq)\ +\ CaSO_4(aq)\ +\ Na_2CO_3(s\ or\ aq)\ \longrightarrow\ 2\ Na(Anion)(aq)\ +\ Na_2SO_4(aq)\ +\ CaCO_3(s)$$

$$2\ Na(Anion)(aq)\ +\ CaSO_4(aq)\ +\ Na_2SO_3(s\ or\ aq)\ \longrightarrow\ 2\ Na(Anion)(aq)\ +\ Na_2SO_4(aq)\ +\ CaSO_3(s)$$

$$2\ Na(Anion)(aq)\ +\ CaSO_4(aq)\ +\ 2\ NaHCO_3(s\ or\ aq)\ \longrightarrow\ 2\ Na(Anion)(aq)\ +\ Na_2SO_4(aq)\ +\ CaCO_3(s)\ +\ CO_2(g)$$

$$2\ Na(Anion)(aq)\ +\ CaSO_4(aq)\ +\ Na_2S(s\ or\ aq)\ \longrightarrow\ 2\ Na(Anion)(aq)\ +\ Na_2SO_4(aq)\ +\ CaS(s)$$

$$2\ NaCH_3COO(aq)\ +\ CaSO_4(aq)\ +\ Na_2CO_3(s\ or\ aq)\ \longrightarrow\ 2\ NaCH_3COO(aq)\ +\ Na_2SO_4(aq)\ +\ CaCO_3(s)$$

-continued $2\,NaCH_3COO(aq) + CaSO_4(aq) + Na_2SO_3(aq) \longrightarrow$ $\qquad 2\,NaCH_3COO(aq) + Na_2SO_4(aq) + CaSO_3(s)$ $2\,NaCH_3COO(aq) + CaSO_4(aq) + 2\,NaHCO_3(s\ or\ aq) \longrightarrow$ $\qquad 2\,NaCH_3COO(aq) + Na_2SO_4(aq) + CaCO_3(s) + CO_2(g)$ $2\,NaCH_3COO(aq) + CaSO_4(aq) + Na_2S(s\ or\ aq) \longrightarrow$ $\qquad 2\,NaCH_3COO(aq) + Na_2SO_4(aq) + CaS(s)$ Note: In some embodiments, calcium carbonate or calcium sulfite produced and/or separated may be transferred to a process step which may employ calcium carbonate or calcium sulfite.

(2—Separation of Precipitate) At least partially separating at least a portion of any precipitate or solid comprising an alkaline-earth employing, for example, a solid-liquid separation:

For example, may include, but is not limited to, one or more or any combination of the following:

$Alkali\ -\ Anion\ Salt + Alkali\ Sulfate +$ $\qquad [Alkaline\text{-}Earth\ -\ Low\ Solubility\ Anion] \longrightarrow$ $\qquad\quad Alkali\ -\ Anion\ Salt + Alkali\ Sulfate +$ $\qquad [Alkaline\text{-}Earth\ -\ Low\ Solubility\ Anion](at\ least\ partially\ separated)$ $Alkali\ -\ Anion\ Salt(aq) + Alkali\ Sulfate(aq) +$ $\qquad [Alkaline\text{-}Earth\ -\ Low\ Solubility\ Anion](s) \longrightarrow$ $\qquad\quad Alkali\ -\ Anion\ Salt(aq) + Alkali\ Sulfate(aq) +$ $\qquad [Alkaline\text{-}Earth\ -\ Low\ Solubility\ Anion](s)(at\ least\ partially\ separated)$ $2\,Na(Anion)(aq) + Na_2SO_4(aq) + CaCO_3(s) \longrightarrow$ $\qquad 2\,Na(Anion)(aq) + Na_2SO_4(aq) +$ $\qquad\quad CaCO_3(s)(at\ least\ partially\ separated)$ $2\,Na(Anion)(aq) + Na_2SO_4(aq) + CaSO_3(s) \longrightarrow$ $\qquad 2\,Na(Anion)(aq) + Na_2SO_4(aq) +$ $\qquad\quad CaSO_3(s)(at\ least\ partially\ separated)$ $2\,Na(Anion)(aq) + Na_2SO_4(aq) + CaCO_3(s) + CO_2(g) \longrightarrow$ $\qquad 2\,Na(Anion)(aq) + Na_2SO_4(aq) +$ $\qquad\quad CaSO_3(s)(at\ least\ partially\ separated)$ $2\,Na(Anion)(aq) + Na_2SO_4(aq) + CaS(s) \longrightarrow$ $\qquad 2\,Na(Anion)(aq) + Na_2SO_4(aq) +$ $\qquad\quad CaSO_3(s)(at\ least\ partially\ separated)$ $2\,NaCH_3COO(aq) + Na_2SO_4(aq) + CaCO_3(s) \longrightarrow$ $\qquad 2\,NaCH_3COO(aq) + Na_2SO_4(aq) +$ $\qquad\quad CaSO_3(s)(at\ least\ partially\ separated)$ $2\,NaCH_3COO(aq) + Na_2SO_4(aq) + CaSO_3(s) \longrightarrow$ $\qquad 2\,NaCH_3COO(aq) + Na_2SO_4(aq) +$ $\qquad\quad CaSO_3(s)(at\ least\ partially\ separated)$ $2\,NaCH_3COO(aq) + Na_2SO_4(aq) + CaCO_3(s) + CO_2(g) \longrightarrow$ $\qquad 2\,NaCH_3COO(aq) + Na_2SO_4(aq) +$ $\qquad\quad CaSO_3(s)(at\ least\ partially\ separated)$ -continued $2\,NaCH_3COO(aq) + Na_2SO_4(aq) + CaS(s) \longrightarrow$ $\qquad 2\,NaCH_3COO(aq) + Na_2SO_4(aq) +$ $\qquad\quad CaSO_3(s)(at\ least\ partially\ separated)$ (2—Separation) At least partially separate at least a portion of divalent salts, or divalent ions, or multivalent ions, or heavy metal salts, or impurities, or any combination thereof from, for example, at least a portion of an alkali-anion salt or alkali-monovalent anion salt employing, for example, nanofiltration:

For example, may include, but is not limited to, one or more or any combination of the following:

$Alkali\text{-}Anion\ Salt +$ $\qquad [Heavy\ Metal\ Impurities,\ and/or\ Divalent\ Ions\ and/or\ Multivalent$ $\qquad\qquad Ions\ and/or\ Other\ Impurities] \longrightarrow$ $\qquad [Separate\ Permeate\ comprising\ Alkali\text{-}Anion\ Salt] +$ $\qquad [Separate\ Retentate\ comprising\ (Heavy\ Metal\ Impurities,\ and/or$ $\qquad\quad Divalent\ Ions\ and/or\ Multivalent\ Ions\ and/or\ Other$ $\qquad\qquad\qquad\qquad Impurities)\ and/or\ Alkali\ Sulfate]$ $2\,Na(Anion) +$ $\qquad [Heavy\ Metal\ Impurities,\ and/or\ Divalent\ Ions\ and/or\ Multivalent$ $\qquad\qquad Ions\ and/or\ Other\ Impurities] \longrightarrow$ $\qquad [Separate\ Permeate\ comprising\ 2Na(Anion)] +$ $\qquad [Separate\ Retentate\ comprising\ (Heavy\ Metal\ Impurities,\ and/or$ $\qquad Divalent\ Ions\ and/or\ Multivalent\ Ions\ and/or\ Other\ Impurities)\ and/or$ $\qquad\qquad\qquad\qquad Na_2SO_4]$ $2\,Na(Anion) + Na_2SO_4 +$ $\qquad [Heavy\ Metal\ Impurities,\ and/or\ Divalent\ Ions\ and/or$ $\qquad\quad Multivalent\ Ions\ and/or\ Other\ Impurities] \longrightarrow$ $\qquad [Separate\ Permeate\ comprising\ 2Na(Anion)] +$ $\qquad [Separate\ Retentate\ comprising\ (Heavy\ Metal\ Impurities,\ and/or\ Divalent$ $\qquad Ions\ and/or\ Multivalent\ Ions\ and/orOther\ Impurities)\ and/or\ Na_2SO_4]$ $2\,Na(Anion)(aq) + Na_2SO_4(aq) +$ $\qquad [Heavy\ Metal\ Impurities,\ and/or\ Divalent\ Ions\ and/or$ $\qquad\quad Multivalent\ Ions\ and/or\ Other\ Impurities](aq) \longrightarrow$ $\qquad [Separate\ Permeate\ comprising\ 2Na(Anion)](aq) +$ $\qquad [Separate\ Retentate\ comprising\ (Heavy\ Metal\ Impurities,\ and/or$ $\qquad Divalent\ Ions\ and/or\ Multivalent\ Ions\ and/or\ Other\ Impurities)\ and/or$ $\qquad\qquad\qquad\qquad Na_2SO_4](aq)$ $2\,NaCH_3COO +$ $\qquad [Heavy\ Metal\ Impurities,\ and/or\ Divalent\ Ions\ and/or$ $\qquad\quad Multivalent\ Ions\ and/or\ Other\ Impurities] \longrightarrow$ $\qquad [Separate\ Permeate\ comprising\ 2NaCH_3COO] +$ -continued

[Separate Retentate comprising (Heavy Metal Impurities, and/or

Divalent Ions and/or Multivalent Ions and/or Other Impurities) and/or $$Na_2SO_4]$$

$2\ NaCH_3COO\ +\ Na_2SO_4\ +$

[Heavy Metal Impurities, and/or Divalent Ions and/or

Multivalent Ions and/or Other Impurities] $\longrightarrow$ $2\ NaCH_3COO(aq)\ +\ Na_2SO_4(aq)\ +$

[Heavy Metal Impurities, and/or Divalent Ions and/or

Multivalent Ions and/or Other Impurities](aq) $\longrightarrow$

[Separate Permeate comprising $2NaCH_3COO$](aq) +

[Separate Retentate comprising (Heavy Metal Impurities, and/or

Divalent Ions and/or Multivalent Ions and/or Other Impurities) and/or $$Na_2SO_4](aq)$$

Note: In some embodiments, a nanofiltration process may form at least a portion of a retentate comprising at least a portion of divalent salts, or divalent ions, or multivalent ions, or heavy metal salts, or impurities, or any combination thereof and/or a permeate comprising a solution comprising alkali—anion salt or alkali—monovalent anion salt.

(2—Treatment of Retentate) At least partially add at least a portion of a chemical comprising an acid to at least a portion of the solution comprising a retentate to, for example, react with at least a portion of any residual alkali-anion salt and/or form, for example, at least a portion of anion acid or anion derivative acid:

For example, may include, but is not limited to, one or more or any combination of the following:

[Heavy Metal Impurities, and/or Divalent Ions and/or
Multivalent Ions and/or Other Impurities] $+$ $2\ Na(Anion)\ +\ Acid\ \#2\ \longrightarrow$

[Heavy Metal Impurities, and/or Divalent Ions and/or
Multivalent Ions and/or Other Impurities] $+$ $2\ Na(Acid\ \#2\ Anion)\ +\ Anion\ Acid$

[Heavy Metal Impurities, and/or Divalent Ions and/or
Multivalent Ions and/or Other Impurities] $+$ $2\ Na(Anion)\ +\ Stronger\ Acid\ \longrightarrow$

[Heavy Metal Impurities, and/or Divalent Ions and/or
Multivalent Ions and/or Other Impurities] $+$ $2\ Na(Stronger\ Acid\ Anion)\ +\ Anion\ Acid$

[Heavy Metal Impurities, and/or Divalent Ions and/or
Multivalent Ions and/or Other Impurities](aq) $+$ $2\ Na(Anion)(aq)\ +\ Stronger\ Acid(aq)\ \longrightarrow$

[Heavy Metal Impurities, and/or Divalent Ions and/or
Multivalent Ions and/or Other Impurities](aq) $+$ $2\ Na(Stronger\ Acid\ Anion)(aq)\ +\ Anion\ Acid(aq\ or\ g\ or\ l)$

[Heavy Metal Impurities, and/or Divalent Ions and/or
Multivalent Ions and/or Other Impurities](aq) $+$ $2\ NaCH_3COO(aq)\ +\ 2\ HCl(aq)\ \longrightarrow$

[Heavy Metal Impurities, and/or Divalent Ions and/or
Multivalent Ions and/or Other Impurities](aq) $+$ $2\ NaCl(aq)\ +\ CH_3COOH(aq\ or\ g\ or\ l)$ -continued

[Heavy Metal Impurities, and/or Divalent Ions and/or
Multivalent Ions and/or Other Impurities](aq) $+$ $2\ NaCH_3COO(aq)\ +\ SO_2(g\ or\ aq)\ \longrightarrow$

[Heavy Metal Impurities, and/or Divalent Ions and/or
Multivalent Ions and/or Other Impurities](aq) $+$ $Na_2SO_3(aq)\ +\ 2\ CH_3COOH(aq\ or\ g\ or\ l)$

[Heavy Metal Impurities, and/or Divalent Ions and/or
Multivalent Ions and/or Other Impurities](aq) $+$ $2\ NaCH_3COO(aq)\ +\ H_2SO_4(g\ or\ aq)\ \longrightarrow$

[Heavy Metal Impurities, and/or Divalent Ions and/or
Multivalent Ions and/or Other Impurities](aq) $+$ $Na_2SO_4(aq)\ +\ 2\ CH_3COOH(aq\ or\ g\ or\ l)$ (2—Recovery of Useful or Valuable or Desired Chemical from Retentate) At least partially recovering or separating or removing at least a portion of a useful or valuable or desired chemical from the retentate or treated retentate:

For example, may include, but is not limited to, one or more or any combination of the following:

[Heavy Metal Impurities, and/or Divalent Ions and/or Multivalent
Ions and/or Other Impurities] $+\ 2\ Na(Acid\ \#2\ Anion)\ +$ $Anion\ Acid\ \longrightarrow$

[Heavy Metal Impurities, and/or Divalent Ions and/or Multivalent
Ions and/or Other Impurities and/or $2\ Na(Acid\ \#2\ Anion)$] $+$

[Anion Acid + Solvent Water]

[Heavy Metal Impurities, and/or Divalent Ions and/or Multivalent
Ions and/or Other Impurities](aq) $+\ 2\ Na(Acid\ \#2\ Anion)(aq)\ +$ $Anion\ Acid(aq)\ \longrightarrow$

[Heavy Metal Impurities, and/or Divalent Ions and/or Multivalent
Ions and/or Other Impurities and/or $2\ Na(Acid\ \#2\ Anion)$](s) $+$

[Separate Anion Acid + Solvent Water](aq)

[Heavy Metal Impurities, and/or Divalent Ions and/or Multivalent
Ions and/or Other Impurities](aq) $+\ 2\ Na(Acid\ \#2\ Anion)(aq)\ +$ $Anion\ Acid(aq)\ \longrightarrow$

[Heavy Metal Impurities, and/or Divalent Ions and/or Multivalent
Ions and/or Other Impurities and/or $2\ Na(Acid\ \#2\ Anion)$](s) $+$

[Separate Anion Acid](aq)

[Heavy Metal Impurities, and/or Divalent Ions and/or Multivalent
Ions and/or Other Impurities] $+\ 2\ NaCl+\ 2\ CH_3OOH\ \longrightarrow$

[Heavy Metal Impurities, and/or Divalent Ions and/or Multivalent
Ions and/or Other Impurities and/or $2\ NaCl$] $+$

[$2\ CH_3OOH$ + Solvent Water]

[Heavy Metal Impurities, and/or Divalent Ions and/or Multivalent
Ions and/or Other Impurities](aq) $+\ 2\ NaCl(aq)\ +$ $2\ CH_3OOH(aq)\ \longrightarrow$

[Heavy Metal Impurities, and/or Divalent Ions and/or Multivalent
Ions and/or Other Impurities and/or $2\ NaCl$](s) $+$

[$2\ CH_3OOH$ + Solvent Water](aq)

[Heavy Metal Impurities, and/or Divalent Ions and/or Multivalent
Ions and/or Other Impurities](aq) $+\ 2\ NaCl(aq)\ +$ $2\ CH_3OOH(aq)\ \longrightarrow$

[Heavy Metal Impurities, and/or Divalent Ions and/or Multivalent
Ions and/or Other Impurities and/or $2\ NaCl$](s) $+\ 2\ CH_3OOH(aq)$ Note: In some embodiments, anion acid may be recovered or separated by distillation because, for example, the vapor pressure of some anion acids may enable distillation or vaporization or condensation simultaneous to or with the distillation or vaporization or condensation of solvent water, which may result in a solution, or condensate, or distillate comprising aqueous anion acid. In some embodiments, anion acid, such as acetic acid or formic acid, may be recovered or separated by distillation because, for example, the vapor pressure of some anion acids, such as acetic acid or formic acid, may enable distillation or vaporization or condensation simultaneous to or with the distillation or vaporization or condensation of solvent water, which may result in a solution, or condensate, or distillate comprising aqueous anion acid, such as aqueous acetic acid or formic acid.

(2—Reacting Chemical Recovered from Retentate and/or Concentrating) At least partially reacting at least a portion of the useful or valuable or desired chemical recovered from retentate or treated retentate and/or concentrating:

For example, may include, but is not limited to, one or more or any combination of the following:

$$[\text{Anion Acid}] + [\text{Alkaline-Earth Base}] \longrightarrow$$
$$\text{Alkaline-Earth-Anion Salt}$$

$$[\text{Anion Acid}](\text{aq}) + [\text{Alkaline-Earth Base}](\text{s}) \longrightarrow$$
$$\text{Alkaline-Earth-Anion Salt(s or aq)}$$

$$[\text{Anion Acid}](\text{aq}) + [\text{Alkaline-Earth Base}](\text{s or aq}) \longrightarrow$$
$$\text{Alkaline-Earth-Anion Salt(s or aq)}$$

$$\text{Alkaline-Earth-Anion Salt(aq)} \longrightarrow$$
$$\text{Alkaline-Earth-Anion Salt(aq)(concentrated RO or NF retentate)(separate)} +$$
$$\text{Solvent Water(separate)}$$

$$\text{Alkaline-Earth-Anion Salt(aq)} \longrightarrow$$
$$\text{Alkaline-Earth-Anion Salt(aq)(concentrated)(separate)} +$$
$$\text{Solvent Water(distillate or condensate)(separate)}$$

$$\text{Alkaline-Earth-Anion Salt(aq)} \longrightarrow$$
$$\text{Alkaline-Earth-Anion Salt(s)(separate)} + \text{Solvent Water(separate)}$$

$$[\text{Anion Acid}](\text{aq}) + [\text{Alkaline-Earth Base}] \longrightarrow$$
$$\text{Alkaline-Earth-Anion Salt}$$

$$[\text{Anion Acid}](\text{aq}) + [\text{Alkaline-Earth Base}](\text{s}) \longrightarrow$$
$$\text{Alkaline-Earth-Anion Salt(s or aq)}$$

$$[\text{Anion Acid}](\text{aq}) + [\text{Alkaline-Earth Base}](\text{s or aq}) \longrightarrow$$
$$\text{Alkaline-Earth-Anion Salt(aq)}$$

$$\text{Alkaline-Earth-Anion Salt(aq)} \longrightarrow$$
$$\text{Alkaline-Earth-Anion Salt(aq)(concentrated RO or NF retentate)(separate)} +$$
$$\text{Solvent Water(separate)}$$

$$\text{Alkaline-Earth-Anion Salt(aq)} \longrightarrow$$
$$\text{Alkaline-Earth-Anion Salt(aq)(concentrated)(separate)} +$$
$$\text{Solvent Water(distillate or condensate)(separate)}$$

-continued $$\text{Alkaline-Earth-Anion Salt(aq)} \longrightarrow$$
$$\text{Alkaline-Earth-Anion Salt(s)(separate)} + \text{Solvent Water(separate)}$$

$$[\text{Anion Acid}] + [\text{Alkali Base}] \longrightarrow \text{Alkali-Anion Salt}$$

$$[\text{Anion Acid}](\text{aq}) + [\text{Alkali Base}](\text{s}) \longrightarrow \text{Alkali-Anion Salt(s or aq)}$$

$$[\text{Anion Acid}](\text{aq}) + [\text{Alkali Base}](\text{s or aq}) \longrightarrow \text{Alkali-Anion Salt(aq)}$$

$$\text{Alkali-Anion Salt(aq)} \longrightarrow$$
$$\text{Alkali-Anion Salt(aq)(concentrated RO or NF retentate)separate)} +$$
$$\text{Solvent Water(permeate separate)}$$

$$\text{Alkai-Anion Salt(aq)} \longrightarrow$$
$$\text{Alkali-Anion Salt(aq)(concentrated)(separate)} +$$
$$\text{Solvent Water(distillate or condensate)(separate)}$$

$$\text{Alkai-Anion Salt(aq)} \longrightarrow \text{Alkali-Anion Salt(s)(separate)} +$$
$$\text{Solvent Water(separate)}$$

$$2\,CH_3COOH + CaCO_3 \longrightarrow Ca(CH_3COO)_2 + CO_2$$

$$2\,CH_3COOH(\text{aq}) + CaCO_3(\text{s}) \longrightarrow Ca(CH_3COO)_2(\text{aq or s}) +$$
$$CO_2(\text{g})$$

$$Ca(CH_3COO)_2(\text{aq}) \longrightarrow$$
$$Ca(CH_3COO)_2(\text{aq})(\text{concentrated RO or NF retentate})(\text{separate}) +$$
$$\text{Solvent Water(permeate, separate)}$$

$$Ca(CH_3COO)_2(\text{aq}) \longrightarrow Ca(CH_3COO)_2(\text{aq})(\text{concentrated})(\text{separate}) +$$
$$\text{Solvent Water(distillate or condensate)(separate)}$$

$$Ca(CH_3COO)_2(\text{aq}) \longrightarrow Ca(CH_3COO)_2(\text{s})(\text{separate}) +$$
$$\text{Solvent Water(g or l or s)(separate)}$$

$$2\,CH_3COOH + Na_2CO_3 \longrightarrow 2\,NaCH_3COO + CO_2$$

$$2\,CH_3COOH(\text{aq}) + Na_2CO_3(\text{s}) \longrightarrow 2NaCH_3COO(\text{aq or s}) +$$
$$CO_2(\text{g})$$

$$2\,NaCH_3COO(\text{aq}) \longrightarrow$$
$$2\,NaCH_3COO(\text{aq})(\text{concentrated RO or NF retentate})(\text{separate}) +$$
$$\text{Solvent Water(permeate, separate)}$$

$$2\,NaCH_3COO(\text{aq}) \longrightarrow 2\,NaCH_3COO(\text{aq})(\text{concentrated})(\text{separate}) +$$
$$\text{Solvent Water(distillate or condensate)(separate)}$$

$$2\,NaCH_3COO(\text{aq}) \longrightarrow$$
$$2\,NaCH_3COO(\text{s})(\text{separate}) + \text{Solvent Water(g or l or s)(separate)}$$

(3) At least partially reacting at least a portion of a solution or salt comprising an alkali anion salt with at least a portion of a gas comprising sulfur dioxide, to form, for example, at least a portion of a solution or salt comprising an alkali sulfite or bisulfite and/or at least a portion of a solution or acid or vapor comprising an anion acid.

For example, may include, but is not limited to, one or more or any combination of the following:

$$[\text{Alkali-Anion}] + SO_2 \longrightarrow \text{Alkali Sulfite} + \text{Anion Acid}$$

-continued $$[\text{Alkali-Anion}](aq) + SO_2(g \text{ or } aq) \longrightarrow$$
$$\text{Alkali Sulfite}(aq \text{ or } s) + \text{Anion Acid}(aq \text{ or } g)$$

$$2 NaCH_3COO + SO_2 \longrightarrow Na_2SO_3 + 2 CH_3COOH$$

$$2 NaCH_3COO(aq) + SO_2(g \text{ or } aq) \longrightarrow Na_2SO_3(aq \text{ or } s) +$$
$$2 CH_3COOH(aq \text{ or } g)$$

$$2 NaCH_3COO(aq) + SO_2(g) \longrightarrow Na_2SO_3(aq) +$$
$$2 CH_3COOH(aq)$$

(3—Reacting) Reacting a least a portion of a solution comprising alkali sulfate with an alkaline earth chloride:

For example, may include, but is not limited to, one or more or any combination of the following:

$$\text{Alkali Sulfite} + \text{Anion Acid} + \text{Alkaline Earth Chloride} \longrightarrow$$
$$\text{Alkaline Earth Sulfite} + \text{Alkali Chloride} + \text{Anion Acid}$$

$$\text{Alkali Sulfite}(aq) + \text{Anion Acid}(aq) +$$
$$\text{Alkaline Earth Chloride}(s \text{ or } aq) + \text{Alkaline Earth Sulfite}(s) \longrightarrow$$
$$\text{Alkali Chloride}(aq) + \text{Anion Acid}(aq)$$

$$Na_2SO_3 + CaCl_2 + 2 CH_3COOH \longrightarrow 2 NaCl +$$
$$CaSO_3 + 2 CH_3COOH$$

$$Na_2SO_3 + MgCl_2 + 2 CH_3COOH \longrightarrow 2 NaCl +$$
$$MgSO_3 + 2 CH_3COOH$$

$$Na_2SO_3(aq) + CaCl_2(s \text{ or } sq) + 2 CH_3COOH(aq) \longrightarrow$$
$$2 NaCl(aq) + CaSO_3(s) + 2 CH_3COOH(aq)$$

$$Na_2SO_3(aq) + MgCl_2(s \text{ or } sq) + 2 CH_3COOH(aq) \longrightarrow$$
$$2 NaCl(aq) + MgSO_3(s) + 2 CH_3COOH(aq)$$

(4—Separating) At least partially separate at least a portion of a salt or solution comprising an alkali chloride or alkali halide, or carboxylic acid, or any combination thereof from at least a portion of a solid or solution comprising an alkaline earth sulfite, for example, employing a solid-liquid separation.

For example, may include, but is not limited to, one or more or any combination of the following:

$$2 NaCl + CaSO_3 + 2 CH_3COOH \longrightarrow 2 NaCl +$$
$$CaSO_3(\text{separate}) + 2 CH_3COOH$$

$$2 NaCl + MgSO_3 + 2 CH_3COOH \longrightarrow 2 NaCl +$$
$$MgSO_3(\text{separate}) + 2 CH_3COOH$$

(4—Separating) At least partially separate a portion of a chemical comprising an alkali chloride or alkali halide from a portion of a chemical comprising carboxylic acid, or any combination thereof.

For example, may include, but is not limited to, one or more or any combination of the following:

$$2 NaCl + 2 CH_3COOH \longrightarrow 2 NaCl(\text{separate}) +$$
$$2 CH_3COOH(\text{separate})$$

$$2 NaCl(aq) + 2 CH_3COOH(aq) \longrightarrow$$
$$2 NaCl(s \text{ or } aq)(\text{separate}) + 2 CH_3COOH(aq)(\text{separate})$$

Note: In some embodiments, separating or separation may comprise, including, but not limited to, one or more or any combination of the following: a membrane based process, or a distillation based process, or a freezing based process, or an evaporation based process, or a phase change based process, or a diffusion based process, or an osmosis based process, or reverse osmosis, or forward osmosis, or osmotically assisted reverse osmosis, or nanofiltration, or distillation, or MVC, or MVR, or MED, or MSF, or solid-liquid separation, or crystallization, or a separation process described herein, or a separation process known in the art, or any combination thereof.

(5) Decomposing at least a portion of a material comprising an alkaline earth sulfite to form, for example, a portion of a chemical comprising an alkaline earth oxide and/or a portion of a gas or fluid or chemical comprising sulfur dioxide.

For example, may include, but is not limited to, one or more or any combination of the following:

• Alkaline Earth - Sulfite → Alkaline Earth - Oxide + Sulfur Dioxide
• Alkaline Earth - Sulfite(s) → Alkaline Earth - Oxide(s) + Sulfur Dioxide(g)
• $MgSO_3 \rightarrow MgO + SO_2$
• $MgSO_3(s) \rightarrow MgO(s) + SO_2(g)$ Note: In some embodiments, MgO may comprise a product.

(6) At least a portion of a solution comprising sodium chloride may be at least partially transformed into chlor-alkali products using an electrochemical cell or process. For example, at least a portion of a salt comprising sodium chloride may be transformed by one or more or any combination of the following:

For example, may include, but is not limited to, one or more or any combination of the following:

• $2 NaCl(aq) + H_2O(l) \rightarrow 2 NaOH(aq) + 2 HCl(g \text{ or } aq)$
• $2 NaCl(aq) + H_2O(l) \rightarrow 2 NaOH(aq) + 2 HCl(g \text{ or } aq)$
• $2 H_2(g) + 2 Cl(g) \rightarrow 2 HCl(g \text{ or } aq)$ Example Embodiment 6: Producing $NH_3$ and Calcium Sulfate from $(NH_4)_2SO_4$, a process which may comprise, for example, including, but not limited to, one or more or any combination of the following:

(1) Reacting at least a portion of a chemical comprising an alkaline earth halide, such as calcium chloride, with a chemical comprising ammonium sulfate:

For example, may include, but is not limited to, one or more or any combination of the following:

- Alkaline Earth Halide + $(NH_4)_2SO_4 \rightarrow$ 2 $NH_4$(Halide) + Alkaline Earth Sulfate
- Alkaline Earth Halide(aq or s) + $(NH_4)_2SO_4$(aq) $\rightarrow$ 2 $NH_4$(Halide)(aq) + Alkaline Earth Sulfate(s or aq)
- $CaCl_2$ + $(NH_4)_2SO_4 \rightarrow$ 2 $NH_4Cl$ + $CaSO_4$(s)
- $CaCl_2$(aq or s) + $(NH_4)_2SO_4$(aq or s) $\rightarrow$ 2 $NH_4Cl$(aq) + $CaSO_4$(s)

(1—impurity separation from solution comprising ammonium halide)

In some embodiments separating a portion of impurities, if applicable, from a solution comprising an ammonium halide may be similar to systems and methods for separation impurities from a sodium halide, or sodium+monovalent anion salt, or any combination thereof, which may be described herein. Ammonia or ammonium may comprise an alkali.

(1—impurity separation from solid or solution comprising calcium sulfate or magnesium sulfate)

(2) Reacting at least a portion of a chemical comprising ammonium halide with a chemical comprising an alkaline earth hydroxide, or alkaline earth oxide, or any combination thereof:

For example, may include, but is not limited to, one or more or any combination of the following:

- 2 $NH_4$(Halide) + Alkaline Earth Hydroxide $\rightarrow$ Alkaline Earth Halide + 2 $NH_3$
- 2 $NH_4$(Halide)(aq) + Alkaline Earth Hydroxide(s or aq) $\rightarrow$ Alkaline Earth Halide(aq) + 2 $NH_3$(aq)
- 2 $NH_4Cl$ + $Ca(OH)_2 \rightarrow$ 2 $NH_3$ + $CaCl_2$ + $H_2O$
- 2 $NH_4Cl$(aq) + $Ca(OH)_2$(s or aq) $\rightarrow$ 2 $NH_3$(aq) + $CaCl_2$(aq) + $H_2O$(l)

(2—separating a portion of ammonia)

For example, may include, but is not limited to, one or more or any combination of the following:

- Alkaline Earth Halide + 2 $NH_3 \rightarrow$ Alkaline Earth Halide (separate) + 2$NH_3$ (separate)
- Alkaline Earth Halide(aq) + 2 $NH_3$(aq) $\rightarrow$ Alkaline Earth Halide (s or aq) (separate) + 2 $NH_3$(g or aq)(separate)
- 2 $NH_3$ + $CaCl_2 \rightarrow$ 2 $NH_3$(separate) + $CaCl_2$ (separate)
- 2 $NH_3$(aq) + $CaCl_2$(aq) $\rightarrow$ 2 $NH_3$(g or aq)(separate) + $CaCl_2$(aq or s)(separate)

Example Description of Separation of at Least a Portion of Impurities

In some embodiments, heavy metals or sulfates may be more effectively/efficiently separated from a solution comprising an alkali monovalent salt, such as a solution comprising sodium acetate, or sodium formate, or sodium chloride, than, for example, from a solution comprising sodium sulfate, because a sodium-monovalent anion salt comprises a monovalent anion (acetate) and a monovalent cation (sodium), unlike sodium sulfate with may comprise a divalent anion (sulfate). For example, in some embodiments, at least a portion of heavy metal salts and/or sulfates may be at least partially separated from a solution comprising sodium acetate, or sodium formate, or sodium chloride in solution using nanofiltration because the sodium acetate, or sodium formate, or sodium chloride (being monovalent) may preferentially permeate a nanofiltration membrane, while heavy metals or sulfates may be preferentially rejected by the nanofiltration membrane. Alternatively, or additionally, in some embodiments, for example, heavy metal salts or sulfates may be at least partially separated from at least a portion of the solution comprising sodium acetate, or sodium formate, or sodium chloride using monovalent selective electrodialysis because the sodium acetate, or sodium formate, or sodium chloride may be monovalent (both monovalent cation and anion), while the heavy metal salts may be multivalent and sulfate may be multivalent.

In some embodiments, for example, a solution comprising sodium acetate, or sodium formate, or sodium chloride, or sodium-monovalent anion salt, or any combination thereof may be treated to remove, for example, at least a portion of residual calcium sulfate, or impurities, or heavy metal impurities, or any combination thereof. For example, in some embodiments, said treatment may comprise, including, but not limited to, one or more or any combination of the following:

Removing at Least a Portion of Residual Calcium by Chemical Reaction Precipitation: In some embodiments, a solution comprising sodium acetate, or sodium formate, or sodium chloride, or sodium-monovalent anion salt, or any combination thereof may comprise residual dissolved calcium sulfate. In some embodiments, calcium sulfate may possess at least some solubility in a solution, for example, calcium sulfate may have a solubility of about 2.15 g per L of deionized water at approximately 100° F. (38° C.). It may be desirable to chemically change calcium sulfate, or chemical remove at least a portion of calcium sulfate, or any combination thereof to, for example, prevent at least a portion of calcium sulfate scaling, or calcium sulfate membrane fouling, or any combination thereof. In some embodiments, at least a portion of a salt comprising sodium sulfite, or sodium carbonate, or sodium bisulfite, or sodium metabisulfite, or sodium bicarbonate, or sodium fluoride, or potassium fluoride, or sodium sulfide, or sodium oxalate, or sodium citrate, or sodium phosphate, or a salt of an anion with which calcium forms a salt with a lower solubility in the solution than calcium sulfate to induce at least a portion of calcium precipitation, or any combination thereof may be added to the solution comprising sodium acetate, or sodium chloride, or sodium-monovalent anion salt, or any combination thereof to, for example, react with at least a portion of any residual calcium sulfate dissolved in the solution and/or form at least a portion of a solid precipitate comprising calcium, such as, for example, calcium sulfite, or calcium carbonate, or calcium fluoride, or calcium sulfide, or calcium oxalate, or calcium citrate, calcium phosphate, or a calcium salt of an anion with which calcium forms a salt with a lower solubility in the solution than calcium sulfate, or any combination thereof. In some embodiments, at least a portion of the solid precipitate comprising calcium may be separated by, for example, a solid-liquid separation, such as a filter, or filtration, or centrifuge, or a coagulant, or a decanter, or flocculation, or any combination thereof. In some embodiments, at least a portion of the residual calcium sulfate may react to form at least a portion of an at least partially insoluble salt comprising calcium, and/or at least a portion of an at least partially soluble salt comprising sulfate. For example, in some embodiments, at least a portion of the residual calcium sulfate may react to form at least a portion of an at least partially insoluble salt comprising calcium, such as calcium carbonate or calcium sulfite, and/or at least a portion of an at least partially soluble salt comprising sulfate, such as sodium sulfate or potassium sulfate or ammonium sulfate, wherein at least a portion of the at least partially soluble salt may remain in the solution comprising solution comprising sodium acetate, or sodium formate, or sodium chloride, or sodium—monovalent anion salt, or any combination thereof.

Separation of at Least a Portion of any Impurities, or Heavy Metals, or Sulfate, or Multivalent Ions, or Divalent Ions, or Other Potential Impurities or any Combination Thereof using Nanofiltration: In some embodiments, a solution comprising sodium acetate, or sodium formate, or sodium chloride, or sodium-monovalent anion salt, or any combination thereof may comprise impurities and/or may be transferred into a nanofiltration process, forming, for example, a retentate comprising at least a portion of impurities and/or a permeate comprising at least a portion of a solution comprising sodium acetate, or sodium formate, or sodium chloride, or sodium-monovalent anion salt, or any combination thereof. In some embodiments, at least a portion of the retentate may comprise including, not limited to, one or more or any combination of the following: sodium sulfate, divalent anion salts, or heavy metals, or multivalent anion salts, or calcium sulfate, or magnesium sulfate, or sulfate, or sulfite, or carbonate, or any combination thereof. In some embodiments, the nanofiltration may comprise at least one stage, or multiple stages, or any combination thereof. In some embodiments, the permeate may comprise a sodium monovalent salt and/or be further treated and/or may be transferred to the next step.

Recovering at Least a Portion of Any Residual Sodium Monovalent Salt or Monovalent Anion Acid or Any Combination Thereof From, For Example, the Nanofiltration Retentate: In some embodiments, at least a portion of monovalent salt, or monovalent anion salt, or any combination thereof may be present in the nanofiltration retentate. In some embodiments, for example, at least a portion of salt present in the nanofiltration retentate may comprise a salt wherein the anion may be a derivative of an acid which may possess a vapor pressure if as a stand-alone acid or may be separable or recoverable. In some embodiments, for example, at least a portion of sodium acetate or sodium formate may be present in the nanofiltration retentate. In some embodiments, it may be desirable to recover, or regenerate, or separate at least a portion of any valuable or useful chemicals which may be present in the nanofiltration retentate. For example, in some embodiments, at least a portion of a chemical comprising an acid or acid gas may be added to the retentate to react to form at least a portion of a desired or recoverable chemical or to free-up a desired or recoverable chemical. For example, in some embodiments, at least a portion of a chemical comprising an acid or acid gas may be added to the retentate to react with at least a portion of a salt comprising an acetate or formate, such as sodium acetate or sodium formate, to form at least a portion of free aqueous acetic acid or formic acid. For example, in some embodiments, at least a portion of a chemical comprising an acid or acid gas, such as an acid or acid gas with an acid strength stronger than formic acid or acetic acid or a carboxylic acid, which may include, but is not limited to, sulfurous acid, or sulfur dioxide, or hydrochloric acid, or hydrogen chloride, or sulfuric acid, or any combination thereof, may be added to the retentate to react with at least a portion of a salt comprising an acetate or formate, such as sodium acetate or sodium formate, to form at least a portion of aqueous acetic acid or formic acid.

In some embodiments, it may be desirable to recover at least a portion of the desired or recoverable chemical, or the freed-up desired or recoverable chemical, from the retentate solution or the treated retentate solution. The solution comprising retentate, or treated retentate, or the solution with at least a portion of freed-up desired or recoverable chemical, or the solution comprising acetic acid or formic acid, or any combination thereof may be referred to as the retentate or treated retentate in the present section. In some embodiments, said recovering may comprise, including, but not limited to, one or more or any combination of the following:

Distillation and/or Crystallization: The solution comprising retentate, or treated retentate may be transferred to a concentrating, or distillation, or crystallization process, which may form a solid comprising impurities, or divalent salts, or heavy metal salts, or any combination thereof and a condensate or distillate or liquid comprising aqueous solution comprising freed-up desired or recoverable chemical, such as, for example, including, but not limited to, one or more or any combination of the following: acetic acid or formic acid, or dissolved acid gas, or any combination thereof. In some embodiments, the condensate or distillate may comprise a dilute acetic acid, or formic acid, or carboxylic acid, or acid gas, or any combination thereof solution.

Reacting the Condensate or Distillate comprising a Recovered Acid with a Base and/or then Concentrating the Solution: A solution comprising condensate or distillate comprising at least a portion of a recovered acid, such as acetic acid, or formic acid, or carboxylic acid, may be reacted with a solid or solution or gas comprising a base to form, for example, a solution or solid or any combination thereof comprising a salt of the recovered acid. For example, in some embodiments, a solution comprising acetic acid may be reacted with a base comprising, including, but not limited to, one or more or any combination of the following: calcium carbonate, or sodium carbonate, or sodium bicarbonate, or sodium hydroxide, or calcium oxide, or calcium hydroxide, or sodium sulfide, or calcium sulfide, or ammonia, or magnesium oxide, or magnesium hydroxide, or magnesium carbonate. For example, in some embodiments, a solution comprising acetic acid may be reacted with a salt comprising calcium carbonate to form a solid, or solution, or any combination thereof comprising calcium acetate. In some embodiments, it may be desirable for the salt reaction product or the salt of the recovered acid to comprise a salt employed or present as a reactant in one or more process steps, such as a calcium-anion salt, or a sodium-anion salt, or a calcium acetate, or a sodium acetate, or a calcium formate, or a sodium formate, or a calcium sulfite, or a sodium sulfite, or any combination thereof, which may facilitate the return or transfer of the chemical to a process or process step.

Concentrating the Solution comprising a Salt formed from Reacting a Base with the Recovered Acid: In some embodiments, the solution comprising a salt formed from reacting a base with a recovered acid may comprise at a relatively dilute concentration solution and/or it may be desirable to concentrate said salt. For example, in some embodiments, said salt may be concentrated using one or more or any combination of concentrating or separating processes described herein or known in the art. For example, in some embodiments, said salt may be concentrated using reverse osmosis or electrodialysis, and/or may be further concentrated and/or crystallized using mechanical vapor compression distillation, or multi-effect distillation, or a crystallizer, or any combination thereof.

Stripping and/or Reaction of the Stripping Gas with a Base: In some embodiments, at least a portion of any desired chemical or free acid present in the solution comprising retentate or treated retentate may be recovered or removed by employing a stripping gas to volatize or vaporize or evaporate into a vapor phase at least a portion of the desired chemical or free acid, then reacting or contacting the stripping gas rich in free acid vapor with a base, which may comprise a solid or liquid or gas or solution or any combination thereof, to form a solution of desired chemical or a salt comprising desired chemical or free acid, and/or the lean stripping gas may be recirculated to remove or recover additional desired chemical or free acid. In some embodiments, a gas permeable membrane or membrane distillation may be employed to facilitate the transfer of desired chemical or free acid vapor from the retentate or treated retentate to a reaction with a base or to a recovery solution. In some embodiments, it may be desirable for the temperatures of the retentate or treated retentate and/or the temperature of the base or a solution comprising a base to be controlled to, for example, ensure the water vapor pressure of the solutions may be similar or about the same to, for example, reduce or minimize mass transfer of water and/or reduce energy consumption.

Transferring a Salt formed from Reacting a Base with the Recovered Acid to One or More or Any Combination of Process Steps: In some embodiments, the salt formed from reacting a base with a recovered acid may be transferred to or added to one or more process steps. For example, in some embodiments, the salt formed from reacting a base with a recovered acid may comprise calcium acetate and/or may comprise at least a portion of the calcium acetate participating in the reaction with sodium sulfate. For example, in some embodiments, the salt formed from reacting a base with a recovered acid may comprise sodium acetate and/or may comprise at least a portion of the sodium acetate participating in a reaction with sulfur dioxide. For example, in some embodiments, the salt formed from reacting a base with a recovered acid may comprise sodium sulfite and/or may comprise at least a portion of the sodium sulfite participating in a reaction with calcium hydroxide. For example, in some embodiments, the salt formed from reacting a base with a recovered acid may comprise sodium acetate and/or may comprise at least a portion of the sodium acetate participating in an electrochemical reaction. For example, in some embodiments, the salt formed from reacting a base with a recovered acid may comprise sodium sulfite and/or may comprise at least a portion of the sodium sulfite participating in an electrochemical reaction.

EXAMPLE DETAILED DESCRIPTION

Example Description for Producing an Alkali Hydroxide and/or Alkaline Earth Sulfate with a Halide, or Acid Derivative, or any Combination Thereof Intermediate In some embodiments, a chemical, comprising an alkaline earth may be reacted with a chemical comprising an acid. In some embodiments, a solid, such as a chemical, comprising an alkaline earth may be reacted with a chemical comprising an acid. In some embodiments, for example, a solid, such as a chemical, comprising an alkaline earth may be reacted with a chemical comprising a halide acid. In some embodiments, for example, a solid, such as a chemical, comprising an alkaline earth, may be reacted with a chemical comprising a halide acid to form, for example, a chemical comprising an alkaline earth halide. In some embodiments, a solid comprising calcium may be reacted with a chemical comprising hydrogen chloride, or hydrochloride acid, or an acid comprising chlorine, or aqueous chloride, or hypochlorous acid, or any combination thereof to form, for example, a chemical comprising calcium chloride. In some embodiments, for example, the high acid strength of a halide acid, such as hydrochloric acid, may enable the leaching or reaction with a wide range of potential sources of alkaline earth, which may include, but are not limited to, one or more or any combination of the following: limestone, calcium carbonate, or calcium sulfite, or calcium citrate, or calcium carboxylate, or calcium sulfite, or calcium+anion of an acid weaker than hydrochloric acid, or alkaline earth+anion of an acid weaker than hydrochloric acid, or alkaline earth bearing rock, or alkaline earth bearing product, or alkaline earth bearing waste product, or alkaline earth bearing synthetic product, or alkaline earth bearing tailings, or alkaline earth bearing ore, or calcium bearing rock, or concrete, or waste concrete, or aggregate, or calcium silicate, or calcium ferrite, or calcium aluminate, or ore, or tailings, or waste products, or sintered waste products. In some embodiments, it may be desirable for a reaction of a chemical comprising alkaline earth with a chemical comprising a halide acid, or dissolved halide, or any combination thereof to be conducted comprising relatively high concentrations, which may be due to, for example, including, but not limited to, one or more or any combination of the following: facilitate later process steps, or to accelerate or facilitate reaction kinetics, or to enable a sufficiently high concentration to enable the precipitation of a portion of calcium sulfate, or to enable a higher partial pressure of acid gas product, or to enable a higher partial pressure of carbon dioxide product, or minimize volume, or reduce waste, or improve reaction kinetics, or any combination thereof. In some embodiments, an acid gas, such as carbon dioxide, or hydrogen sulfide, or sulfur dioxide, or any combination thereof, may be produced. In some embodiments, for example, a solid comprising calcium carbonate may be reacted with an acid comprising hydrochloric acid to form, for example, a gas comprising carbon dioxide and a solution comprising calcium chloride. In some embodiments, it may be desirable for the gas comprising acid gas, such as carbon dioxide, to comprising a relatively high pressure, or relatively high partial pressure, or relatively high purity, or captured gas, or any combination thereof. In some embodiments, for example, an gas or fluid comprising an acid gas may be, for example, including, but not limited to, one or more or any combination of the following: a valuable product, or may be converted, or may be reacted, or may be utilized, or may be sold, or may be reacted with a chemical comprising ammonia, or may be reacted with a chemical comprising sodium hydroxide, or may be reacted to form a carbon dioxide derivative, or may be reacted to form urea, or any combination thereof. In some embodiments, a solution comprising an alkaline earth halide may be concentrated, or diluted, or treated, or purified, or any combination thereof. In some embodiments, for example, it may be desirable to concentrate or further concentrate a solution comprising an alkaline earth halide to, for example, facilitate the formation and/or precipitation of calcium sulfate. In some embodiments, for example, it may be desirable to concentrate or further concentrate a solution comprising an alkaline earth halide to, for example, facilitate the formation and/or precipitation of calcium sulfate, for example, which may occur or may be conducted in subsequent steps.

In some embodiments, a chemical comprising a halide or halogen, such as chlorine, may be mixed with or reacted with water to form, for example, a solution comprising an acid. In some embodiments, for example, a chemical comprising chlorine may be mixed with or reacted with a solution comprising water to form, for example, a solution comprising hypochlorous acid and/or hydrochloric acid.

In some embodiments a chemical comprising alkaline earth may be reacted with a solution comprising water, or halogen, or halide, or a pressurized headspace gas comprising a halogen, or a high halogen partial pressure, or hypochlorous acid, or hydrochloric acid, or chlorine, or any combination thereof. In some embodiments a chemical comprising alkaline earth may be reacted with a solution comprising water, or chlorine, or a pressurized headspace comprising chlorine, or a high chlorine partial pressure, or hypochlorous acid, or hydrochloric acid, or any combination thereof. In some embodiments a chemical comprising alkaline earth may be reacted with a solution comprising water, or chlorine, or a pressurized headspace comprising chlorine, or a high chlorine partial pressure, or hypochlorous acid, or hydrochloric acid, or any combination thereof to form, for example, a portion of a chemical comprising an alkaline earth chloride and/or a weak acid derivative. In some embodiments a chemical comprising calcium carbonate may be reacted with an environment or react in a reactor or vessel comprising water, or chlorine, or a pressurized headspace comprising chlorine, or a high chlorine partial pressure, or hypochlorous acid, or hydrochloric acid, or any combination thereof to form, for example, a solution comprising calcium chloride and/or a fluid or gas comprising carbon dioxide. In some embodiments a chemical comprising calcium carbonate may react with a chemical comprising water, or chlorine, or a pressurized headspace comprising chlorine, or a high chlorine partial pressure, or hypochlorous acid, or hydrochloric acid, or any combination thereof to form, for example, a solution comprising calcium chloride and/or a fluid or gas comprising carbon dioxide.

In some embodiments, it may be desirable to separate a portion of a chemical comprising a halogen, such as chloride, from a chemical comprising an acid gas, such as carbon dioxide. In some embodiments, for example, a portion of headspace gases, or a portion of gases formed, or any combination thereof may comprise chlorine and/or carbon dioxide. In some embodiments, a portion of a chemical comprising chlorine may be at least partially separated from a chemical comprising carbon dioxide, by, for example, including, but not limited to, one or more or any combination of the following: difference in freezing points, or difference in boiling points, or difference in phase transition temperature, or difference in phase change temperature, or difference in phase transition conditions, or difference in phase change conditions, or solubility, or reactability, or reaction, or concentration, or extraction, or condensation, or deposition, or pressure swing adsorption, or pressure swing absorption, or adsorption, or absorption, or separations described herein, or separations in the art.

In some embodiments, it may be desirable to separate a portion of a chemical comprising a halogen, such as chlorine, from a solution comprising alkaline earth chloride. In some embodiments, for example, a solution comprising alkaline earth chloride may comprise chlorine, or excess chlorine, or a chlorine derivate, or dissolved chlorine, or any combination thereof. In some embodiments, for example, it may be desirable separate a portion of chlorine, by, for example, including, but not limited to, one or more or any combination of the following: depressurization, or vacuum, or heating, or distillation, or membrane based process, or extraction, or reaction, or concentration, or extraction, or condensation, or deposition, or pressure swing adsorption, or pressure swing absorption, or adsorption, or absorption, or separations described herein, or separations in the art, or a separation process herein, or a separation process in the art.

In some embodiments, it may be desirable to separate a portion of a chemical comprising an acid gas, such as carbon dioxide, from a solution comprising alkaline earth halide, such as an alkaline earth chloride. In some embodiments, for example, a solution comprising alkaline earth chloride may comprise carbon dioxide, or excess carbon dioxide, or a carbon dioxide derivate, or dissolved carbon dioxide, or any combination thereof. In some embodiments, for example, it may be desirable separate a portion of carbon dioxide, by, for example, including, but not limited to, one or more or any combination of the following: depressurization, or vacuum, or heating, or distillation, or membrane based process, or extraction, or reaction, or concentration, or extraction, or condensation, or deposition, or pressure swing adsorption, or pressure swing absorption, or adsorption, or absorption, or carrier gas, or stripping gas, or evaporation, or heating, or separations described herein, or separations in the art, or a separation process herein, or a separation process in the art.

In some embodiments, it may be desirable to remove or separate at a portion of a chemical comprising water from a solution comprising alkaline earth halide. In some embodiments, it may be desirable to concentrate at least a portion of a solution comprising alkaline earth halide. In some embodiments, it may be desirable to remove or separate at a portion of a chemical comprising water from a solution comprising alkaline earth halide, for example, prior to, or during, or any combination thereof a reaction of a chemical comprising an alkaline earth halide with a chemical comprising an alkali sulfate. In some embodiments, it may be desirable to remove or separate at a portion of a chemical comprising water from a solution comprising calcium chloride. In some embodiments, it may be desirable to concentrate at least a portion of a solution comprising calcium chloride. In some embodiments, it may be desirable to remove or separate at a portion of a chemical comprising water from a solution comprising calcium chloride, for example, prior to, or during, or any combination thereof a reaction of a chemical comprising a calcium chloride with a chemical comprising an alkali sulfate. In some embodiments, for example, it may be desirable for the concentration of a chemical comprising an alkaline earth halide to comprise a greater weight percent concentration in a reaction of a chemical comprising an alkaline earth halide and a chemical comprising an alkali sulfate than, for example, the weight percent concentration of a chemical comprising alkali halide in a electrochemical separation, or transformation, or separation, or reaction, or any combination thereof, such as, for example, a feed comprising alkali halide into an electrolysis cell, or a membrane cell, or a diaphragm cell, or a mercury cell, or a chlor-alkali process, or bipolar electrodialysis cell, or bipolar electrodialysis process, or any combination thereof. In some embodiments, for example, it may be desirable for a chemical comprising an alkaline earth halide to comprise a sufficient concentration to enable, for example, the precipitation of at least a portion of a chemical comprising an alkaline earth halide, or to facilitate the reaction with a chemical comprising an alkali sulfate, or any combination thereof. In some embodiments, for example, it may be desirable for a chemical comprising an alkaline earth halide to comprise a weight percent concentration greater than or equal to, including, but not limited to, one or more or any combination of the following: 0.5 wt %, or 1.0 wt %, or 1.5 wt %, or 2.0 wt %, or 2.5 wt %, or 3.0 wt %, or 3.5 wt %, or 4.0 wt %, or 4.5 wt %, or 5.0 wt %, or 5.5 wt %, or 6.0 wt %, or 6.5 wt %, or 7.0 wt %, or 7.5 wt %, or 8.0 wt %, or 8.5 wt %, or 9.0 wt %, or 9.5 wt %, or 10.0 wt %, or 10.5 wt %, or 11.0 wt %, or 11.5 wt %, or 12.0 wt %, or 12.5 wt %, or 13.0 wt %, or 13.5 wt %, or 14.0 wt %, or 14.5 wt %, or 15.0 wt %, or 15.5 wt %, or 16.0 wt %, or 16.5 wt %, or 17.0 wt %, or 17.5 wt %, or 18.0 wt %, or 18.5 wt %, or 19.0 wt %, or 19.5 wt %, or 20.0 wt %, or 20.5 wt %, or 21.0 wt %, or 21.5 wt %, or 22.0 wt %, or 22.5 wt %, or 23.0 wt %, or 23.5 wt %, or 24.0 wt %, or 24.5 wt %, or 25.0 wt %, or 25.5 wt %, or 26.0 wt %, or 26.5 wt %, or 27.0 wt %, or 27.5 wt %, or 28.0 wt %, or 28.5 wt %, or 29.0 wt %, or 29.5 wt %, or 30.0 wt %, or 30.5 wt %, or 31.0 wt %, or 31.5 wt %, or 32.0 wt %, or 32.5 wt %, or 33.0 wt %, or 33.5 wt %, or 34.0 wt %, or 34.5 wt %, or 35.0 wt %, or 35.5 wt %, or 36.0 wt %, or 36.5 wt %, or 37.0 wt %, or 37.5 wt %, or 38.0 wt %, or 38.5 wt %, or 39.0 wt %, or 39.5 wt %, or 40.0 wt %, or 40.5 wt %, or 41.0 wt %, or 41.5 wt %, or 42.0 wt %, or 42.5 wt %, or 43.0 wt %, or 43.5 wt %, or 44.0 wt %, or 44.5 wt %, or 45.0 wt %, or 45.5 wt %, or 46.0 wt %, or 46.5 wt %, or 47.0 wt %, or 47.5 wt %, or 48.0 wt %, or 48.5 wt %, or 49.0 wt %, or 49.5 wt %, or 50.0 wt %, or 50.5 wt %, or 51.0 wt %, or 51.5 wt %, or 52.0 wt %, or 52.5 wt %, or 53.0 wt %, or 53.5 wt %, or 54.0 wt %, or 54.5 wt %, or 55.0 wt %, or 55.5 wt %, or 56.0 wt %, or 56.5 wt %, or 57.0 wt %, or 57.5 wt %, or 58.0 wt %, or 58.5 wt %, or 59.0 wt %, or 59.5 wt %, or 60.0 wt %, or 60.5 wt %, or 61.0 wt %, or 61.5 wt %, or 62.0 wt %, or 62.5 wt %, or 63.0 wt %, or 63.5 wt %, or 64.0 wt %, or 64.5 wt %, or 65.0 wt %, or 65.5 wt %, or 66.0 wt %, or 66.5 wt %, or 67.0 wt %, or 67.5 wt %, or 68.0 wt %, or 68.5 wt %, or 69.0 wt %, or 69.5 wt %, or 70.0 wt %, or 70.5 wt %, or 71.0 wt %, or 71.5 wt %, or 72.0 wt %, or 72.5 wt %, or 73.0 wt %, or 73.5 wt %, or 74.0 wt %, or 74.5 wt %, or 75.0 wt %, or 75.5 wt %, or 76.0 wt %, or 76.5 wt %, or 77.0 wt %, or 77.5 wt %, or 78.0 wt %, or 78.5 wt %, or 79.0 wt %, or 79.5 wt %, or 80.0 wt %, or 80.5 wt %, or 81.0 wt %, or 81.5 wt %, or 82.0 wt %, or 82.5 wt %, or 83.0 wt %, or 83.5 wt %, or 84.0 wt %, or 84.5 wt %, or 85.0 wt %, or 85.5 wt %, or 86.0 wt %, or 86.5 wt %, or 87.0 wt %, or 87.5 wt %, or 88.0 wt %, or 88.5 wt %, or 89.0 wt %, or 89.5 wt %, or 90.0 wt %, or 90.5 wt %, or 91.0 wt %, or 91.5 wt %, or 92.0 wt %, or 92.5 wt %, or 93.0 wt %, or 93.5 wt %, or 94.0 wt %, or 94.5 wt %, or 95.0 wt %, or 95.5 wt %, or 96.0 wt %, or 96.5 wt %, or 97.0 wt %, or 97.5 wt %, or 98.0 wt %, or 98.5 wt %, or 99.0 wt %, or 99.5 wt %, or 100.0 wt %.

In some embodiments, a portion of a chemical comprising water may be removed or separated from a chemical comprising alkaline earth halide. In some embodiments, a portion of a solution comprising water may be removed from a chemical comprising alkaline earth halide. In some embodiments, a separation of a portion of water may comprise, including, but not limited to, one or more or any combination of the following: forward osmosis, or osmotically assisted reverse osmosis, or reverse osmosis, or capacitive deionization, or electrodialysis, or nanofiltration, or electrodeionization, or distillation, or MED, or MVC, or MVR, or MSF, or simple distillation, or extractive distillation, or freeze desalination, or a membrane based process, or evaporation, or dialysis, or crystallization, or a separation described herein, or a separation in the art. In some embodiments, a chemical comprising water, such as a portion of a chemical comprising water which may comprise a portion of a chemical comprising water separated from a solution comprising alkaline earth halide, may, including, but not limited to, one or more or any combination of the following: be employed internally, or comprise an intermediate, or be used in the process, or be transferred to a process step, or comprise a product, or comprise a reactant, or comprise a reagent, or be treated, or be purified, or any combination thereof. In some embodiments, for example, a portion of a chemical comprising water may be employed to rinse a portion of a chemical comprising alkaline earth sulfate. In some embodiments, for example, a portion of a chemical comprising water may be employed in or mixed with a process step herein. In some embodiments, for example, a portion of a chemical comprising water may be employed to dilute, or reduce the concentration, or mix with, or any combination thereof a chemical comprising an alkali halide.

In some embodiments, for example, it may be desirable to transfer at least a portion of a chemical comprising water from a solution comprising an alkaline earth halide to a solution comprising an alkali halide. In some embodiments, for example, it may be desirable to transfer at least a portion of a chemical comprising water from a solution comprising calcium chloride to a solution comprising sodium chloride. In some embodiments, for example, a solution comprising an alkaline earth halide formed from a reaction of a chemical comprising an alkaline earth and a chemical comprising a halide acid may comprise a lower concentration or osmotic pressure than a solution comprising an alkali halide. In some embodiments, for example, a solution comprising an alkaline earth halide may comprise a feed solution and/or a solution comprising an alkali halide may comprise a draw solution in, for example, a forward osmosis process, or an osmotically assisted reverse osmosis process, or any combination thereof. In some embodiments, for example, a portion of a chemical comprising water may permeate a membrane, such as a semipermeable membrane, from a solution comprising alkaline earth halide to a solution comprising alkali halide, which may result in an increase in the concentration of the solution comprising an alkaline earth halide and/or a decrease or dilution in the concentration of a solution comprising an alkali halide. In some embodiments, for example, employing forward osmosis, or osmotically assisted reverse osmosis, or a method for transferring water from a solution desiring concentrating to a solution desiring diluting, or any combination thereof may reduce energy consumption, or improve CAPEX, or improve OPEX, or increase density, or reduce sizing, or reduce complexity, or improve reliability, or improve maintainability, or any combination thereof.

In some embodiments, a chemical comprising an alkaline earth halide may be reacted with a chemical comprising an alkali sulfate to form, for example, a portion of a chemical comprising an alkaline earth sulfate and/or a portion of a chemical comprising an alkali chloride. In some embodiments, for example, a solid or solution comprising calcium chloride may be reacted with a solid or solution comprising sodium sulfate to form, for example, a portion of a chemical comprising calcium sulfate and/or a portion of a chemical comprising sodium chloride. In some embodiments, for example, a solid or solution comprising calcium chloride may be reacted with a solid or solution comprising sodium sulfate to form, for example, a portion of a solid comprising calcium sulfate and/or a portion of a solution comprising sodium chloride. In some embodiments, it may be desirable to facilitate the precipitation of an alkaline earth sulfate, such as calcium sulfate, and/or facilitate separation by, for example, including, but not limited to, one or more or any combination of the following: optimize concentration, or employ higher concentration, or maximize concentration, or operate at a higher temperature, or heat the solution, or heat the reactor, or employ mixing in a manner which promotes larger precipitate particle size, or employ mixing in a manner which promotes nucleation, or concentrate, or employ precipitation promoters, or employ reaction promoters, or a process described herein, or a process in the art.

In some embodiments, it may be desirable to separate at least a portion of a chemical comprising alkaline earth sulfate from at least a portion of a chemical comprising alkali halide. In some embodiments, it may be desirable to separate at least a portion of solid comprising an alkaline earth sulfate from at least a portion of a solution comprising an alkali halide. In some embodiments, it may be desirable to separate at least a portion of solid comprising a calcium sulfate from at least a portion of a solution comprising sodium chloride. In some embodiments, a solid-liquid separation may be employed, which may include, but is not limited to, one or more or any combination of the following: a centrifuge, or a filter press, or a decanter, or a filter, or a clarifier, or a flocculation device, or a density based separation, or a particle size based separation, or a gravitational separation, or a rotating filter, or a dryer, or a rinser, or a separation process described herein, or a separation process in the art.

In some embodiments, a solid comprising an alkaline earth sulfate, such as calcium sulfate, may be treated, or purified, or dried, or any combination thereof. In some embodiments, for example, a solid comprising an alkaline earth sulfate, such as calcium sulfate, may be rinsed. In some embodiments, for example, a solid comprising an alkaline earth sulfate, such as calcium sulfate, may be rinsed with a solution comprising water which may comprise a solution comprising water input. In some embodiments, for example, a solution comprising water may rinse a portion of a solid comprising calcium sulfate and/or a portion of the resulting rinsate or solution remaining after rinsing may be mixed with or react with a chemical comprising chlorine, or hydrogen chloride, or any combination thereof to form, for example, a portion of a solution comprising hydrochloric acid, or hypochlorous acid, or any combination thereof which may be reacted with a chemical comprising calcium, such as a calcium bearing material, or limestone, or waste concrete, or other chemical comprising alkaline earth described herein, or other chemical comprising alkaline earth in the art; and/or may form a portion of a chemical comprising an alkaline earth chlorine.

In some embodiments, it may be desirable to remove at least a portion of any impurities from a solution comprising an alkali halide, or alkali cation monovalent anion salt, or any combination thereof. In some embodiments, it may be desirable to remove at least a portion of any impurities from a solution comprising an alkali halide, such as sodium chloride. In some embodiments, for example, some electrochemical methods for transforming a solution comprising an alkali salt may require or benefit from higher purity, or low impurity concentrations, or any combination thereof. In some embodiments, for example, some electrochemical methods for transforming a solution comprising an alkali salt, or an alkali halide, such as sodium chloride, into, for example, a portion of sodium hydroxide, or hydroxide, or chloride, or chlorine, or hydrochloric acid, or hydrogen, or any combination thereof may require or benefit from higher purity, or low impurity concentrations, or any combination thereof. In some embodiments, for example, a portion of alkaline earth may be present in a solution comprising alkali, such as a solution comprising an alkali halide. In some embodiments, for example, it may be desirable to precipitate at least a portion of residual alkaline earth by, for example, reacting with a chemical comprising an acid or acid anion with which an alkaline earth may possess low solubility or insolubility, which may include, for example, including, but not limited to, one or more or any combination of the following: carbon dioxide, or carbonate, or bicarbonate, or sesquicarbonate, or sulfite, or sulfide, or oxalate, or citrate. In some embodiments, for example, it may be desirable to add an anti-scalant, such as a chemical which may prevent the formation of scale comprising, for example, calcium sulfate. In some embodiments, it may be desirable to employ nanofiltration to separate, for example, a portion of an alkaline earth from a portion of an alkali. In some embodiments, for example, a salt comprising an alkaline earth, or an alkali sulfate, or metal impurities, or transition metal, or any combination thereof may comprise a divalent or multivalent salt and/or a salt comprising an alkali, or halide, or monovalent anion, or any combination thereof may comprise a monovalent salt, which may enable the at least partial separation using, for example, size based separation methods, which may include, but is not limited to, one or more or any combination of the following: nanofiltration, or monovalent selective electrodialysis, or monovalent selective ion exchange, or divalent or multivalent selective ion exchange. In some embodiments, it may be desirable to employ treatment, or further treatment, or polishing, or any combination thereof. In some embodiments, for example, may employ, for example, including, but not limited to, one or more or any combination of the following: ion exchange, or electrodialysis, or electrodeionization, or monovalent selective electrodialysis, or reactive separation, or high surface area material, or adsorption, or affinity based separation, or extraction, or freeze separation, or thermal separation, or a process for purification described herein, or a process for purification in the art, or separation process in the art, or a polishing process in the art, or a sodium chloride polishing process in the art, or an alkali purification process in the art, or a alkali chloride polishing process in the art, or a sodium chloride purification process in the art.

In some embodiments, it may be desirable to dilute a chemical comprising alkali halide. In some embodiments, it may be desirable to dilute a solution comprising alkali halide. In some embodiments, a chemical comprising water may be added to a solution comprising alkali halide to, for example, facilitate a chemical reaction, or transformation, or separation, or any combination thereof. In some embodiments, for example, a chemical comprising water may be added to a solution comprising sodium chloride to, for example, facilitate a chemical reaction, or transformation, or separation, or any combination thereof. In some embodiments, a chemical comprising water may be added to a solution comprising alkali halide to, for example, facilitate an electrochemical reaction, or transformation, or separation, or any combination thereof. In some embodiments, for example, it may be desirable to form a solution comprising alkali halide comprising a sufficiently low concentration to enable or facilitate effective, or energy efficient, or capital efficient, or any combination thereof electrochemical process. In some embodiments, for example, it may be desirable to form a solution comprising alkali halide comprising a sufficiently low concentration to enable or facilitate effective, or energy efficient, or capital efficient, or any combination thereof bipolar electrodialysis. In some embodiments, for example, the concentration of a feed comprising an alkali, or alkali halide, or any combination thereof into an electrochemical process may be less than or equal to, including, but not limited to, one or more or any combination of the following: 0.5 wt %, or 1.0 wt %, or 1.5 wt %, or 2.0 wt %, or 2.5 wt %, or 3.0 wt %, or 3.5 wt %, or 4.0 wt %, or 4.5 wt %, or 5.0 wt %, or 5.5 wt %, or 6.0 wt %, or 6.5 wt %, or 7.0 wt %, or 7.5 wt %, or 8.0 wt %, or 8.5 wt %, or 9.0 wt %, or 9.5 wt %, or 10.0 wt %, or 10.5 wt %, or 11.0 wt %, or 11.5 wt %, or 12.0 wt %, or 12.5 wt %, or 13.0 wt %, or 13.5 wt %, or 14.0 wt %, or 14.5 wt %, or 15.0 wt %, or 15.5 wt %, or 16.0 wt %, or 16.5 wt %, or 17.0 wt %, or 17.5 wt %, or 18.0 wt %, or 18.5 wt %, or 19.0 wt %, or 19.5 wt %, or 20.0 wt %, or 20.5 wt %, or 21.0 wt %, or 21.5 wt %, or 22.0 wt %, or 22.5 wt %, or 23.0 wt %, or 23.5 wt %, or 24.0 wt %, or 24.5 wt %, or 25.0 wt %, or 25.5 wt %, or 26.0 wt %, or 26.5 wt %, or 27.0 wt %, or 27.5 wt %, or 28.0 wt %, or 28.5 wt %, or 29.0 wt %, or 29.5 wt %, or 30.0 wt %, or 30.5 wt %, or 31.0 wt %, or 31.5 wt %, or 32.0 wt %, or 32.5 wt %, or 33.0 wt %, or 33.5 wt %, or 34.0 wt %, or 34.5 wt %, or 35.0 wt %, or 35.5 wt %, or 36.0 wt %, or 36.5 wt %, or 37.0 wt %, or 37.5 wt %, or 38.0 wt %, or 38.5 wt %, or 39.0 wt %, or 39.5 wt %, or 40.0 wt %, or 40.5 wt %, or 41.0 wt %, or 41.5 wt %, or 42.0 wt %, or 42.5 %, or 43.0 wt %, or 43.5 wt %, or 44.0 wt %, or 44.5 wt %, or 45.0 wt %, or 45.5 wt %, or 46.0 wt %, or 46.5 wt %, or 47.0 wt %, or 47.5 wt %, or 48.0 wt %, or 48.5 wt %, or 49.0 wt %, or 49.5 wt %, or 50.0 wt %, or 50.5 wt %, or 51.0 wt %, or 51.5 wt %, or 52.0 wt %, or 52.5 wt %, or 53.0 wt %, or 53.5 wt %, or 54.0 wt %, or 54.5 wt %, or 55.0 wt %, or 55.5 wt %, or 56.0 wt %, or 56.5 wt %, or 57.0 wt %, or 57.5 wt %, or 58.0 wt %, or 58.5 wt %, or 59.0 wt %, or 59.5 wt %, or 60.0 wt %, or 60.5 wt %, or 61.0 wt %, or 61.5 wt %, or 62.0 wt %, or 62.5 wt %, or 63.0 wt %, or 63.5 wt %, or 64.0 wt %, or 64.5 wt %, or 65.0 wt %, or 65.5 wt %, or 66.0 wt %, or 66.5 wt %, or 67.0 wt %, or 67.5 wt %, or 68.0 wt %, or 68.5 wt %, or 69.0 wt %, or 69.5 wt %, or 70.0 wt %, or 70.5 wt %, or 71.0 wt %, or 71.5 wt %, or 72.0 wt %, or 72.5 wt %, or 73.0 wt %, or 73.5 wt %, or 74.0 wt %, or 74.5 wt %, or 75.0 wt %, or 75.5 wt %, or 76.0 wt %, or 76.5 wt %, or 77.0 wt %, or 77.5 wt %, or 78.0 wt %, or 78.5 wt %, or 79.0 wt %, or 79.5 wt %, or 80.0 wt %, or 80.5 wt %, or 81.0 wt %, or 81.5 wt %, or 82.0 wt %, or 82.5 wt %, or 83.0 wt %, or 83.5 wt %, or 84.0 wt %, or 84.5 wt %, or 85.0 wt %, or 85.5 wt %, or 86.0 wt %, or 86.5 wt %, or 87.0 wt %, or 87.5 wt %, or 88.0 wt %, or 88.5 wt %, or 89.0 wt %, or 89.5 wt %, or 90.0 wt %, or 90.5 wt %, or 91.0 wt %, or 91.5 wt %, or 92.0 wt %, or 92.5 wt %, or 93.0 wt %, or 93.5 wt %, or 94.0 wt %, or 94.5 wt %, or 95.0 wt %, or 95.5 wt %, or 96.0 wt %, or 96.5 wt %, or 97.0 wt %, or 97.5 wt %, or 98.0 wt %, or 98.5 wt %, or 99.0 wt %, or 99.5 wt %, or 100.0 wt %.

In some embodiments, for example, it may be desirable to transfer at least a portion of a chemical comprising water from a solution comprising an alkaline earth halide to a solution comprising an alkali halide. In some embodiments, for example, it may be desirable to transfer at least a portion of a chemical comprising water from a solution comprising calcium chloride to a solution comprising sodium chloride. In some embodiments, for example, a solution comprising an alkaline earth halide formed from a reaction of a chemical comprising an alkaline earth and a chemical comprising a halide acid may comprise a lower concentration or osmotic pressure than a solution comprising an alkali halide. In some embodiments, for example, it may be desirable to transfer or move at least a portion of a chemical comprising water from a solution comprising an alkaline earth halide to a solution comprising an alkali halide. In some embodiments, for example, a solution comprising an alkaline earth halide may comprise a feed solution and/or a solution comprising an alkali halide may comprise a draw solution in, for example, a forward osmosis process, or an osmotically assisted reverse osmosis process, or any combination thereof. In some embodiments, for example, a portion of a chemical comprising water may permeate a membrane, such as a semipermeable membrane, from a solution comprising alkaline earth halide to a solution comprising an alkali halide, which may result in an increase in the concentration of the solution comprising an alkaline earth halide and/or a decrease or dilution in the concentration of a solution comprising an alkali halide. In some embodiments, for example, employing forward osmosis, or osmotically assisted reverse osmosis, or a method for transferring water from a solution desiring concentrating to a solution desiring diluting, or any combination thereof may reduce energy consumption, or improve CAPEX, or improve OPEX, or increase density, or reduce sizing, or reduce complexity, or improve reliability, or improve maintainability, or any combination thereof.

In some embodiments, a chemical comprising an alkali cation acid anion may be electrochemically transformed into, for example, a portion of a chemical comprising an alkali hydroxide and/or a portion of a chemical comprising an acid, or acid anion derivative, or any combination thereof. In some embodiments, a chemical comprising an alkali cation monovalent acid anion may be electrochemically transformed into, for example, a portion of a chemical comprising an alkali hydroxide and/or a portion of a chemical comprising a monovalent acid, or a monovalent acid anion derivative, or any combination thereof. In some embodiments, a chemical comprising sodium chloride may be electrochemically transformed into, for example, a portion of a chemical comprising sodium hydroxide and/or a portion of a chemical comprising hydrochloride acid, or chlorine, or hydrogen, or any combination thereof. In some embodiments, a portion of a chemical comprising hydrogen and/or a chemical comprising chlorine may be reacted to form hydrochloric acid.

In some embodiments, a chemical comprising hydrogen may be formed and/or may, for example, including, but not limited to, one or more or any combination of the following: comprise a valuable product, or be converted into a hydrogen derivative, or be employed as a reducing agent, or be reacted to form ammonia, or be used as a fuel, or be used as a source of energy, or be employed as an energy carrier, or be employed as an intermediate, or any combination thereof.

In some embodiments, a chemical comprising an acid derivative, or a halide, or halide acid, or any combination thereof, such as chlorine or hydrochloric acid, may be formed and/or may, for example, including, but not limited to, one or more or any combination of the following: be recycled or recirculated, or comprise an intermediate, or be reacted with a solution comprising water, or be reacted with a solution comprising rinsing water or a rinsate solution, or be reacted with a chemical comprising an alkaline earth, or reacted with a chemical comprising water and/or alkaline earth, or reacted with a chemical comprising calcium carbonate, or reacted with a chemical comprising calcium, or reacted with a chemical comprising calcium carbonate to form a chemical comprising calcium chloride and a chemical comprising carbon dioxide, or comprise a product, or be reacted with alkali hydroxide to form an alkali chlorine derivative, or an alkali chlorine salt, or an alkali chlorate, or an alkali hypochlorite, or any combination thereof.

In some embodiments, a chemical comprising an alkali hydroxide may be formed and/or may, for example, including, but not limited to, one or more or any combination of the following: comprise a valuable product, or may comprise an intermediate, or may be employed in a process which may have been a source of alkali sulfate, or may be employed in a circular economy, or may be reacted, or may be reacted to form a derivative, or may be reacted with carbon dioxide, or may be reacted with carbon dioxide to form an alkali carbonate, or may be reacted with emissions carbon dioxide, or may be reacted with air, or may be reacted with air comprising carbon dioxide, or may be reacted to form an ammonia derivative, or may be reacted to form urea, or may be reacted with a halide or halogen, or may be concentrated, or may be crystallized, or may be distilled, or may be diluted, or may be further concentrated, or may be reacted with chlorine, or may be reacted with chlorine to form an alkali chlorine derivative, or an alkali chlorine salt, or an alkali chlorate, or an alkali hypochlorite, or any combination thereof.

In some embodiments, an conversion or transformation of a chemical comprising an alkali, or alkali salt, or an alkali cation acid anion salt, or an alkali halide, or an alkali carboxylate, or any combination thereof into, for example, a chemical comprising an alkali, or alkali hydroxide, or an alkali salt, or acid, or aqueous acid, or a halogen, or a halide acid, or a halogen acid, or a carboxylic acid, or a derivative thereof, or any combination thereof may comprise, including, but not limited to, one or more or any combination of the following: a chlor-alkali process, or a membrane cell, or a diaphragm cell, or a bipolar electrodialysis, or a mercury cell, or a bipolar electrodialysis cell, or an electrodialysis cell, or electrolysis, or an electrochemical process, or an electrochemical process described herein, or a process described herein, or an electrochemical process known in the art. In some embodiments, an alkali chloride, or alkali halide, or alkali cation acid anion, or any combination thereof may comprise an input to a process for producing an alkali carbonate, or alkali bicarbonate, or any combination thereof, which may include, but is not limited to, one or more or any combination of the following: an ammonia-soda process, or a Solvay process, or a process for producing an alkali salt, or a process described herein, or a process referenced herein, or a process in the art, or any combination thereof.

2. Example Description for Producing Ammonia and Calcium Sulfate from Ammonium Sulfate, Calcium Oxide, Employing a Chlorine Intermediate In some embodiments, a chemical comprising an alkaline earth may be reacted with a chemical comprising ammonium sulfate. In some embodiments, a chemical comprising an alkaline earth halide may be reacted with a chemical comprising ammonium sulfate to form, for example, a portion of a chemical comprising an alkaline earth sulfate and a portion of a chemical comprising an ammonium halide. In some embodiments, a chemical comprising calcium chloride may be reacted with a chemical comprising ammonium sulfate to form, for example, a portion of a chemical comprising an calcium sulfate and a portion of a chemical comprising an ammonium chloride. In some embodiments, for example, a solid or solution comprising calcium chloride may be reacted with a solid or solution comprising ammonium sulfate to form, for example, a portion of a solid comprising calcium sulfate and/or a portion of a solution comprising ammonium chloride. In some embodiments, it may be desirable to facilitate the precipitation of an alkaline earth sulfate, such as calcium sulfate, and/or facilitate separation by, for example, including, but not limited to, one or more or any combination of the following: optimize concentration, or employ higher concentration, or maximize concentration, or operate at a higher temperature, or heat the solution, or heat the reactor, or employ mixing in a manner which promotes larger precipitate particle size, or employ mixing in a manner which promotes nucleation, or concentrate, or employ precipitation promoters, or heating to reduce solubility, or heating to facilitate reaction rate, or cooling, or temperature change, or temperature swing, or conditions swing, or employ reaction promoters, or a process described herein, or a process in the art.

In some embodiments, it may be desirable to separate at least a portion of a chemical comprising alkaline earth sulfate from at least a portion of a chemical comprising alkali halide, such as ammonium chloride. In some embodiments, it may be desirable to separate at least a portion of solid comprising an alkaline earth sulfate from at least a portion of a solution comprising an alkali halide, such as ammonium chloride. In some embodiments, it may be desirable to separate at least a portion of solid comprising a calcium sulfate from at least a portion of a solution comprising ammonium chloride. In some embodiments, a solid-liquid separation may be employed, which may include, but is not limited to, one or more or any combination of the following: a centrifuge, or a filter press, or a decanter, or a filter, or a clarifier, or a flocculation device, or a density based separation, or a particle size based separation, or a gravitational separation, or a rotating filter, or a dryer, or a rinser, or a separation process described herein, or a separation process in the art.

In some embodiments, a solid comprising an alkaline earth sulfate, such as calcium sulfate, may be treated, or purified, or dried, or any combination thereof. In some embodiments, for example, a solid comprising an alkaline earth sulfate, such as calcium sulfate, may be rinsed. In some embodiments, for example, a solid comprising an alkaline earth sulfate, such as calcium sulfate, may be rinsed with a solution comprising water which may comprise a solution comprising water input. In some embodiments, for example, a solution comprising water may rinse a portion of a solid comprising calcium sulfate and/or a portion of the resulting rinsate or solution remaining after rinsing may be mixed with, for example, a chemical which may comprise, including, but not limited to, one or more or any combination of the following: calcium oxide, or calcium hydroxide, or calcium chloride, or anti-scalant, or ammonia, or ammonium sulfate.

In some embodiments, a solution comprising ammonium chloride may be reacted with a chemical comprising an alkaline earth oxide, or alkaline earth hydroxide, or any combination thereof. In some embodiments, a solution comprising ammonium chloride may be reacted with a chemical comprising an alkaline earth oxide, or alkaline earth hydroxide, or any combination thereof to form, for example, a portion of chemical(s) comprising ammonia, or ammonium hydroxide, or alkaline earth chloride, or any combination thereof. In some embodiments, a solution comprising ammonium chloride may be reacted with a chemical comprising calcium oxide, or calcium hydroxide, or any combination thereof to form, for example, a portion of chemicals comprising ammonia, or ammonium hydroxide, or calcium chloride, or any combination thereof. In some embodiments, a solution comprising ammonium chloride may be reacted with a solid, or solution, or any combination thereof comprising calcium oxide, or calcium hydroxide, or any combination thereof to form, for example, a portion of a solution comprising ammonia, or ammonium hydroxide, or calcium chloride, or any combination thereof. In some embodiments, it may be desirable to separate a portion of a solution comprising ammonia, or ammonium hydroxide, or calcium chloride, or any combination thereof to form a chemical comprising ammonia and/or a solution or solid comprising calcium chloride. In some embodiments, it may be desirable to separate a portion of a solution comprising ammonia, or ammonium hydroxide, or calcium chloride, or any combination thereof to form an at least partially separated gas, or fluid, or solution, or solid, or any combination thereof comprising ammonia and/or an at least partially separated solution or solid comprising calcium chloride.

In some embodiments, a chemical comprising ammonia may be formed and/or may, for example, including, but not limited to, one or more or any combination of the following: comprise a valuable product, or may comprise an intermediate, or may be employed in a process which may have been a source of ammonium sulfate, or may be employed in a circular economy, or may be reacted, or may be reacted to form a derivative, or may be reacted with carbon dioxide, or may be reacted with carbon dioxide to form ammonium carbonate, or may be reacted with emissions carbon dioxide, or may be reacted with air, or may be reacted with air comprising carbon dioxide, or may be reacted to form an ammonia derivative, or may comprise ammonium hydroxide, or may comprise aqueous ammonia, or may be reacted with water, or may be reacted to form ammonium carbamate, or may be reacted to form urea, or may be reacted with a halide or halogen, or may be reacted with an acid, or may be concentrated, or may be crystallized, or may be distilled, or may be diluted, or may be further concentrated, or any combination thereof.

In some embodiments, a chemical comprising an alkaline earth halide, such as an alkaline earth chloride, may be formed and/or may, for example, including, but not limited to, one or more or any combination of the following: be employed as an intermediate, or may be transferred to a reaction with a chemical comprising alkali sulfate, or may be transferred to a reaction with a chemical comprising ammonium sulfate, or may comprise a product, or may comprise a valuable product, or may be reacted, or may be reacted to form a derivative, or may be reacted to form calcium sulfate, or may be reacted to form an insoluble precipitate, or may be crystallized, or may be concentrated, or may be diluted. Example Description for Producing Alkali Hydroxide from Alkali Sulfate Using Alkali Carboxylate and/or Carboxylic Acid Intermediate In some embodiments, a chemical, comprising an alkaline earth may be reacted with a chemical comprising an acid. In some embodiments, a solid, such as a chemical, comprising an alkaline earth may be reacted with a chemical comprising an acid. In some embodiments, a solid, such as a chemical, comprising an alkaline earth may be reacted with a chemical comprising a carboxylic acid. In some embodiments, for example, a solid, such as a chemical, comprising an alkaline earth may be reacted with a chemical comprising a carboxylic acid. In some embodiments, for example, a solid, such as a chemical, comprising an alkaline earth may be reacted with a chemical comprising a carboxylic acid to form, for example, a chemical comprising an alkaline earth carboxylate. In some embodiments, a solid comprising calcium may be reacted with a chemical comprising acetic acid to form, for example, a solution comprising calcium acetate. In some embodiments, for example, alkaline earth sources or a chemical comprising alkaline earth may include, but is not limited to, one or more or any combination of the following: limestone, calcium carbonate, or calcium sulfite, or calcium citrate, or calcium carboxylate, or calcium sulfite, or calcium+anion of an acid weaker than hydrochloric acid, or calcium+anion of an acid weaker than a carboxylic acid, or alkaline earth+anion of an acid weaker than carboxylic acid, or alkaline earth bearing rock, or alkaline earth bearing product, or alkaline earth bearing waste product, or alkaline earth bearing synthetic product, or alkaline earth bearing tailings, or alkaline earth bearing ore, or calcium bearing rock, or concrete, or waste concrete, or aggregate, or calcium silicate, or calcium ferrite, or calcium aluminate, or ore, or tailings, or waste products, or sintered waste products. In some embodiments, an acid gas, such as carbon dioxide, or hydrogen sulfide, or sulfur dioxide, or any combination thereof, may be produced. In some embodiments, for example, a solid comprising calcium carbonate may be reacted with an acid comprising acetic acid to form, for example, a gas comprising carbon dioxide and a solution comprising calcium acetate. In some embodiments, it may be desirable for the gas comprising acid gas, such as carbon dioxide, to comprise a relatively high pressure, or relatively high partial pressure, or relatively high purity, or captured gas, or any combination thereof. In some embodiments, for example, an gas or fluid comprising an acid gas may be, for example, including, but not limited to, one or more or any combination of the following: a valuable product, or may be converted, or may be reacted, or may be utilized, or may be sold, or may be reacted with a chemical comprising ammonia, or may be reacted with a chemical comprising sodium hydroxide, or may be reacted to form a carbon dioxide derivative, or may be reacted to form urea, or any combination thereof. In some embodiments, a solution comprising an alkaline earth halide may be concentrated, or diluted, or treated, or purified, or any combination thereof. In some embodiments, for example, it may be desirable to concentrate or further concentrate a solution comprising an alkaline earth carboxylate to, for example, facilitate the formation and/or precipitation of calcium sulfate. In some embodiments, for example, it may be desirable to concentrate or further concentrate a solution comprising an alkaline earth carboxylate to, for example, facilitate the formation and/or precipitation of calcium sulfate, for example, which may occur or may be conducted in subsequent steps.

In some embodiments, it may be desirable to separate a portion of a chemical comprising an acid gas, such as carbon dioxide, from a solution comprising alkaline earth carboxylate, such as alkaline earth acetate. In some embodiments, for example, a solution comprising alkaline earth acetate may comprise carbon dioxide, or excess carbon dioxide, or a carbon dioxide derivate, or dissolved carbon dioxide, or any combination thereof. In some embodiments, for example, it may be desirable separate a portion of carbon dioxide, by, for example, including, but not limited to, one or more or any combination of the following: depressurization, or vacuum, or heating, or distillation, or membrane based process, or extraction, or reaction, or concentration, or extraction, or condensation, or deposition, or pressure swing adsorption, or pressure swing absorption, or adsorption, or absorption, or carrier gas, or stripping gas, or evaporation, or heating, or separations described herein, or separations in the art, or a separation process herein, or a separation process in the art.

In some embodiments, it may be desirable to remove or separate at a portion of a chemical comprising water from a solution comprising alkaline earth carboxylate. In some embodiments, it may be desirable to concentrate at least a portion of a solution comprising alkaline earth carboxylate. In some embodiments, it may be desirable to remove or separate at a portion of a chemical comprising water from a solution comprising alkaline earth carboxylate, for example, prior to, or during, or any combination thereof a reaction of a chemical comprising an alkaline earth carboxylate with a chemical comprising an alkali sulfate. In some embodiments, it may be desirable to remove or separate at a portion of a chemical comprising water from a solution comprising calcium acetate. In some embodiments, it may be desirable to concentrate at least a portion of a solution comprising calcium acetate. In some embodiments, it may be desirable to remove or separate at a portion of a chemical comprising water from a solution comprising calcium acetate, for example, prior to, or during, or any combination thereof a reaction of a chemical comprising a calcium acetate with a chemical comprising an alkali sulfate. In some embodiments, for example, it may be desirable for the concentration of a chemical comprising an alkaline earth carboxylate to comprise a greater weight percent concentration in a reaction of a chemical comprising an alkaline earth carboxylate and a chemical comprising an alkali sulfate than, for example, the weight percent concentration of a chemical comprising alkali carboxylate in a electrochemical separation, or transformation, or separation, or reaction, or any combination thereof, such as, for example, a feed comprising alkali carboxylate into a bipolar electrodialysis cell, or bipolar electrodialysis process, or any combination thereof. In some embodiments, for example, it may be desirable for a chemical comprising an alkaline earth carboxylate to comprise a sufficient concentration to enable, for example, the precipitation of at least a portion of a chemical comprising an alkaline earth sulfate, or to facilitate the reaction with a chemical comprising an alkali sulfate, or any combination thereof. In some embodiments, for example, it may be desirable for a chemical comprising an alkaline earth carboxylate to comprise a weight percent concentration greater than or equal to, including, but not limited to, one or more or any combination of the following: 0.5 wt %, or 1.0 wt %, or 1.5 wt %, or 2.0 wt %, or 2.5 wt %, or 3.0 wt %, or 3.5 wt %, or 4.0 wt %, or 4.5 wt %, or 5.0 wt %, or 5.5 wt %, or 6.0 wt %, or 6.5 wt %, or 7.0 wt %, or 7.5 wt %, or 8.0 wt %, or 8.5 wt %, or 9.0 wt %, or 9.5 wt %, or 10.0 wt %, or 10.5 wt %, or 11.0 wt %, or 11.5 wt %, or 12.0 wt %, or 12.5 wt %, or 13.0 wt %, or 13.5 wt %, or 14.0 wt %, or 14.5 wt %, or 15.0 wt %, or 15.5 wt %, or 16.0 wt %, or 16.5 wt %, or 17.0 wt %, or 17.5 wt %, or 18.0 wt %, or 18.5 wt %, or 19.0 wt %, or 19.5 wt %, or 20.0 wt %, or 20.5 wt %, or 21.0 wt %, or 21.5 wt %, or 22.0 wt %, or 22.5 wt %, or 23.0 wt %, or 23.5 wt %, or 24.0 wt %, or 24.5 wt %, or 25.0 wt %, or 25.5 wt %, or 26.0 wt %, or 26.5 wt %, or 27.0 wt %, or 27.5 wt %, or 28.0 wt %, or 28.5 wt %, or 29.0 wt %, or 29.5 wt %, or 30.0 wt %, or 30.5 wt %, or 31.0 wt %, or 31.5 wt %, or 32.0 wt %, or 32.5 wt %, or 33.0 wt %, or 33.5 wt %, or 34.0 wt %, or 34.5 wt %, or 35.0 wt %, or 35.5 wt %, or 36.0 wt %, or 36.5 wt %, or 37.0 wt %, or 37.5 wt %, or 38.0 wt %, or 38.5 wt %, or 39.0 wt %, or 39.5 wt %, or 40.0 wt %, or 40.5 wt %, or 41.0 wt %, or 41.5 wt %, or 42.0 wt %, or 42.5 wt %, or 43.0 wt %, or 43.5 wt %, or 44.0 wt %, or 44.5 wt %, or 45.0 wt %, or 45.5 wt %, or 46.0 wt %, or 46.5 wt %, or 47.0 wt %, or 47.5 wt %, or 48.0 wt %, or 48.5 wt %, or 49.0 wt %, or 49.5 wt %, or 50.0 wt %, or 50.5 wt %, or 51.0 wt %, or 51.5 wt %, or 52.0 wt %, or 52.5 wt %, or 53.0 wt %, or 53.5 wt %, or 54.0 wt %, or 54.5 wt %, or 55.0 wt %, or 55.5 wt %, or 56.0 wt %, or 56.5 wt %, or 57.0 wt %, or 57.5 wt %, or 58.0 wt %, or 58.5 wt %, or 59.0 wt %, or 59.5 wt %, or 60.0 wt %, or 60.5 wt %, or 61.0 wt %, or 61.5 wt %, or 62.0 wt %, or 62.5 wt %, or 63.0 wt %, or 63.5 wt %, or 64.0 wt %, or 64.5 wt %, or 65.0 wt %, or 65.5 wt %, or 66.0 wt %, or 66.5 wt %, or 67.0 wt %, or 67.5 wt %, or 68.0 wt %, or 68.5 wt %, or 69.0 wt %, or 69.5 wt %, or 70.0 wt %, or 70.5 wt %, or 71.0 wt %, or 71.5 wt %, or 72.0 wt %, or 72.5 wt %, or 73.0 wt %, or 73.5 wt %, or 74.0 wt %, or 74.5 wt %, or 75.0 wt %, or 75.5 wt %, or 76.0 wt %, or 76.5 wt %, or 77.0 wt %, or 77.5 wt %, or 78.0 wt %, or 78.5 wt %, or 79.0 wt %, or 79.5 wt %, or 80.0 wt %, or 80.5 wt %, or 81.0 wt %, or 81.5 wt %, or 82.0 wt %, or 82.5 wt %, or 83.0 wt %, or 83.5 wt %, or 84.0 wt %, or 84.5 wt %, or 85.0 wt %, or 85.5 wt %, or 86.0 wt %, or 86.5 wt %, or 87.0 wt %, or 87.5 wt %, or 88.0 wt %, or 88.5 wt %, or 89.0 wt %, or 89.5 wt %, or 90.0 wt %, or 90.5 wt %, or 91.0 wt %, or 91.5 wt %, or 92.0 wt %, or 92.5 wt %, or 93.0 wt %, or 93.5 wt %, or 94.0 wt %, or 94.5 wt %, or 95.0 wt %, or 95.5 wt %, or 96.0 wt %, or 96.5 wt %, or 97.0 wt %, or 97.5 wt %, or 98.0 wt %, or 98.5 wt %, or 99.0 wt %, or 99.5 wt %, or 100.0 wt %.

In some embodiments, a portion of a chemical comprising water may be removed or separated from a chemical comprising alkaline earth carboxylate. In some embodiments, a portion of a solution comprising water may be removed from a chemical comprising alkaline earth carboxylate. In some embodiments, a separation of a portion of water may comprise, including, but not limited to, one or more or any combination of the following: forward osmosis, or osmotically assisted reverse osmosis, or reverse osmosis, or capacitive deionization, or electrodialysis, or nanofiltration, or electrodeionization, or distillation, or MED, or MVC, or MVR, or MSF, or simple distillation, or extractive distillation, or freeze desalination, or a membrane based process, or evaporation, or dialysis, or crystallization, or a separation described herein, or a separation in the art. In some embodiments, a chemical comprising water, such as a portion of a chemical comprising water which may comprise a portion of a chemical comprising water separated from a solution comprising alkaline earth carboxylate, may, including, but not limited to, one or more or any combination of the following: be employed internally, or comprise an intermediate, or be used in the process, or be transferred to a process step, or comprise a product, or comprise a reactant, or comprise a reagent, or be treated, or be purified, or any combination thereof. In some embodiments, for example, a portion of a chemical comprising water may be employed to rinse a portion of a chemical comprising alkaline earth sulfate. In some embodiments, for example, a portion of a chemical comprising water may be employed in or mixed with a process step herein. In some embodiments, for example, a portion of a chemical comprising water may be employed to dilute, or reduce the concentration, or mix with, or any combination thereof a chemical comprising an alkali carboxylate.

In some embodiments, for example, it may be desirable to transfer at least a portion of a chemical comprising water from a solution comprising an alkaline earth carboxylate to a solution comprising an alkali carboxylate. In some embodiments, for example, it may be desirable to transfer at least a portion of a chemical comprising water from a solution comprising calcium acetate to a solution comprising sodium acetate. In some embodiments, for example, a solution comprising an alkaline earth carboxylate formed from a reaction of a chemical comprising an alkaline earth and a chemical comprising a carboxylic acid may comprise a lower concentration or osmotic pressure than a solution comprising an alkali carboxylate. In some embodiments, for example, it may be desirable to transfer or move at least a portion of a chemical comprising water from a solution comprising an alkaline earth carboxylate to a solution comprising alkali carboxylate. In some embodiments, for example, a solution comprising an alkaline earth carboxylate may comprise a feed solution and/or a solution comprising an alkali carboxylate may comprise a draw solution in, for example, a forward osmosis process, or an osmotically assisted reverse osmosis process, or any combination thereof. In some embodiments, for example, a portion of a chemical comprising water may permeate a membrane, such as a semipermeable membrane, from a solution comprising alkaline earth carboxylate to a solution comprising alkali carboxylate, which may result in an increase in the concentration of the solution comprising an alkaline earth carboxylate and/or a decrease or dilution in the concentration of a solution comprising an alkali carboxylate. In some embodiments, for example, employing forward osmosis, or osmotically assisted reverse osmosis, or a method for transferring water from a solution desiring concentrating to a solution desiring diluting, or any combination thereof may reduce energy consumption, or improve CAPEX, or improve OPEX, or increase density, or reduce sizing, or reduce complexity, or improve reliability, or improve maintainability, or any combination thereof.

In some embodiments, a chemical comprising an alkaline earth carboxylate may be reacted with a chemical comprising an alkali sulfate to form, for example, a portion of a chemical comprising an alkaline earth sulfate and/or a portion of a chemical comprising an alkali carboxylate. In some embodiments, for example, a solid or solution comprising calcium acetate may be reacted with a solid or solution comprising sodium sulfate to form, for example, a portion of a chemical comprising calcium sulfate and/or a portion of a chemical comprising sodium acetate. In some embodiments, for example, a solid or solution comprising calcium acetate may be reacted with a solid or solution comprising sodium sulfate to form, for example, a portion of a solid comprising calcium sulfate and/or a portion of a solution comprising sodium acetate. In some embodiments, it may be desirable to facilitate the precipitation of an alkaline earth sulfate, such as calcium sulfate, and/or facilitate separation by, for example, including, but not limited to, one or more or any combination of the following: optimize concentration, or employ higher concentration, or maximize concentration, or operate at a higher temperature, or heat the solution, or heat the reactor, or employ mixing in a manner which promotes larger precipitate particle size, or employ mixing in a manner which promotes nucleation, or concentrate, or employ precipitation promoters, or heating to reduce solubility, or heating to facilitate reaction rate, or cooling, or temperature change, or temperature swing, or conditions swing, or employ reaction promoters, or a process described herein, or a process in the art.

In some embodiments, it may be desirable to separate at least a portion of a chemical comprising alkaline earth sulfate from at least a portion of a chemical comprising alkali carboxylate. In some embodiments, for example, it may be desirable to separate at least a portion of solid comprising an alkaline earth sulfate from at least a portion of a solution comprising an alkali carboxylate. In some embodiments, it may be desirable to separate at least a portion of solid comprising a calcium sulfate from at least a portion of a solution comprising sodium acetate. In some embodiments, a solid-liquid separation may be employed, which may include, but is not limited to, one or more or any combination of the following: a centrifuge, or a filter press, or a decanter, or a filter, or a clarifier, or a flocculation device, or a density based separation, or a particle size based separation, or a gravitational separation, or a rotating filter, or a dryer, or a rinser, or a separation process described herein, or a separation process in the art.

In some embodiments, a solid comprising an alkaline earth sulfate, such as calcium sulfate, may be treated, or purified, or dried, or any combination thereof. In some embodiments, for example, a solid comprising an alkaline earth sulfate, such as calcium sulfate, may be rinsed. In some embodiments, for example, a solid comprising an alkaline earth sulfate, such as calcium sulfate, may be rinsed with a solution comprising water which may comprise a solution comprising water input. In some embodiments, for example, a solution comprising water may rinse a portion of a solid comprising calcium sulfate and/or a portion of the resulting rinsate or solution remaining after rinsing may be mixed with or react with a chemical comprising carboxylic acid to form, for example, a portion of a solution comprising carboxylic acid which may be reacted with a chemical comprising calcium, such as a calcium bearing material, or limestone, or waste concrete, or other chemical comprising alkaline earth described herein, or other chemical comprising alkaline earth in the art; and/or may form a portion of a chemical comprising an alkaline earth carboxylate.

In some embodiments, it may be desirable to remove at least a portion of any impurities from a solution comprising an alkali carboxylate, or alkali cation monovalent anion salt, or alkali cation anion salt, or any combination thereof. In some embodiments, it may be desirable to remove at least a portion of any impurities from a solution comprising an alkali carboxylate, such as sodium acetate. In some embodiments, for example, some electrochemical methods for transforming a solution comprising an alkali salt may require or benefit from higher purity, or low impurity concentrations, or any combination thereof. In some embodiments, for example, some electrochemical methods for transforming a solution comprising an alkali salt, or an alkali carboxylate, such as sodium acetate, into, for example, a portion of a chemical comprising alkali, or alkali hydroxide, or sodium hydroxide, or hydroxide, or carboxylic acid, or acetic acid, or halide, or chloride, or chlorine, or hydrochloric acid, or hydrogen, or any combination thereof may require or benefit from higher purity, or low impurity concentrations, or any combination thereof. In some embodiments, for example, a portion of alkaline earth may be present in a solution comprising alkali, such as a solution comprising an alkali carboxylate. In some embodiments, for example, it may be desirable to precipitate at least a portion of a chemical comprising residual alkaline earth by, for example, reacting with a chemical comprising an acid or acid anion with which an alkaline earth may possess low solubility or insolubility, which may include, for example, including, but not limited to, one or more or any combination of the following: carbon dioxide, or carbonate, or bicarbonate, or sesquicarbonate, or sulfite, or sulfide, or oxalate, or citrate. In some embodiments, for example, a chemical comprising sulfur dioxide may be added to a solution comprising an alkali carboxylate to, for example, react with a portion of a chemical comprising residual alkaline earth, such as alkaline earth carboxylate or alkaline earth sulfate, to form, for example, a portion of a precipitate comprising alkaline earth sulfite, which may be separated using a solid-liquid separation. In some embodiments, for example, a chemical comprising sulfur dioxide may be added to a solution comprising an alkali carboxylate to, for example, react with a portion of a chemical comprising calcium, such as calcium carboxylate or calcium sulfate, to form, for example, a portion of a precipitate or solid comprising calcium sulfite, which may be separated using a solid-liquid separation. In some embodiments, for example, a fluid comprising sulfur dioxide may be mixed with a solution comprising sodium acetate and residual salt comprising calcium, to form, for example, at least a portion of a solid precipitate comprising calcium sulfite. In some embodiments, for example, it may be desirable to add an anti-scalant, such as a chemical which may prevent the formation of scale comprising, for example, calcium sulfate or calcium carbonate. In some embodiments, it may be desirable to employ nanofiltration to separate, for example, a portion of an alkaline earth from a portion of an alkali. In some embodiments, for example, a salt comprising an alkaline earth, or an alkali sulfate, or metal impurities, or transition metal, or any combination thereof may comprise a divalent or multivalent salt and/or a salt comprising an alkali, or some carboxylates, or some carboxylic acids, or some halides, or monovalent anion, or any combination thereof may comprise monovalent ions, which may enable the at least partial separation using, for example, size based separation methods, which may include, but is not limited to, one or more or any combination of the following: nanofiltration, or monovalent selective electrodialysis, or monovalent selective ion exchange, or divalent or multivalent selective ion exchange. In some embodiments, it may be desirable to employ treatment, or further treatment, or polishing, or any combination thereof. In some embodiments, for example, may employ, for example, including, but not limited to, one or more or any combination of the following: ion exchange, or electrodialysis, or electrodeionization, or monovalent selective electrodialysis, or reactive separation, or high surface area material, or adsorption, or affinity based separation, or extraction, or freeze separation, or thermal separation, or a process for purification described herein, or a process for purification in the art, or separation process in the art, or a polishing process in the art, or a sodium acetate polishing process in the art, or an alkali purification process in the art, or alkali carboxylate polishing process in the art, or alkali carboxylate purification process in the art, or a alkali halide polishing process in the art, or a sodium chloride purification process in the art, or alkali carboxylate purification process in the art, or alkali carboxylate purification process. or alkali purification process.

In some embodiments, it may be desirable to dilute a chemical comprising alkali carboxylate. In some embodiments, it may be desirable to dilute a solution comprising alkali carboxylate. In some embodiments, a chemical comprising water may be added to a solution comprising alkali carboxylate to, for example, facilitate a chemical reaction, or transformation, or separation, or any combination thereof. In some embodiments, for example, a chemical comprising water may be added to a solution comprising sodium acetate to, for example, facilitate a chemical reaction, or transformation, or separation, or any combination thereof. In some embodiments, a chemical comprising water may be added to a solution comprising alkali carboxylate to, for example, facilitate an electrochemical reaction, or transformation, or separation, or any combination thereof. In some embodiments, for example, it may be desirable to form a solution comprising alkali carboxylate comprising a sufficiently low concentration to enable or facilitate effective, or energy efficient, or capital efficient, or any combination thereof electrochemical process. In some embodiments, for example, it may be desirable to form a solution comprising alkali carboxylate comprising a sufficiently low concentration to enable or facilitate effective, or energy efficient, or capital efficient, or any combination thereof bipolar electrodialysis. In some embodiments, for example, the concentration of a feed comprising an alkali carboxylate into an electrochemical process may be less than or equal to, including, but not limited to, one or more or any combination of the following: 0.5 wt %, or 1.0 wt %, or 1.5 wt %, or 2.0 wt %, or 2.5 wt %, or 3.0 wt %, or 3.5 wt %, or 4.0 wt %, or 4.5 wt %, or 5.0 wt %, or 5.5 wt %, or 6.0 wt %, or 6.5 wt %, or 7.0 wt %, or 7.5 wt %, or 8.0 wt %, or 8.5 wt %, or 9.0 wt %, or 9.5 wt %, or 10.0 wt %, or 10.5 wt %, or 11.0 wt %, or 11.5 wt %, or 12.0 wt %, or 12.5 wt %, or 13.0 wt %, or 13.5 wt %, or 14.0 wt %, or 14.5 wt %, or 15.0 wt %, or 15.5 wt %, or 16.0 wt %, or 16.5 wt %, or 17.0 wt %, or 17.5 wt %, or 18.0 wt %, or 18.5 wt %, or 19.0 wt %, or 19.5 wt %, or 20.0 wt %, or 20.5 wt %, or 21.0 wt %, or 21.5 wt %, or 22.0 wt %, or 22.5 wt %, or 23.0 wt %, or 23.5 wt %, or 24.0 wt %, or 24.5 wt %, or 25.0 wt %, or 25.5 wt %, or 26.0 wt %, or 26.5 wt %, or 27.0 wt %, or 27.5 wt %, or 28.0 wt %, or 28.5 wt %, or 29.0 wt %, or 29.5 wt %, or 30.0 wt %, or 30.5 wt %, or 31.0 wt %, or 31.5 wt %, or 32.0 wt %, or 32.5 wt %, or 33.0 wt %, or 33.5 wt %, or 34.0 wt %, or 34.5 wt %, or 35.0 wt %, or 35.5 wt %, or 36.0 wt %, or 36.5 wt %, or 37.0 wt %, or 37.5 wt %, or 38.0 wt %, or 38.5 wt %, or 39.0 wt %, or 39.5 wt %, or 40.0 wt %, or 40.5 wt %, or 41.0 wt %, or 41.5 wt %, or 42.0 wt %, or 42.5 wt %, or 43.0 wt %, or 43.5 wt %, or 44.0 wt %, or 44.5 wt %, or 45.0 wt %, or 45.5 wt %, or 46.0 wt %, or 46.5 wt %, or 47.0 wt %, or 47.5 wt %, or 48.0 wt %, or 48.5 wt %, or 49.0 wt %, or 49.5 wt %, or 50.0 wt %, or 50.5 wt %, or 51.0 wt %, or 51.5 wt %, or 52.0 wt %, or 52.5 wt %, or 53.0 wt %, or 53.5 wt %, or 54.0 wt %, or 54.5 wt %, or 55.0 wt %, or 55.5 wt %, or 56.0 wt %, or 56.5 wt %, or 57.0 wt %, or 57.5 wt %, or 58.0 wt %, or 58.5 wt %, or 59.0 wt %, or 59.5 wt %, or 60.0 wt %, or 60.5 wt %, or 61.0 wt %, or 61.5 wt %, or 62.0 wt %, or 62.5 wt %, or 63.0 wt %, or 63.5 wt %, or 64.0 wt %, or 64.5 wt %, or 65.0 wt %, or 65.5 wt %, or 66.0 wt %, or 66.5 wt %, or 67.0 wt %, or 67.5 wt %, or 68.0 wt %, or 68.5 wt %, or 69.0 wt %, or 69.5 wt %, or 70.0 wt %, or 70.5 wt %, or 71.0 wt %, or 71.5 wt %, or 72.0 wt %, or 72.5 wt %, or 73.0 wt %, or 73.5 wt %, or 74.0 wt %, or 74.5 wt %, or 75.0 wt %, or 75.5 wt %, or 76.0 wt %, or 76.5 wt %, or 77.0 wt %, or 77.5 wt %, or 78.0 wt %, or 78.5 wt %, or 79.0 wt %, or 79.5 wt %, or 80.0 wt %, or 80.5 wt %, or 81.0 wt %, or 81.5 wt %, or 82.0 wt %, or 82.5 wt %, or 83.0 wt %, or 83.5 wt %, or 84.0 wt %, or 84.5 wt %, or 85.0 wt %, or 85.5 wt %, or 86.0 wt %, or 86.5 wt %, or 87.0 wt %, or 87.5 wt %, or 88.0 wt %, or 88.5 wt %, or 89.0 wt %, or 89.5 wt %, or 90.0 wt %, or 90.5 wt %, or 91.0 wt %, or 91.5 wt %, or 92.0 wt %, or 92.5 wt %, or 93.0 wt %, or 93.5 wt %, or 94.0 wt %, or 94.5 wt %, or 95.0 wt %, or 95.5 wt %, or 96.0 wt %, or 96.5 wt %, or 97.0 wt %, or 97.5 wt %, or 98.0 wt %, or 98.5 wt %, or 99.0 wt %, or 99.5 wt %, or 100.0 wt %.

In some embodiments, for example, it may be desirable to transfer at least a portion of a chemical comprising water from a solution comprising an alkaline earth carboxylate to a solution comprising an alkali carboxylate. In some embodiments, for example, it may be desirable to transfer at least a portion of a chemical comprising water from a solution comprising calcium acetate to a solution comprising sodium acetate. In some embodiments, for example, a solution comprising an alkaline earth carboxylate formed from a reaction of a chemical comprising an alkaline earth and a chemical comprising a carboxylic acid may comprise a lower concentration or osmotic pressure than a solution comprising an alkali carboxylate. In some embodiments, for example, it may be desirable to transfer or move at least a portion of a chemical comprising water from a solution comprising an alkaline earth carboxylate to a solution comprising alkali carboxylate. In some embodiments, for example, a solution comprising an alkaline earth carboxylate may comprise a feed solution and/or a solution comprising an alkali carboxylate may comprise a draw solution in, for example, a forward osmosis process, or an osmotically assisted reverse osmosis process, or any combination thereof. In some embodiments, for example, a portion of a chemical comprising water may permeate a membrane, such as a semipermeable membrane, from a solution comprising alkaline earth carboxylate to a solution comprising alkali carboxylate, which may result in an increase in the concentration of the solution comprising an alkaline earth carboxylate and/or a decrease or dilution in the concentration of a solution comprising an alkali carboxylate. In some embodiments, for example, employing forward osmosis, or osmotically assisted reverse osmosis, or a method for transferring water from a solution desiring concentrating to a solution desiring diluting, or any combination thereof may reduce energy consumption, or improve CAPEX, or improve OPEX, or increase density, or reduce sizing, or reduce complexity, or improve reliability, or improve maintainability, or any combination thereof.

In some embodiments, a chemical comprising an alkali cation acid anion may be electrochemically transformed into, for example, a portion of a chemical comprising an alkali hydroxide and/or a portion of a chemical comprising an acid, or acid anion derivative, or any combination thereof. In some embodiments, a chemical comprising an alkali cation carboxylic acid anion may be electrochemically transformed into, for example, a portion of a chemical comprising an alkali hydroxide and/or a portion of a chemical comprising a carboxylic acid, or a carboxylic acid anion derivative, or acid derivative, or carboxylic acid derivative, or anion derivative, or any combination thereof. In some embodiments, a chemical comprising sodium acetate may be electrochemically transformed into, for example, a portion of a chemical comprising sodium hydroxide and/or a portion of a chemical comprising acetic acid. In some embodiments, a chemical comprising sodium acetate may be electrochemically transformed into, for example, a portion of a chemical comprising sodium hydroxide and/or a portion of a chemical comprising acetic acid, using, for example, including, but not limited to, one or more or any combination of the following: electrodialysis, or bipolar electrodialysis (BPED), or bipolar membranes (BPM), or electrolysis, or electrochemical separation, or any combination thereof.

In some embodiments, a chemical comprising hydrogen may be formed and/or may, for example, including, but not limited to, one or more or any combination of the following: comprise a valuable product, or be converted into a hydrogen derivative, or be employed as a reducing agent, or be reacted to form ammonia, or be used as a fuel, or be used as a source of energy, or be employed as an energy carrier, or be employed as an intermediate, or any combination thereof.

In some embodiments, a chemical comprising an carboxylic acid may be formed and/or may, for example, including, but not limited to, one or more or any combination of the following: be recycled or recirculated, or comprise an intermediate, or be reacted with or dissolved in a solution comprising water, or be reacted with a solution comprising rinsing water or a rinsate solution, or be reacted with a chemical comprising an alkaline earth, or reacted with a chemical comprising water and/or alkaline earth, or reacted with a chemical comprising calcium carbonate, or reacted with a chemical comprising calcium, or reacted with a chemical comprising calcium carbonate to form a chemical comprising calcium carboxylate and a chemical comprising carbon dioxide. In some embodiments, a chemical comprising carboxylic acid may be formed and/or the chemical comprising carboxylic acid formed may comprise an aqueous solution comprising carboxylic acid. In some embodiments, for example, chemical comprising carboxylic acid formed may comprise an aqueous solution comprising carboxylic acid with a concentration less than, or greater than, or equal to, or any combination thereof including, but not limited to, one or more or any combination of the following: 0.5 wt %, or 1.0 wt %, or 1.5 wt %, or 2.0 wt %, or 2.5 wt %, or 3.0 wt %, or 3.5 wt %, or 4.0 wt %, or 4.5 wt %, or 5.0 wt %, or 5.5 wt %, or 6.0 wt %, or 6.5 wt %, or 7.0 wt %, or 7.5 wt %, or 8.0 wt %, or 8.5 wt %, or 9.0 wt %, or 9.5 wt %, or 10.0 wt %, or 10.5 wt %, or 11.0 wt %, or 11.5 wt %, or 12.0 wt %, or 12.5 wt %, or 13.0 wt %, or 13.5 wt %, or 14.0 wt %, or 14.5 wt %, or 15.0 wt %, or 15.5 wt %, or 16.0 wt %, or 16.5 wt %, or 17.0 wt %, or 17.5 wt %, or 18.0 wt %, or 18.5 wt %, or 19.0 wt %, or 19.5 wt %, or 20.0 wt %, or 20.5 wt %, or 21.0 wt %, or 21.5 wt %, or 22.0 wt %, or 22.5 wt %, or 23.0 wt %, or 23.5 wt %, or 24.0 wt %, or 24.5 wt %, or 25.0 wt %, or 25.5 wt %, or 26.0 wt %, or 26.5 wt %, or 27.0 wt %, or 27.5 wt %, or 28.0 wt %, or 28.5 wt %, or 29.0 wt %, or 29.5 wt %, or 30.0 wt %, or 30.5 wt %, or 31.0 wt %, or 31.5 wt %, or 32.0 wt %, or 32.5 wt %, or 33.0 wt %, or 33.5 wt %, or 34.0 wt %, or 34.5 wt %, or 35.0 wt %, or 35.5 wt %, or 36.0 wt %, or 36.5 wt %, or 37.0 wt %, or 37.5 wt %, or 38.0 wt %, or 38.5 wt %, or 39.0 wt %, or 39.5 wt %, or 40.0 wt %, or 40.5 wt %, or 41.0 wt %, or 41.5 wt %, or 42.0 wt %, or 42.5 wt %, or 43.0 wt %, or 43.5 wt %, or 44.0 wt %, or 44.5 wt %, or 45.0 wt %, or 45.5 wt %, or 46.0 wt %, or 46.5 wt %, or 47.0 wt %, or 47.5 wt %, or 48.0 wt %, or 48.5 wt %, or 49.0 wt %, or 49.5 wt %, or 50.0 wt %.

In some embodiments, a chemical comprising an alkali hydroxide may be formed and/or may, for example, including, but not limited to, one or more or any combination of the following: comprise a valuable product, or may comprise an intermediate, or may be employed in a process which may have been a source of alkali sulfate, or may be employed in a circular economy, or may be reacted, or may be reacted to form a derivative, or may be reacted with carbon dioxide, or may be reacted with carbon dioxide to form an alkali carbonate, or may be reacted with emissions carbon dioxide, or may be reacted with air, or may be reacted with air comprising carbon dioxide, or may be reacted to form an ammonia derivative, or may be reacted to form urea, or may be reacted with a halide or halogen, or may be concentrated, or may be crystallized, or may be distilled, or may be diluted, or may be further concentrated, or may be reacted with chlorine, or may be reacted with chlorine to form an alkali chlorine derivative, or an alkali chlorine salt, or an alkali chlorate, or an alkali hypochlorite, or any combination thereof. In some embodiments, a chemical comprising alkali hydroxide may be formed and/or the chemical comprising alkali hydroxide formed may comprise an aqueous solution comprising alkali hydroxide. In some embodiments, for example, chemical comprising alkali hydroxide formed may comprise an aqueous solution comprising alkali hydroxide with a concentration less than, or greater than, or equal to, or any combination thereof including, but not limited to, one or more or any combination of the following: 0.5 wt %, or 1.0 wt %, or 1.5 wt %, or 2.0 wt %, or 2.5 wt %, or 3.0 wt %, or 3.5 wt %, or 4.0 wt %, or 4.5 wt %, or 5.0 wt %, or 5.5 wt %, or 6.0 wt %, or 6.5 wt %, or 7.0 wt %, or 7.5 wt %, or 8.0 wt %, or 8.5 wt %, or 9.0 wt %, or 9.5 wt %, or 10.0 wt %, or 10.5 wt %, or 11.0 wt %, or 11.5 wt %, or 12.0 wt %, or 12.5 wt %, or 13.0 wt %, or 13.5 wt %, or 14.0 wt %, or 14.5 wt %, or 15.0 wt %, or 15.5 wt %, or 16.0 wt %, or 16.5 wt %, or 17.0 wt %, or 17.5 wt %, or 18.0 wt %, or 18.5 wt %, or 19.0 wt %, or 19.5 wt %, or 20.0 wt %, or 20.5 wt %, or 21.0 wt %, or 21.5 wt %, or 22.0 wt %, or 22.5 wt %, or 23.0 wt %, or 23.5 wt %, or 24.0 wt %, or 24.5 wt %, or 25.0 wt %, or 25.5 wt %, or 26.0 wt %, or 26.5 wt %, or 27.0 wt %, or 27.5 wt %, or 28.0 wt %, or 28.5 wt %, or 29.0 wt %, or 29.5 wt %, or 30.0 wt %, or 30.5 wt %, or 31.0 wt %, or 31.5 wt %, or 32.0 wt %, or 32.5 wt %, or 33.0 wt %, or 33.5 wt %, or 34.0 wt %, or 34.5 wt %, or 35.0 wt %, or 35.5 wt %, or 36.0 wt %, or 36.5 wt %, or 37.0 wt %, or 37.5 wt %, or 38.0 wt %, or 38.5 wt %, or 39.0 wt %, or 39.5 wt %, or 40.0 wt %, or 40.5 wt %, or 41.0 wt %, or 41.5 wt %, or 42.0 wt %, or 42.5 wt %, or 43.0 wt %, or 43.5 wt %, or 44.0 wt %, or 44.5 wt %, or 45.0 wt %, or 45.5 wt %, or 46.0 wt %, or 46.5 wt %, or 47.0 wt %, or 47.5 wt %, or 48.0 wt %, or 48.5 wt %, or 49.0 wt %, or 49.5 wt %, or 50.0 wt %.

In some embodiments, an conversion or transformation of a chemical comprising an alkali, or alkali salt, or an alkali cation acid anion salt, or an alkali halide, or an alkali carboxylate, or any combination thereof into, for example, a chemical comprising an alkali, or alkali hydroxide, or an alkali salt, or acid, or aqueous acid, or a carboxylic acid, or a halogen, or a halide acid, or a halogen acid, or a derivative thereof, or any combination thereof may comprise, including, but not limited to, one or more or any combination of the following: bipolar electrodialysis (BPED), or bipolar membranes (BPM), or an electrodialysis cell, or electrolysis, or a chlor-alkali process, or a membrane cell, or a diaphragm cell, or a bipolar electrodialysis, or a mercury cell, or a bipolar electrodialysis cell, bipolar electrodialysis (BPED), or bipolar membranes (BPM), or an electrodialysis cell, or electrolysis, or an electrochemical process, or an electrochemical process described herein, or a process described herein, or an electrochemical process known in the art. In some embodiments, a chemical comprising an alkali carboxylate, or alkali acetate, or alkali chloride, or alkali halide, or alkali cation acid anion, or any combination thereof may comprise an input to a process for producing an alkali carbonate, or alkali bicarbonate, or any combination thereof, which may include, but is not limited to, one or more or any combination of the following: an ammonia-soda process, or a Solvay process, or a process for producing an alkali salt, or a process described herein, or a process referenced herein, or a process in the art, or any combination thereof.

EXAMPLE FIGURE DESCRIPTIONS

Example FIG. 1A, 1B, 1C Summary

FIG. 1 may comprise a process for producing a chemical comprising an alkali hydroxide and/or a chemical comprising an alkaline earth sulfate from a chemical comprising an alkali sulfate and/or a chemical comprising an alkaline earth. In some embodiments, a chemical intermediate comprising a halogen or halide may be employed.

FIG. 1A: FIG. 1A may comprise an embodiment employing an input comprising a chemical comprising calcium carbonate.

FIG. 1B: FIG. 1B may comprise an embodiment employing an input comprising a chemical comprising an alkaline earth cation weak acid anion. In some embodiments, a chemical comprising an alkaline earth cation weak acid anion may comprise a chemical comprising calcium carbonate, or calcium silicate, or other alkaline earth bearing materials herein, or other alkaline earth bearing materials in the art.

FIG. 1C: FIG. 1C may comprise embodiments of FIG. 1A, or 1B, or any combination thereof with number labels.

Example FIG. 1A, 1B, 1C Key

Example FIG. 1A, 1B, 1C Key

ID Example Description

1 '1' may comprise a solution comprising solvent. '1' may comprise a solution comprising water.
In some embodiments, a solution comprising water may be contacted with a solid comprising calcium sulfate, for example, to rinse the solid comprising calcium sulfate and/or remove a portion of any impurities, for example, prior to mixing with a chemical comprising a halogen or halide, such as chlorine or chloride or hydrochloric acid.

2 '2' may comprise a chemical comprising an alkaline earth. In some embodiments, '2' may comprise a chemical comprising an alkaline earth cation weak acid anion. In some embodiments, '2' may comprise a solid comprising calcium, or calcium carbonate, or waste concrete, or tailings, or limestone, or ore, or rock, or calcium bearing material, or magnesium bearing material, or any combination thereof.

3 In some embodiments, '3' may comprise a reactor, or mixer, or any combination thereof. In some embodiments, '3' may comprise a compressor or feeder for a gas comprising a halogen, such as chlorine, or hydrogen chloride, or any combination -continued

---

Example FIG. 1A, 1B, 1C Key

---

ID  Example Description

--- thereof. In some embodiments, '3' may comprise a reactor which may react at
least a portion of a chemical comprising alkaline earth with a portion of a chemical
comprising an acid, or a halide, or a halogen, or any combination thereof. In some
embodiments, '3' may comprise a process for at least partially separating a gas
comprising an acid gas, such as carbon dioxide, from a gas comprising a halogen,
such as a gas comprising chlorine. In some embodiments, '3' may comprise a
solid-liquid separator, for example, which may separate at least a portion of solid
impurities, or residual solids, or any combination thereof from a solution. In some
embodiments, '3' may comprise a process for removing at a portion of impurities.

4  In some embodiments, '4' may comprise a weak acid derivative, or a weak acid
anion derivative, or any combination thereof. In some embodiments, '4' may
comprise, for example, carbon dioxide, or sulfur dioxide, or hydrogen sulfide, or
silicon dioxide, or silicate, or iron oxide, or ferrite, or aluminate, or residual solids,
or gas, or a fluid, or a solid, or any combination thereof. In some embodiments,
'4' may comprise a mixture of a chemical comprising acid gas and a chemical
comprising a halogen gas, and/or the mixture may be separated into a portion
comprising a chemical comprising acid gas and a portion comprising chemical
comprising a halogen gas. In some embodiments, it may be desirable for '4' to be
at a relatively high pressure, or partial pressure, or any combination thereof, or to
comprise a captured gas or fluid, or to be at least partially treated, or to be at least
partially purified, or any combination thereof.

5  In some embodiments, '5' may comprise a solution comprising alkaline earth. In
some embodiments, '5' may comprise a solution comprising an alkaline earth
halide. In some embodiments, '5' may comprise a solution comprising calcium
chloride. In some embodiments, '5' may comprise residual chlorine, or residual
carbon dioxide, or any combination thereof. In some embodiments, '5' may
comprise a sufficiently high concentration of calcium chloride to, for example,
enable the precipitation of a portion of a solid comprising calcium sulfate in, for
example, '7'. In some embodiments, '5' may be concentrated, or further
concentrated, or diluted, or treated, or purified, or any combination thereof. In
some embodiments, it may be desirable to concentrate a portion of '5' and/or
transfer a portion of a chemical comprising water from '5' to, for example, '9'. In
some embodiments, for example, '5' may comprise a feed solution and/or '9' may
comprise a draw solution in a forward osmosis, or osmotically assisted reverse
osmosis, or any combination thereof process. In some embodiments, a solution
comprising an alkaline earth may undergo a portion of concentrating prior to, or
during, or any combination thereof '7', and/or a solution comprising an alkali may
undergo a portion of diluting during, or after, or any combination thereof '7', or
prior to, or during, or any combination thereof '11', or any combination thereof.

6  In some embodiments, '6' may comprise an alkali sulfate. In some embodiments,
'6' may comprise a chemical comprising an alkali sulfate. In some embodiments,
'6' may comprise sodium sulfate. In some embodiments, '6' may comprise
potassium sulfate. In some embodiments, '6' may comprise ammonium sulfate. In
some embodiments, '6' may comprise a solid, or a liquid, or solution, or any
combination thereof. In some embodiments, '6' may comprise an input.

7  In some embodiments, '7' may comprise a reactor, or mixer, or any combination
thereof. In some embodiments, '7' may comprise a reactor which may react a
portion of a chemical comprising an alkali sulfate with a portion of a chemical
comprising an alkaline earth anion to form, for example, a portion of a chemical
comprising an alkali anion and/or a portion of a chemical comprising an alkaline
earth sulfate. In some embodiments, '7' may comprise a reactor which may react
a portion of a chemical comprising an alkali sulfate with a portion of a chemical
comprising an alkaline earth halide, such as an alkaline earth chloride, to form,
for example, a portion of a chemical comprising an alkali halide and/or a portion
of a chemical comprising an alkaline earth sulfate. In some embodiments, '7' may
comprise a reactor which may react a portion of a chemical comprising sodium
sulfate with a portion of a chemical comprising calcium chloride to form, for
example, a portion of a chemical comprising sodium chloride and/or a portion of
a chemical comprising calcium sulfate. In some embodiments, '7' may comprise
a reactor and/or solid-liquid separator. In some embodiments, '7' may comprise a
reactor to form a portion of a solution comprising an alkali and a solid comprising
an alkaline earth, and/or a separation of portion of a solid comprising alkaline
earth from a solution comprising an alkali.

8  In some embodiments, '8' may comprise a chemical comprising an alkaline earth.
In some embodiments, '8' may comprise a solid comprising an alkaline earth. In
some embodiments, '8' may comprise a chemical comprising an alkaline earth
sulfate. In some embodiments, '8' may comprise a solid comprising an alkaline
earth sulfate. In some embodiments, '8' may comprise a solid comprising calcium
sulfate. In some embodiments, '8' may comprise a product. In some embodiments,
an alkaline earth sulfate may be treated, or purified, or any combination thereof.

9  In some embodiments, '9' may comprise a chemical comprising an alkali. In some
embodiments, '9' may comprise a chemical comprising an alkali anion. In some
embodiments, '9' may comprise a solution comprising an alkali anion. In some
embodiments, '9' may comprise a solution comprising an alkali halide. In some
embodiments, '9' may comprise a solution comprising sodium chloride. In some -continued

| Example FIG. 1A, 1B, 1C Key | |
|---|---|
| ID | Example Description | embodiments, '9' may be further purified, or polished, or treated, or any combination thereof. In some embodiments, '9' may comprise an alkali, or alkali anion, or alkali halide, or any combination thereof feed into a, for example, electrochemical process, or electrochemical reactor, or any combination thereof.

10  In some embodiments, '10' may comprise power or energy input. In some embodiments, '10' may comprise electricity input or electric power. In some embodiments, '10' may comprise a DC electricity input for an electrochemical cell, or AC electrical source, DC electrical source, or AC electrical source, or an electrical source, or any combination thereof.

11  In some embodiments, '11' may comprise an electrochemical reactor, or an electrochemical process, or an electrochemical cell, or any combination thereof. In some embodiments, for example, '11' may comprise a reactor, or cell, or process, or any combination thereof which may employ a power or energy input to convert a portion of a chemical comprising an alkali anion salt, into, for example, a chemical comprising an alkali salt, such as an alkali hydroxide, and/or a chemical comprising an anion acid, or anion derivative, or solvent derivative, or water derivative, or any combination thereof. In some embodiments, for example, '11' may comprise a reactor, or cell, or process, or any combination thereof which may employ a power or energy input to convert a portion of a chemical comprising an alkali halide, into, for example, a chemical comprising an alkali salt, such as an alkali hydroxide, and/or a chemical comprising a halide acid, or halogen, or halide derivative, or solvent derivative, or water derivative, or any combination thereof. In some embodiments, for example, '11' may comprise a reactor, or cell, or process, or any combination thereof which may employ a power or energy input to convert a portion of a chemical comprising sodium chloride, into, for example, a chemical comprising an alkali salt, such as an sodium hydroxide, and/or a chemical comprising, for example, including, but not limited to, one or more or any combination of the following: a hydrochloric acid, or chlorine, or chlorine derivative, or hydrogen, or any combination thereof.

12  In some embodiments, '12' may comprise a solvent derivative, such as a water derivative. In some embodiments, '12' may comprise hydrogen. Some embodiments may produce, for example, an acid and/or may avoid or minimally produce '12'. Some embodiments may produce, for example, an acid and/or may avoid or minimally produce hydrogen gas. Some embodiments may produce significant amounts of '12'. Some embodiments may produce significant amounts of hydrogen. In some embodiments, for example, an electrochemical reactor may produce hydrogen. In some embodiments, for example, '11' may comprise a chlor-alkali process and/or may produce a hydrogen byproduct. In some embodiments, '12' may be reacted and/or utilized. In some embodiments, '12' may comprise a valuable product. In some embodiments, '12' may comprise an intermediate. In some embodiments, '12' may comprise a feed or feedstock for a product. In some embodiments, '12' may comprise a fuel or energy carrier.

13  In some embodiments, '13' may comprise a product. In some embodiments, '13' may comprise a chemical comprising an alkali. In some embodiments, '13' may comprise a chemical comprising an alkali hydroxide. In some embodiments, '13' may comprise a chemical comprising sodium hydroxide. In some embodiments, '13' may comprise a solid or solution comprising sodium hydroxide. In some embodiments, it may be desirable to remove or separate a portion of water from a solution comprising a chemical comprising an alkali hydroxide, or to concentrate a solution comprising an alkali hydroxide, or any combination thereof. In some embodiments, it may be desirable to crystalize or form a solid comprising a chemical comprising an alkali hydroxide. In some embodiments, a solution comprising an alkali hydroxide may be concentrated. In some embodiments, a solution comprising an alkali hydroxide may be concentrated using, for example, including, but not limited to, one or more or any combination of the following: RO, or FO, or osmotically assisted reverse osmosis (OARO), or distillation, or MVC, or MVR, or MED, or freeze desalination, or crystallization, or a separation herein, or a separation in the art.

14  In some embodiments, '14' may comprise an intermediate. In some embodiments, '14' may comprise a product. In some embodiments, '14' may comprise a chemical comprising, including, but not limited to, one or more or any combination of the following: acid derivative, or an anion derivative, or an acid, or a halogen, or halide, or any combination thereof. In some embodiments, '14' may comprise a chemical comprising a halide or halogen which may be produced by '11'. In some embodiments, '14' may comprise chlorine, or hydrochloric acid, or any combination thereof. In some embodiments, if desired. '14' may undergo treatment, or purification, or concentrating, or diluting, or mixing, or any combination thereof.

Example FIG. 1A, 1B, 1C Step-by-Step
Description

React a Chemical Comprising Calcium Carbonate with a Chemical Comprising Chlorine: A solid comprising calcium carbonate may be reacted with a solution comprising chlorine to form, for example, a solution comprising calcium chloride and/or a gas or fluid comprising carbon dioxide.

React a Chemical Comprising Calcium Chloride with a Chemical Comprising Sodium Sulfate: A solution comprising calcium chloride may be reacted with a solid or solution comprising sodium sulfate to form, for example, a solid comprising calcium sulfate and/or a solution comprising sodium chloride.

Electrochemically Convert a Chemical Comprising Sodium Chloride into a Chemical Comprising Sodium Hydroxide and/or a Chemical Comprising Chlorine: A solution comprising sodium chloride may be electrochemically converted into a solution comprising sodium hydroxide and/or a chemical comprising chlorine.

Example FIG. 2A, 2B Summary

FIG. 2 may comprise a process for producing a chemical comprising an ammonia and/or a chemical comprising an alkaline earth sulfate from a chemical comprising an ammonium sulfate and/or a chemical comprising an alkaline earth. In some embodiments, a chemical intermediate comprising a halogen or halide may be employed.

FIG. 2A: FIG. 2A may comprise a descriptive labeled example embodiment for FIG. 2.

FIG. 2B: FIG. 2B may comprise a number labeled example embodiment for FIG. 2.

Example FIG. 2A, 2B Key

| ID | Example Description |
|---|---|
| | Example FIG. 2A, 2B Key |
| 1 | In some embodiments, '1' may comprise an alkali sulfate. In some embodiments, '1' may comprise a chemical comprising an alkali sulfate. In some embodiments, '1' may comprise ammonium sulfate. In some embodiments, '1' may comprise a solid, or a liquid, or solution, or any combination thereof. In some embodiments, '1' may comprise an input. |
| 2 | In some embodiments, '2' may comprise a reactor, or mixer, or any combination thereof. In some embodiments, '2' may comprise a reactor which may react a portion of a chemical comprising an alkali sulfate with a portion of a chemical comprising an alkaline earth anion to form, for example, a portion of a chemical comprising an alkali anion and/or a portion of a chemical comprising an alkaline earth sulfate. In some embodiments, '2' may comprise a reactor which may react a portion of a chemical comprising an alkali sulfate with a portion of a chemical comprising an alkaline earth halide, such as an alkaline earth chloride, to form, for example, a portion of a chemical comprising an alkali halide and/or a portion of a chemical comprising an alkaline earth sulfate. In some embodiments, '2' may comprise a reactor which may react a portion of a chemical comprising ammonium sulfate with a portion of a chemical comprising calcium chloride to form, for example, a portion of a chemical comprising ammonium chloride and/or a portion of a chemical comprising calcium sulfate. In some embodiments, '7' may comprise a reactor and/or solid-liquid separator. In some embodiments, '7' may comprise a reactor to form a portion of a solution comprising an alkali and a solid comprising an alkaline earth, and/or a separation of portion of a solid comprising alkaline earth from a solution comprising an alkali. |
| 3 | In some embodiments, '3' may comprise a chemical comprising an alkaline earth. In some embodiments, '3' may comprise a solid comprising an alkaline earth. In some embodiments, '3' may comprise a chemical comprising an alkaline earth sulfate. In some embodiments, '3' may comprise a solid comprising an alkaline earth sulfate. In some embodiments, '3' may comprise a solid comprising calcium sulfate. In some embodiments, '3' may comprise a product. In some embodiments, an alkaline earth sulfate may be treated, or purified, or any combination thereof. |
| 4 | In some embodiments, '4' may comprise a chemical comprising an alkali. In some embodiments, '4' may comprise a chemical comprising an alkali anion. In some embodiments, '4' may comprise a solution comprising an alkali anion. In some embodiments, '4' may comprise a solution comprising an alkali halide. In some embodiments, '4' may comprise a solution comprising ammonium chloride. In some embodiments, '4' may be further purified, or polished, or treated, or any combination thereof. In some embodiments, '4' may comprise an alkali, or alkali anion, or alkali halide, or any combination thereof. |
| 5 | In some embodiments, '5' may comprise a chemical comprising an alkaline earth hydroxide. In some embodiments, '5' may comprise a chemical comprising an alkaline earth oxide. In some embodiments, '5' may comprise a chemical comprise calcium hydroxide. In some embodiments, '5' may comprise a chemical comprise calcium oxide. In some embodiments, '5' may comprise a solid, or a solution, or a slurry, or a suspension, or a solid-liquid mixture, or an emulsion, or any combination thereof. In some embodiments, '5' may comprise a chemical suitable for reacting with a chemical comprising ammonium chloride to form, for example, a portion of a chemical comprising ammonia, or ammonium hydroxide, or an ammonia derivative, or any combination thereof. |
| 6 | In some embodiments, '6' may comprise a reactor, or mixer, or any combination thereof. In some embodiments, '6' may comprise a distillation process, or a separation process, or a solid-liquid separator, or a crystallizer, or a concentrator, or a gas former, or an evaporator, or any combination thereof. In some embodiments, '6' may react a chemical comprising an alkaline earth oxide, or alkaline earth hydroxide, or any combination thereof with a chemical comprising |

-continued

| Example FIG. 2A, 2B Key |
| --- |

ID Example Description an alkali chloride, such as ammonium chloride, to form, for example, a portion of
a chemical comprising an alkaline earth chloride and/or a portion of a chemical
comprising ammonia, or ammonium hydroxide, or any combination thereof. In
some embodiments, a solution comprising an alkaline earth chloride and/or
ammonia may form, and/or it may be desirable to separate a portion of a chemical
comprising ammonia from a portion of a chemical comprising alkaline earth
chloride. In some embodiments, a solution comprising calcium chloride and/or
ammonia may form, and/or it may be desirable to separate a portion of a chemical
comprising ammonia from a portion of a chemical comprising calcium chloride.
In some embodiments, a solid comprising an alkaline earth, such as an alkaline
earth carbonate, or an alkaline earth hydroxide, or an alkaline earth oxide, or any
combination thereof may be mixed with a solid or solution comprising ammonium
chloride, and/or the mixture may be heated to, for example, facilitate or enable a
reaction to form a portion of ammonia, or a portion of an alkaline earth chloride,
or a portion of water, or a portion of carbon dioxide, or a portion of acid gas, or
any combination thereof.

7  In some embodiments, '7' may comprise a chemical comprising an alkali. In some
embodiments, '7' may comprise a chemical comprising ammonia. In some
embodiments, '7' may comprise a gas, or a solution, or a liquid, or a fluid, or a
solid, or any combination thereof. In some embodiments, '7' may comprise a
solution comprising aqueous ammonia or ammonium hydroxide. In some
embodiments, a chemical comprising ammonia may be reacted to form, for
example, an ammonia derivative, which may include, but is not limited to, one or
more or any combination of the following: a salt comprising ammonia, or
ammonium carbonate, or ammonium bicarbonate, or ammonium carbamate, or
urea, or a nitrogenous chemical, or a fertilizer, or hydrogen, or a resin, or an amine,
or an ammonia derivative herein, or an ammonia derivative in the art, or any
combination thereof.

8  '8' may comprise an intermediate. '8' may comprise a product. '8' comprise a
chemical comprising an alkaline earth. '8' may comprise a chemical comprising
an alkaline earth chloride. '8' may comprise a chemical comprising calcium
chloride. '8' may comprise a solution or solid comprising calcium chloride.

Example FIG. 2A, 2B Step-by-Step Description

React a Chemical Comprising Calcium Chloride with a Chemical Comprising Ammonium Sulfate: A solution comprising calcium chloride may be reacted with a solid or solution comprising ammonium sulfate to form, for example, a solid comprising calcium sulfate and/or a solution comprising ammonium chloride.

React a Chemical Comprising Ammonium Chloride with a Chemical Comprising Calcium Hydroxide: A solution comprising ammonium chloride may be reacted with a solution, or solid, or slurry, or any combination thereof comprising calcium hydroxide to form, for example, a chemical comprising ammonia or ammonium hydroxide and/or a chemical comprising calcium chloride.

Note: The embodiments shown in FIG. 2A, 2B may also be applicable to other anions than halides. In some embodiments, for example, a carboxylic acid or carboxylate anion may be employed instead of, or in addition to, a halide. In some embodiments, for example, a chemical comprising ammonium acetate, or calcium acetate, or any combination thereof may be employed.

Example FIG. 3A, 3B, 3C Summary

FIG. 3 may comprise a process for producing a chemical comprising an alkali hydroxide and/or a chemical comprising an alkaline earth sulfate from a chemical comprising an alkali sulfate and/or a chemical comprising an alkaline earth. In some embodiments, a chemical intermediate comprising an acid, such as a carboxylic acid, may be employed.

FIG. 3A: FIG. 3A may comprise an embodiment employing an input comprising a chemical comprising calcium carbonate.

FIG. 3B: FIG. 3B may comprise an embodiment employing an input comprising a chemical comprising an alkaline earth cation weak acid anion. In some embodiments, a chemical comprising an alkaline earth cation weak acid anion may comprise a chemical comprising calcium carbonate, or calcium silicate, or other alkaline earth bearing materials herein, or other alkaline earth bearing materials in the art.

FIG. 3C: FIG. 3C may comprise embodiments of FIG. 3A, or 3B, or any combination thereof with number labels.

Example FIG. 3A, 3B, 3C Key

| Example FIG. 3A, 3B, 3C Key |
| --- |

ID Example Description

1  '1' may comprise a chemical comprising an alkaline earth. In some embodiments,
'1' may comprise a chemical comprising an alkaline earth cation weak acid anion.
In some embodiments, '1' may comprise a solid comprising, including, but not
limited to, one or more or any combination of the following: calcium, or calcium
carbonate, or waste concrete, or tailings, or limestone, or ore, or rock, or calcium
bearing material, or magnesium bearing material, or any combination thereof.

-continued

| Example FIG. 3A, 3B, 3C Key |
| --- |

ID  Example Description

2  In some embodiments, '2' may comprise a reactor, or mixer, or any combination thereof. In some embodiments, '2' may comprise a reactor which may react at least a portion of a chemical comprising alkaline earth with a portion of a chemical comprising an acid, or a carboxylic acid, or any combination thereof. In some embodiments, '2' may comprise a solid-liquid separator, for example, which may separate at least a portion of solid impurities, or residual solids, or any combination thereof from a solution. In some embodiments, '2' may comprise a process for removing at a portion of impurities. In some embodiments. '2' may comprise a process for producing a portion of an acid gas. In some embodiments, '2' may comprise a reactor for reacting a portion of a chemical comprising an alkaline earth cation weak acid anion with a chemical comprising an acid, to form, for example, a chemical comprising an alkaline earth - anion and a chemical comprising a weak acid or weak acid anion derivative. In some embodiments, '2' may comprise a reactor for reacting a portion of a chemical comprising an alkaline earth, such as calcium carbonate, with a chemical comprising a carboxylic acid, such as acetic acid, to form, for example, a solution comprising an alkaline earth carboxylate, such as calcium acetate, and a chemical comprising an acid gas, such as carbon dioxide.

3  In some embodiments, '3' may comprise a weak acid derivative, or a weak acid anion derivative, or any combination thereof. In some embodiments, '3' may comprise, for example, carbon dioxide, or sulfur dioxide, or hydrogen sulfide, or silicon dioxide, or silicate, or iron oxide, or ferrite, or aluminate, or residual solids, or gas, or a fluid, or a solid, or any combination thereof. In some embodiments, it may be desirable for '3' to be at a relatively high pressure, or partial pressure, or any combination thereof, or to comprise a captured gas or fluid, or to be at least partially treated, or to be at least partially purified, or any combination thereof.

4  In some embodiments, '4' may comprise a solution comprising alkaline earth. In some embodiments, '4' may comprise a solution comprising an alkaline earth carboxylate. In some embodiments, '4' may comprise a solution comprising calcium acetate. In some embodiments, '4' may comprise residual carboxylic acid, or residual carbon dioxide, or any combination thereof. In some embodiments, '4' may comprise a sufficiently high concentration of calcium acetate to, for example, enable the precipitation of a portion of a solid comprising calcium sulfate in, for example, '6'. In some embodiments, '4' may be concentrated, or further concentrated, or diluted, or treated, or purified, or any combination thereof. In some embodiments, it may be desirable to concentrate a portion of '4' and/or transfer a portion of a chemical comprising water from '4' to, for example, '8'. In some embodiments, for example, '4' may comprise a feed solution and/or '8' may comprise a draw solution in a forward osmosis, or osmotically assisted reverse osmosis, or any combination thereof process. In some embodiments, a solution comprising an alkaline earth may undergo a portion of concentrating prior to, or during, or any combination thereof '6', and/or a solution comprising an alkali may undergo a portion of diluting during, or after, or any combination thereof '6', or prior to, or during, or any combination thereof '11', or any combination thereof.

5  In some embodiments, '5' may comprise an alkali sulfate. In some embodiments, '5' may comprise a chemical comprising an alkali sulfate. In some embodiments, '5' may comprise sodium sulfate. In some embodiments, '5' may comprise potassium sulfate. In some embodiments, '5' may comprise ammonium sulfate. In some embodiments, '5' may comprise a solid, or a liquid, or solution, or any combination thereof. In some embodiments, '5' may comprise an input.

6  In some embodiments, '6' may comprise a reactor, or mixer, or any combination thereof. In some embodiments, '6' may comprise a reactor which may react a portion of a chemical comprising an alkali sulfate with a portion of a chemical comprising an alkaline earth anion to form, for example, a portion of a chemical comprising an alkali anion and/or a portion of a chemical comprising an alkaline earth sulfate. In some embodiments, '6' may comprise a reactor which may react a portion of a chemical comprising an alkali sulfate with a portion of a chemical comprising an alkaline earth carboxylate, such as calcium acetate, to form, for example, a portion of a chemical comprising an alkali carboxylate and/or a portion of a chemical comprising an alkaline earth sulfate. In some embodiments, '6' may comprise a reactor which may react a portion of a chemical comprising sodium sulfate with a portion of a chemical comprising calcium acetate to form, for example, a portion of a chemical comprising sodium acetate and/or a portion of a chemical comprising calcium sulfate. In some embodiments, '6' may comprise a reactor and/or solid-liquid separator. In some embodiments, '6' may comprise a reactor to form a portion of a solution comprising an alkali and a solid comprising an alkaline earth, and/or a separation of portion of a solid comprising alkaline earth from a solution comprising an alkali.

7  In some embodiments, '7' may comprise a chemical comprising an alkaline earth. In some embodiments, '7' may comprise a solid comprising an alkaline earth. In some embodiments, '7' may comprise a chemical comprising an alkaline earth sulfate. In some embodiments, '7' may comprise a solid comprising an alkaline earth sulfate. In some embodiments, '7' may comprise a solid comprising calcium sulfate. In some embodiments, '7' may comprise a product. In some embodiments, an alkaline earth sulfate may be treated, or purified, or any combination thereof.

-continued

| Example FIG. 3A, 3B, 3C Key |
| --- |

ID Example Description

8 In some embodiments, '8' may comprise a chemical comprising an alkali. In some
  embodiments, '8' may comprise a chemical comprising an alkali anion. In some
  embodiments, '8' may comprise a solution comprising an alkali anion. In some
  embodiments, '8' may comprise a solution comprising an alkali carboxylate. In
  some embodiments, '8' may comprise a solution comprising sodium carboxylate.
  In some embodiments, '8' may be further purified, or polished, or treated, or any
  combination thereof. In some embodiments, '8' may comprise an alkali, or alkali
  anion, or alkali carboxylate, or any combination thereof feed into a, for example,
  electrochemical process, or electrochemical reactor, or any combination thereof.
9 In some embodiments, '9' may comprise power or energy input. In some
  embodiments, '9' may comprise electricity input or electric power. In some
  embodiments, '9' may comprise a DC electricity input for an electrochemical cell,
  or AC electrical source, DC electrical source, or AC electrical source, or an
  electrical source, or any combination thereof.
10 '10' may comprise a solution comprising solvent. '10' may comprise a solution
  comprising water. In some embodiments, if desired, water may be added at other
  points in the process, which may be described herein.
11 In some embodiments, '11' may comprise an electrochemical reactor, or an
  electrochemical process, or an electrochemical cell, or any combination thereof.
  In some embodiments, for example, '11' may comprise a reactor, or cell, or
  process, or any combination thereof which may employ a power or energy input
  to convert a portion of a chemical comprising an alkali anion salt, into, for
  example, a chemical comprising an alkali salt, such as an alkali hydroxide, and/or
  a chemical comprising an anion acid, or anion derivative, or solvent derivative, or
  water derivative, or any combination thereof. In some embodiments, for example,
  '11' may comprise a reactor, or cell, or process, or any combination thereof which
  may employ a power or energy input to convert a portion of a chemical comprising
  an alkali carboxylate, into, for example, a chemical comprising an alkali salt, such
  as an alkali hydroxide, and/or a chemical comprising a carboxylic acid, or
  carboxylic acid derivative, or a solvent derivative, or water derivative, or any
  combination thereof. In some embodiments, for example, '11' may comprise a
  reactor, or cell, or process, or any combination thereof which may employ a power
  or energy input to convert a portion of a chemical comprising sodium acetate, into,
  for example, a chemical comprising an alkali salt, such as an sodium hydroxide,
  and/or a chemical comprising, for example, including, but not limited to, one or
  more or any combination of the following: a carboxylic acid, or carboxylic acid
  derivative, or a solvent derivative, or water derivative, or any combination thereof,
  or hydrogen, or any combination thereof. In some embodiments, '11' may
  comprise a process comprising electrodialysis, such as Bipolar Electrodialysis.
12 In some embodiments, '12' may comprise a product. In some embodiments, '12'
  may comprise a chemical comprising an alkali. In some embodiments, '12' may
  comprise a chemical comprising an alkali hydroxide. In some embodiments, '12'
  may comprise a chemical comprising sodium hydroxide. In some embodiments,
  '12' may comprise a solid or solution comprising sodium hydroxide. In some
  embodiments, it may be desirable to remove or separate a portion of water from a
  solution comprising a chemical comprising an alkali hydroxide, or to concentrate
  a solution comprising an alkali hydroxide, or any combination thereof. In some
  embodiments, it may be desirable to crystalize or form a solid comprising a
  chemical comprising an alkali hydroxide. In some embodiments, a solution
  comprising an alkali hydroxide may be concentrated. In some embodiments, a
  solution comprising an alkali hydroxide may be concentrated using, for example,
  including, but not limited to, one or more or any combination of the following:
  RO, or FO, or osmotically assisted reverse osmosis (OARO), or distillation, or
  MVC, or MVR, or MED, or freeze desalination, or crystallization, or a separation
  herein, or a separation in the art.
13 In some embodiments, '13' may comprise an intermediate. In some embodiments,
  '13' may comprise a product. In some embodiments, '13' may comprise a
  chemical comprising, including, but not limited to, one or more or any
  combination of the following: an acid, or a carboxylic acid, or an acid derivative,
  or an anion derivative, or an acid, or a halogen, or halide, or any combination
  thereof. In some embodiments, '13' may comprise a solution comprising a
  carboxylic acid. In some embodiments, '13' may comprise a solution comprising
  a carboxylic acid, such as acetic acid.

3. Example FIG. 3A, 3B, 3C Step-by-Step Description

React a Chemical Comprising Calcium Carbonate with a Chemical Comprising Acetic Acid: A solid comprising calcium carbonate may be reacted with a solution comprising acetic acid to form, for example, a solution comprising calcium acetate and/or a gas or fluid comprising carbon dioxide.

React a Chemical Comprising Calcium Acetate with a Chemical Comprising Sodium Sulfate: A solution comprising calcium acetate may be reacted with a solid or solution comprising sodium sulfate to form, for example, a solid comprising calcium sulfate and/or a solution comprising sodium acetate.

Electrochemically Convert a Chemical Comprising Sodium Acetate into a Chemical Comprising Sodium Hydroxide and/or a Chemical Comprising Acetic Acid: A solution comprising sodium acetate may be electrochemically converted into a solution comprising sodium hydroxide and/or a solution comprising acetic acid.

4. Example Embodiments

1. A process comprising:
   reacting a component comprising calcium carbonate, or calcium sulfide, or calcium hydroxide, or calcium oxide, or calcium weak acid, or any combination thereof with a component comprising a carboxylic acid to form a component comprising a calcium carboxylate and a component comprising carbon dioxide, or hydrogen sulfide, or water, or any combination thereof;
   reacting the component comprising the calcium carboxylate with a component comprising an alkali sulfate to form a component comprising an alkali carboxylate and a component comprising calcium sulfate;
   reacting the component comprising an alkali carboxylate in an electrochemical process to form a component comprising an alkali hydroxide and a component comprising an alkali carboxylate.
2. The process of example independent or dependent embodiment 1 wherein the alkali comprises a group selected from: lithium (Li), or sodium (Na), or potassium (K), or rubidium (Rb), or cesium (Cs), or ammonia, or ammonium, or ammonia (NH3), or ammonium (NH4), or amine.
3. The process of example independent or dependent embodiment 1 wherein the carboxylic acid comprises a group selected from: formic acid, or acetic acid, or propanoic acid
4. The process of example independent or dependent embodiment 1 wherein the calcium carboxylate formed from the reacting of the component comprising calcium carbonate, or calcium sulfide, or calcium hydroxide, or calcium oxide, or calcium weak acid, or any combination thereof with the component comprising a carboxylic acid is concentrated prior to the reaction with the alkali sulfate.
5. The process of example independent or dependent embodiment 1 wherein the component comprising an alkali carboxylate formed is diluted prior to the reaction with the component comprising an alkali sulfate.
6. The process of example independent or dependent embodiment 5 wherein a portion of the water for said dilution of the component comprising an alkali carboxylate comprises water separated from the component comprising alkaline earth carboxylate.
7. The process of example independent or dependent embodiment 6 wherein the component comprising calcium carboxylate formed comprises a feed solution and the component comprising alkali carboxylate formed comprises a draw solution in a forward osmosis process, or osmotically assisted reverse osmosis process.
7. The process of example independent or dependent embodiment 5 wherein a portion of the water is transferred from the component comprising calcium carboxylate to the component comprising an alkali carboxylate by permeation through a semi-permeable membrane/
8. The process of example independent or dependent embodiment 1 wherein the electrochemical process comprises electrodialysis or bipolar electrodialysis.

9. The process of example independent or dependent embodiment 1 wherein a portion of the calcium sulfate is separated by a solid-liquid separation.
10. A process comprising:
    reacting a component comprising calcium carbonate, or calcium sulfide, or calcium hydroxide, or calcium oxide, or calcium weak acid, or any combination thereof with a component comprising a halogen to form a component comprising a calcium halide and a component comprising carbon dioxide, or hydrogen sulfide, or water, or any combination thereof;
    reacting the component comprising the calcium halide with a component comprising an alkali sulfate to form a component comprising an alkali halide and a component comprising calcium sulfate;
    reacting the component comprising an alkali halide in an electrochemical process to form a component comprising an alkali hydroxide and a component comprising a halogen.
11. The process of example independent or dependent embodiment 10 wherein the alkali comprises a group selected from: lithium (Li), or sodium (Na), or potassium (K), or rubidium (Rb), or cesium (Cs), or ammonia, or ammonium, or ammonia (NH3), or ammonium (NH4), or amine.
12. The process of example independent or dependent embodiment 10 wherein the halogen comprises a group selected from: Fluorine (F), Chlorine (Cl), Bromine (Br), Iodine (I), Astatine (At).
13. The process of example independent or dependent embodiment 10 wherein the halide comprises a group selected from: Fluoride (F$^-$), Chloride (Cl$^-$), Bromide (Br$^-$), Iodide (I$^-$), Astatide (At$^-$).
14. The process of example independent or dependent embodiment 10 wherein the electrochemical process comprises a membrane cell, or diaphragm cell, or mercury cell, or electrodialysis, or bipolar electrodialysis.
15. A process comprising:
    reacting a component comprising alkaline earth carbonate, or alkaline earth sulfide, or alkaline earth hydroxide, or alkaline earth oxide, or alkaline earth weak acid, or any combination thereof with a component comprising an acid to form a component comprising a an alkaline earth acid anion and a component comprising carbon dioxide, or hydrogen sulfide, or water, or any combination thereof;
    reacting the component comprising the alkaline earth acid anion with a component comprising an alkali sulfate to form a component comprising an alkali acid anion and a component comprising calcium sulfate;
    reacting the component comprising an alkali acid anion in an electrochemical process to form a component comprising an alkali hydroxide and a component comprising an acid or an acid derivative.
16. A process comprising:
    reacting a component comprising calcium halide with a component comprising a ammonium sulfate to form a component comprising a calcium sulfate and a component comprising ammonium halide;
    reacting the component comprising the ammonium halide with a component comprising calcium hydroxide to form a component comprising ammonia and a component comprising calcium halide;

separating a portion of the component comprising calcium halide form a portion of the component comprising ammonia.

17. The process of example independent or dependent embodiment 16 wherein a portion of the component comprising calcium sulfate is separated from a portion of the component comprising ammonium chloride.

18. The process of example independent or dependent embodiment 16 wherein the separation comprises distillation.

19. The process of example independent or dependent embodiment 16 wherein the separated ammonia comprises aqueous ammonia, or ammonium hydroxide, or gaseous ammonia, or liquid ammonia, or ammonium carbonate, or ammonium bicarbonate, or ammonium carbamate, or urea, or a derivative thereof.

20. The process of example independent or dependent embodiment 16 wherein the halide comprises a group selected from: Fluoride (F$^-$), Chloride (Cl$^-$), Bromide (Br$^-$), Iodide (I$^-$), Astatide (At$^-$).

Notes

Some embodiments may employ at least a portion of energy recovery, or power recovery, or recovery, or chemical recovery, or any combination thereof.

Some embodiments may employ at least a portion of energy recovery, or power recovery, or recovery, or chemical recovery, or any combination thereof. For example, in some embodiments, at least a portion of energy or power may be recovered from pressure, or excess pressure, or any combination thereof. For example, in some embodiments, at least a portion of energy or power may be recovered from the pressure of a retentate solution, using, for example, including, but not limited to, one or more or any combination of the following: a pressure exchanger, or a PX pressure exchanger, or a turbocharger pressure exchanger, or a continuous pressure exchanger, or a batch pressure exchanger, or other pressure exchanging mechanism, or other power recovery mechanism, or other energy recovery mechanism, or any combination thereof. For example, in some embodiments, at least a portion of energy or power may be recovered from the pressure which may be generated or released from the depressurization of a solution comprising dissolved gas, such as, for example, dissolved acid gas, such as, for example, dissolved carbon dioxide. For example, in some embodiments, a portion of power or energy may be generated, or transferred, or exchanged, using, for example, including, but not limited to, one or more or any combination of the following: a turbocharger, or a pneumatic turbine, or a gas turbine, or pneumatic generator, or an expansion turbine, or other energy recovery mechanism, or other power recovery mechanism, or any combination thereof.

Sodium may be provided as an example alkali. Other alkalis or alkali-like cations may be employed instead of, or in addition to, for example, sodium. For example, other alkalis or alkali-like cations may include, but may be not limited to, one or more or any combination of the following: lithium (Li), or sodium (Na), or potassium (K), or rubidium (Rb), or cesium (Cs), or ammonia, or ammonium, or ammonia (NH$_3$), or ammonium (NH$_4$), or amine, or ammonia-derivative, or nitrogenous cation.

Calcium may be provided as an example alkaline-earth. Other alkaline-earths or alkaline-earth-like cations may be employed instead of, or in addition to, for example, calcium. For example, other alkaline-earths or alkaline-earth-like cations may include, but may be not limited to, one or more or any combination of the following: beryllium (Be), magnesium (Mg), calcium (Ca), strontium (Sr), barium (Ba), and radium (Ra), or amine, or ammonia-derivative, or nitrogenous cation.

In some embodiments, the term 'chemical' or 'component' may be used interchangeably. In some embodiments, a chemical may comprise a component. In some embodiments, a component may comprise a chemical. In some embodiments, a 'chemical' or a 'component' may comprise a 'substance' or 'matter'. In some embodiments, a chemical or component may comprise, including, but not limited to, one or more or any combination of the following: a mixture, or may be pure, or a impure, or a solid, or a liquid, or a gas, or a fluid, or a plasma, or a phase, or a phase of matter, or a mixture of phases, or a mixture of matter, or any combination thereof.

Halogens or halides may include, but are not limited to, one or more or any combination of the following: Fluorine (F), or Chlorine (Cl), or Bromine (Br), or Iodine (I), or Astatine (At), or Fluoride (F$^-$), or Chloride (Cl$^-$), or Bromide (Br), or Iodide (I$^-$), or Astatide (At$^-$), or monovalent acids, or monovalent ions, or monovalent carboxylic acids, or monovalent anions, or derivative acids, or anions.

In some embodiments, acetic acid or acetate may be provided as an example carboxylic acid, or acid, or an acid with a vapor pressure less than water, or an acid with a vapor pressure less than carbon dioxide, or an acid with a boiling point greater than water, or an acid with a boiling point greater than carbon dioxide, a weak acid with a vapor pressure less than water, or an weak acid with a vapor pressure less than carbon dioxide, or a weak acid with a boiling point greater than water, or a weak acid with a boiling point greater than carbon dioxide, or any combination thereof. In some embodiments, acetic acid or acetate may be provided as an example carboxylic acid, or acid, or acid stronger than carbonic acid and weaker than sulfurous acid, or any combination thereof. Other carboxylic acids, or acids, or acids stronger than carbonic acid and weaker than sulfurous acid, or any combination thereof may be employed instead of, or in addition to, for example, acetic acid. In some embodiments, acids, or carboxylic acids, or any combination thereof may be employed and may include, but are not limited to, one or more or any combination of the following: formic acid, or acetic acid, or propanoic acid, or volatile acid, or non-volatile acid, or low vapor pressure acid, or acid with a vapor pressure low than that of water, or acid with a boiling point temperature higher than water, or organic acid with a boiling point temperature higher than water, or organic acid with a boiling point temperature similar to water, or citric acid, or malic acid, Tartaric Acid, or Fumaric acid, or Adipic Acid, or Benzoic Acid, or Succinic Acid, or oxalic acid, or Lactic acid, or glycolic acid, or Glyceric acid, or gluconic acid, or glyoxylic acid, or butyric acid, or Valeric acid, or Isocyanic acid, or C1 acids, or C2 acids, or C3 acids, or C4 acids, or C5 acids, or C6 acids, or C7 acids, or C8 acids, or C9 acids, or C10 acids, or an acid with a vapor pressure less than water, or an acid with a vapor pressure less than carbon dioxide, or an acid with a boiling point greater than water, or an acid with a boiling point greater than carbon dioxide, a weak acid with a vapor pressure less than water, or an weak acid with a vapor pressure less than carbon dioxide, or a weak acid with a boiling point greater than water, or a weak acid with a boiling point greater than carbon dioxide, or carboxylic acids known in the art, or acids known in the art.

In some embodiments, the concentration of a chemical or solute or dissolved gas or any combination thereof in a solution may be less than, or equal to, or greater than, including, but not limited to, one or more or any combination of the following: 0.01 g/L, or 0.05 g/L, or 0.1 g/L, or 0.25 g/L, or 0.5 g/L, or 0.75 g/L, or 1 g/L, or 2 g/L, or 3 g/L, or 4 g/L, or 5 g/L, or 10 g/L, or 15 g/L, or 20 g/L, or 25 g/L, or 30 g/L, or 35 g/L, or 40 g/L, or 45 g/L, or 50 g/L, or 55 g/L, or 60 g/L, or 65 g/L, or 70 g/L, or 75 g/L, or 80 g/L, or 85 g/L, or 90 g/L, or 95 g/L, or 100 g/L, or 105 g/L, or 110 g/L, or 115 g/L, or 120 g/L, or 125 g/L, or 130 g/L, or 135 g/L, or 140 g/L, or 145 g/L, or 150 g/L, or 155 g/L, or 160 g/L, or 165 g/L, or 170 g/L, or 175 g/L, or 180 g/L, or 185 g/L, or 190 g/L, or 195 g/L, or 200 g/L, or 205 g/L, or 210 g/L, or 215 g/L, or 220 g/L, or 225 g/L, or 230 g/L, or 235 g/L, or 240 g/L, or 245 g/L, or 250 g/L, or 255 g/L, or 260 g/L, or 265 g/L, or 270 g/L, or 275 g/L, or 280 g/L, or 285 g/L, or 290 g/L, or 295 g/L, or 300 g/L, or 305 g/L, or 310 g/L, or 315 g/L, or 320 g/L, or 325 g/L, or 330 g/L, or 335 g/L, or 340 g/L, or 345 g/L, or 350 g/L, or 355 g/L, or 360 g/L, or 365 g/L, or 370 g/L, or 375 g/L, or 380 g/L, or 385 g/L, or 390 g/L, or 395 g/L, or 400 g/L, or 405 g/L, or 410 g/L, or 415 g/L, or 420 g/L, or 425 g/L, or 430 g/L, or 435 g/L, or 440 g/L, or 445 g/L, or 450 g/L, or 455 g/L, or 460 g/L, or 465 g/L, or 470 g/L, or 475 g/L, or 480 g/L, or 485 g/L, or 490 g/L, or 495 g/L, or 500 g/L, or 505 g/L, or 510 g/L, or 515 g/L, or 520 g/L, or 525 g/L, or 530 g/L, or 535 g/L, or 540 g/L, or 545 g/L, or 550 g/L, or 555 g/L, or 560 g/L, or 565 g/L, or 570 g/L, or 575 g/L, or 580 g/L, or 585 g/L, or 590 g/L, or 595 g/L, or 600 g/L, or 605 g/L, or 610 g/L, or 615 g/L, or 620 g/L, or 625 g/L, or 630 g/L, or 635 g/L, or 640 g/L, or 645 g/L, or 650 g/L, or 655 g/L, or 660 g/L, or 665 g/L, or 670 g/L, or 675 g/L, or 680 g/L, or 685 g/L, or 690 g/L, or 695 g/L, or 700 g/L, or 705 g/L, or 710 g/L, or 715 g/L, or 720 g/L, or 725 g/L, or 730 g/L, or 735 g/L, or 740 g/L, or 745 g/L, or 750 g/L, or 755 g/L, or 760 g/L, or 765 g/L, or 770 g/L, or 775 g/L, or 780 g/L, or 785 g/L, or 790 g/L, or 795 g/L, or 800 g/L, or 805 g/L, or 810 g/L, or 815 g/L, or 820 g/L, or 825 g/L, or 830 g/L, or 835 g/L, or 840 g/L, or 845 g/L, or 850 g/L, or 855 g/L, or 860 g/L, or 865 g/L, or 870 g/L, or 875 g/L, or 880 g/L, or 885 g/L, or 890 g/L, or 895 g/L, or 900 g/L, or 905 g/L, or 910 g/L, or 915 g/L, or 920 g/L, or 925 g/L, or 930 g/L, or 935 g/L, or 940 g/L, or 945 g/L, or 950 g/L, or 955 g/L, or 960 g/L, or 965 g/L, or 970 g/L, or 975 g/L, or 980 g/L, or 985 g/L, or 990 g/L, or 995 g/L, or 1000 g/L In some embodiments, the concentration of a chemical or solute or dissolved gas or any combination thereof in a solution may be less than, or equal to, or greater than, including, but not limited to, one or more or any combination of the following: 0.0001 g/1000 g water, or 0.001 g/1000 g water, or 0.01 g/1000 g water, or 0.05 g/1000 g water, or 0.10 g/1000 g water, or 0.20 g/1000 g water, or 0.50 g/1000 g water, or 0.75 g/1000 g water, or 1 g/1000 g water, or 2 g/1000 g water, or 3 g/1000 g water, or 4 g/1000 g water, or 5 g/1000 g water, 6 g/1000 g water, or 7 g/1000 g water, or 8 g/1000 g water, or 9 g/1000 g water, or 10 g/1000 g water, or 20 g/1000 g water, or 30 g/1000 g water, or 40 g/1000 g water, or 50 g/1000 g water, or 60 g/1000 g water, or 70 g/1000 g water, or 80 g/1000 g water, or 90 g/1000 g water, or 100 g/1000 g water, or 110 g/1000 g water, or 120 g/1000 g water, or 130 g/1000 g water, or 140 g/1000 g water, or 150 g/1000 g water, or 160 g/1000 g water, or 170 g/1000 g water, or 180 g/1000 g water, or 190 g/1000 g water, or 200 g/1000 g water, or 210 g/1000 g water, or 220 g/1000 g water, or 230 g/1000 g water, or 240 g/1000 g water, or 250 g/1000 g water, or 260 g/1000 g water, or 270 g/1000 g water, or 280 g/1000 g water, or 290 g/1000 g water, or 300 g/1000 g water, or 310 g/1000 g water, or 320 g/1000 g water, or 330 g/1000 g water, or 340 g/1000 g water, or 350 g/1000 g water, or 360 g/1000 g water, or 370 g/1000 g water, or 380 g/1000 g water, or 390 g/1000 g water, or 400 g/1000 g water, or 410 g/1000 g water, or 420 g/1000 g water, or 430 g/1000 g water, or 440 g/1000 g water, or 450 g/1000 g water, or 460 g/1000 g water, or 470 g/1000 g water, or 480 g/1000 g water, or 490 g/1000 g water, or 500 g/1000 g water, or 510 g/1000 g water, or 520 g/1000 g water, or 530 g/1000 g water, or 540 g/1000 g water, or 550 g/1000 g water, or 560 g/1000 g water, or 570 g/1000 g water, or 580 g/1000 g water, or 590 g/1000 g water, or 600 g/1000 g water, or 610 g/1000 g water, or 620 g/1000 g water, or 630 g/1000 g water, or 640 g/1000 g water, or 650 g/1000 g water, or 660 g/1000 g water, or 670 g/1000 g water, or 680 g/1000 g water, or 690 g/1000 g water, or 700 g/1000 g water, or 710 g/1000 g water, or 720 g/1000 g water, or 730 g/1000 g water, or 740 g/1000 g water, or 750 g/1000 g water, or 760 g/1000 g water, or 770 g/1000 g water, or 780 g/1000 g water, or 790 g/1000 g water, or 800 g/1000 g water, or 810 g/1000 g water, or 820 g/1000 g water, or 830 g/1000 g water, or 840 g/1000 g water, or 850 g/1000 g water, or 860 g/1000 g water, or 870 g/1000 g water, or 880 g/1000 g water, or 890 g/1000 g water, or 900 g/1000 g water, or 910 g/1000 g water, or 920 g/1000 g water, or 930 g/1000 g water, or 940 g/1000 g water, or 950 g/1000 g water, or 960 g/1000 g water, or 970 g/1000 g water, or 980 g/1000 g water, or 990 g/1000 g water, or 1000 g/1000 g water, or 1,250 g/1000 g water, or 1,500 g/1000 g water, or 2,000 g/1000 g water, or 2,500 g/1000 g water, or 3,000 g/1000 g water.

In some embodiments, a pressure, or a partial pressure, or any combination thereof may be greater than or equal to one or more or any combination of the following: 1 Bar, or 5 Bar, or 10 Bar, or 15 Bar, or 20 Bar, or 25 Bar, or 30 Bar, or 40 Bar, or 50 Bar, or 60 Bar, or 70 Bar, or 80 Bar, or 90 Bar, or 100 Bar, or 110 Bar, or 120 Bar, or 130 Bar, or 140 Bar, or 150 Bar, or 175 Bar, or 200 Bar, or 225 Bar, or 250 Bar, 300 Bar, or 350 Bar, or 400 Bar, or 450 Bar, or 500 Bar, or 600 Bar, or 700 Bar, or 800 Bar, or 900 Bar, or 1,000 Bar, or 1,500 Bar, or 2,000 Bar.

In some embodiments, a temperature may be, including, but not limited to, for example, less than, or equal to, or greater than one or more or any combination of the following: −100 degrees Celsius, or −90 degrees Celsius, or −80 degrees Celsius, or −70 degrees Celsius, or −60 degrees Celsius, or −50 degrees Celsius, or −40 degrees Celsius, or −30 degrees Celsius, or −20 degrees Celsius, or −18 degrees Celsius, or −16 degrees Celsius, or −14 degrees Celsius, or −12 degrees Celsius, or −10 degrees Celsius, or −8 degrees Celsius, or −6 degrees Celsius, or −4 degrees Celsius, or −2 degrees Celsius, or 0 degrees Celsius, or 2 degrees Celsius, or 4 degrees Celsius, or 6 degrees Celsius, or 8 degrees Celsius, or 10 degrees Celsius, or 12 degrees Celsius, or 14 degrees Celsius, or 16 degrees Celsius, or 18 degrees Celsius, or 20 degrees Celsius, or 22 degrees Celsius, or 24 degrees Celsius, or 26 degrees Celsius, or 28 degrees Celsius, or 30 degrees Celsius, or 32 degrees Celsius, or 34 degrees Celsius, or 36 degrees Celsius, or 38 degrees Celsius, or 40 degrees Celsius, or 42 degrees Celsius, or 44 degrees Celsius, or 46 degrees Celsius, or 48 degrees Celsius, or 50 degrees Celsius, or 52 degrees Celsius, or 54 degrees Celsius, or 56 degrees Celsius, or 58 degrees Celsius, or 60 degrees Celsius, or 62 degrees Celsius, or 64 degrees Celsius, or 66 degrees Celsius, or 68 degrees Celsius, or 70 degrees Celsius, or 72 degrees Celsius, or 74 degrees Celsius, or 76 degrees Celsius, or 78 degrees Celsius, or 80 degrees Celsius, or 82 degrees Celsius, or 84 degrees Celsius, or 86 degrees Celsius, or 88 degrees Celsius, or 90 degrees Celsius, or 92 degrees Celsius, or 94 degrees Celsius, or 96 degrees Celsius, or 98 degrees Celsius, or 100 degrees Celsius, or 102 degrees Celsius, or 104 degrees Celsius, or 106 degrees Celsius, or 108 degrees Celsius, or 110 degrees Celsius, or 112 degrees Celsius, or 114 degrees Celsius, or 116 degrees Celsius, or 118 degrees Celsius, or 120 degrees Celsius, or 122 degrees Celsius, or 124 degrees Celsius, or 126 degrees Celsius, or 128 degrees Celsius, or 130 degrees Celsius, or 132 degrees Celsius, or 134 degrees Celsius, or 136 degrees Celsius, or 138 degrees Celsius, or 140 degrees Celsius, or 142 degrees Celsius, or 144 degrees Celsius, or 146 degrees Celsius, or 148 degrees Celsius, or 150 degrees Celsius, or 160 degrees Celsius, or 170 degrees Celsius, or 180 degrees Celsius, or 190 degrees Celsius, or 200 degrees Celsius, or 210 degrees Celsius, or 220 degrees Celsius, or 230 degrees Celsius, or 240 degrees Celsius, or 250 degrees Celsius, or 260 degrees Celsius, or 270 degrees Celsius, or 280 degrees Celsius, or 290 degrees Celsius, or 300 degrees Celsius, or 310 degrees Celsius, or 320 degrees Celsius, or 330 degrees Celsius, or 340 degrees Celsius, or 350 degrees Celsius, or 360 degrees Celsius, or 370 degrees Celsius, or 380 degrees Celsius, or 390 degrees Celsius, or 400 degrees Celsius, or 410 degrees Celsius, or 420 degrees Celsius, or 430 degrees Celsius, or 440 degrees Celsius, or 450 degrees Celsius, or 460 degrees Celsius, or 470 degrees Celsius, or 480 degrees Celsius, or 490 degrees Celsius, or 500 degrees Celsius, or 510 degrees Celsius, or 520 degrees Celsius, or 530 degrees Celsius, or 540 degrees Celsius, or 550 degrees Celsius, or 560 degrees Celsius, or 570 degrees Celsius, or 580 degrees Celsius, or 590 degrees Celsius, or 600 degrees Celsius, or 610 degrees Celsius, or 620 degrees Celsius, or 630 degrees Celsius, or 640 degrees Celsius, or 650 degrees Celsius, or 660 degrees Celsius, or 670 degrees Celsius, or 680 degrees Celsius, or 690 degrees Celsius, or 700 degrees Celsius, or 710 degrees Celsius, or 720 degrees Celsius, or 730 degrees Celsius, or 740 degrees Celsius, or 750 degrees Celsius, or 760 degrees Celsius, or 770 degrees Celsius, or 780 degrees Celsius, or 790 degrees Celsius, or 800 degrees Celsius, or 810 degrees Celsius, or 820 degrees Celsius, or 830 degrees Celsius, or 840 degrees Celsius, or 850 degrees Celsius, or 860 degrees Celsius, or 870 degrees Celsius, or 880 degrees Celsius, or 890 degrees Celsius, or 900 degrees Celsius, or 910 degrees Celsius, or 920 degrees Celsius, or 930 degrees Celsius, or 940 degrees Celsius, or 950 degrees Celsius, or 960 degrees Celsius, or 970 degrees Celsius, or 980 degrees Celsius, or 990 degrees Celsius, or 1000 degrees Celsius, or 1010 degrees Celsius, or 1020 degrees Celsius, or 1030 degrees Celsius, or 1040 degrees Celsius, or 1050 degrees Celsius, or 1060 degrees Celsius, or 1070 degrees Celsius, or 1080 degrees Celsius, or 1090 degrees Celsius, or 1100 degrees Celsius, or 1110 degrees Celsius, or 1120 degrees Celsius, or 1130 degrees Celsius, or 1140 degrees Celsius, or 1150 degrees Celsius, or 1160 degrees Celsius, or 1170 degrees Celsius, or 1180 degrees Celsius, or 1190 degrees Celsius, or 1200 degrees Celsius, or 1210 degrees Celsius, or 1220 degrees Celsius, or 1230 degrees Celsius, or 1240 degrees Celsius, or 1250 degrees Celsius, or 1260 degrees Celsius, or 1270 degrees Celsius, or 1280 degrees Celsius, or 1290 degrees Celsius, or 1300 degrees Celsius, or 1310 degrees Celsius, or 1320 degrees Celsius, or 1330 degrees Celsius, or 1340 degrees Celsius, or 1350 degrees Celsius, or 1360 degrees Celsius, or 1370 degrees Celsius, or 1380 degrees Celsius, or 1390 degrees Celsius, or 1400 degrees Celsius, or 1410 degrees Celsius, or 1420 degrees Celsius, or 1430 degrees Celsius, or 1440 degrees Celsius, or 1450 degrees Celsius, or 1460 degrees Celsius, or 1470 degrees Celsius, or 1480 degrees Celsius, or 1490 degrees Celsius, or 1500 degrees Celsius, or 1600 degrees Celsius, or 1700 degrees Celsius, or 1800 degrees Celsius, or 1900 degrees Celsius, or 2000 degrees Celsius, or 2250 degrees Celsius, or 2500 degrees Celsius, or 2750 degrees Celsius, or 3000 degrees Celsius, or 4000 degrees Celsius, or 5000 degrees Celsius, or 6000 degrees Celsius, or 7000 degrees Celsius.

In some embodiments, a pH may be, including, but not limited to, for example, less than, or equal to, or greater than one or more or any combination of the following: pH of 0.1, or pH of 0.2, or pH of 0.3, or pH of 0.4, or pH of 0.5, or pH of 0.6, or pH of 0.7, or pH of 0.8, or pH of 0.9, or pH of 1.0, or pH of 1.1, or pH of 1.2, or pH of 1.3, or pH of 1.4, or pH of 1.5, or pH of 1.6, or pH of 1.7, or pH of 1.8, or pH of 1.9, or pH of 2.0, or pH of 2.1, or pH of 2.2, or pH of 2.3, or pH of 2.4, or pH of 2.5, or pH of 2.6, or pH of 2.7, or pH of 2.8, or pH of 2.9, or pH of 3.0, or pH of 3.1, or pH of 3.2, or pH of 3.3, or pH of 3.4, or pH of 3.5, or pH of 3.6, or pH of 3.7, or pH of 3.8, or pH of 3.9, or pH of 4.0, or pH of 4.1, or pH of 4.2, or pH of 4.3, or pH of 4.4, or pH of 4.5, or pH of 4.6, or pH of 4.7, or pH of 4.8, or pH of 4.9, or pH of 5.0, or pH of 5.1, or pH of 5.2, or pH of 5.3, or pH of 5.4, or pH of 5.5, or pH of 5.6, or pH of 5.7, or pH of 5.8, or pH of 5.9, or pH of 6.0, or pH of 6.1, or pH of 6.2, or pH of 6.3, or pH of 6.4, or pH of 6.5, or pH of 6.6, or pH of 6.7, or pH of 6.8, or pH of 6.9, or pH of 7.0, or pH of 7.1, or pH of 7.2, or pH of 7.3, or pH of 7.4, or pH of 7.5, or pH of 7.6, or pH of 7.7, or pH of 7.8, or pH of 7.9, or pH of 8.0, or pH of 8.1, or pH of 8.2, or pH of 8.3, or pH of 8.4, or pH of 8.5, or pH of 8.6, or pH of 8.7, or pH of 8.8, or pH of 8.9, or pH of 9.0, or pH of 9.1, or pH of 9.2, or pH of 9.3, or pH of 9.4, or pH of 9.5, or pH of 9.6, or pH of 9.7, or pH of 9.8, or pH of 9.9, or pH of 10.0, or pH of 10.1, or pH of 10.2, or pH of 10.3, or pH of 10.4, or pH of 10.5, or pH of 10.6, or pH of 10.7, or pH of 10.8, or pH of 10.9, or pH of 11.0, or pH of 11.1, or pH of 11.2, or pH of 11.3, or pH of 11.4, or pH of 11.5, or pH of 11.6, or pH of 11.7, or pH of 11.8, or pH of 11.9, or pH of 12.0, or pH of 12.1, or pH of 12.2, or pH of 12.3, or pH of 12.4, or pH of 12.5, or pH of 12.6, or pH of 12.7, or pH of 12.8, or pH of 12.9, or pH of 13.0, or pH of 13.1, or pH of 13.2, or pH of 13.3, or pH of 13.4, or pH of 13.5, or pH of 13.6, or pH of 13.7, or pH of 13.8, or pH of 13.9, or pH of 14.0, or pH of 14.1, or pH of 14.2, or pH of 14.3, or pH of 14.4, or pH of 14.5, or pH of 14.6, or pH of 14.7, or pH of 14.8, or pH of 14.9, or pH of 15.0

In some embodiments, a concentration, or molar concentration, or any combination thereof may be, including, but not limited to, for example, less than, or equal to, or greater than one or more or any combination of the following: 0.000001 M, or 0.00001 M, or 0.0001 M, or 0.0005 M, or 0.001 M, or 0.005 M, or 0.01 M, or 0.015 M, or 0.02 M, or 0.025 M, or 0.03 M, or 0.035 M, or 0.04 M, or 0.045 M, or 0.05 M, or 0.055 M, or 0.06 M, or 0.065 M, or 0.07 M, or 0.075 M, or 0.08 M, or 0.085 M, or 0.09 M, or 0.095 M, or 0.1 M, or 0.105 M, or 0.11 M, or 0.115 M, or 0.12 M, or 0.125 M, or 0.13 M, or 0.135 M, or 0.14 M, or 0.145 M, or 0.15 M, or 0.155 M, or 0.16 M, or 0.165 M, or 0.17 M, or 0.175 M, or 0.18 M, or 0.185 M, or 0.19 M, or 0.195 M, or 0.2 M, or 0.205 M, or 0.21 M, or 0.215 M, or 0.22 M, or 0.225 M, or 0.23 M, or 0.235 M, or 0.24 M, or 0.245 M, or 0.25 M, or 0.255 M, or 0.26 M, or 0.265 M, or 0.27 M, or 0.275 M, or 0.28 M, or 0.285 M, or 0.29 M, or 0.295 M, or 0.3 M, or 0.305 M, or 0.31 M, or 0.315 M, or 0.32 M, or 0.325 M, or 0.33 M, or 0.335 M, or 0.34 M, or 0.345 M, or 0.35 M, or 0.355 M, or 0.36 M, or 0.365 M, or 0.37 M, or 0.375 M, or 0.38 M, or 0.385 M, or 0.39 M, or 0.395 M, or 0.4 M, or 0.405 M, or 0.41 M, or 0.415 M, or 0.42 M, or 0.425 M, or 0.43 M, or 0.435 M, or 0.44 M, or 0.445 M, or 0.45 M, or 0.455 M, or 0.46 M, or 0.465 M, or 0.47 M, or 0.475 M, or 0.48 M, or 0.485 M, or 0.49 M, or 0.495 M, or 0.5 M, or 0.505 M, or 0.51 M, or 0.515 M, or 0.52 M, or 0.525 M, or 0.53 M, or 0.535 M, or 0.54 M, or 0.545 M, or 0.55 M, or 0.555 M, or 0.56 M, or 0.565 M, or 0.57 M, or 0.575 M, or 0.58 M, or 0.585 M, or 0.59 M, or 0.595 M, or 0.6 M, or 0.605 M, or 0.61 M, or 0.615 M, or 0.62 M, or 0.625 M, or 0.63 M, or 0.635 M, or 0.64 M, or 0.645 M, or 0.65 M, or 0.655 M, or 0.66 M, or 0.665 M, or 0.67 M, or 0.675 M, or 0.68 M, or 0.685 M, or 0.69 M, or 0.695 M, or 0.7 M, or 0.705 M, or 0.71 M, or 0.715 M, or 0.72 M, or 0.725 M, or 0.73 M, or 0.735 M, or 0.74 M, or 0.745 M, or 0.75 M, or 0.755 M, or 0.76 M, or 0.765 M, or 0.77 M, or 0.775 M, or 0.78 M, or 0.785 M, or 0.79 M, or 0.795 M, or 0.8 M, or 0.805 M, or 0.81 M, or 0.815 M, or 0.82 M, or 0.825 M, or 0.83 M, or 0.835 M, or 0.84 M, or 0.845 M, or 0.85 M, or 0.855 M, or 0.86 M, or 0.865 M, or 0.87 M, or 0.875 M, or 0.88 M, or 0.885 M, or 0.89 M, or 0.895 M, or 0.9 M, or 0.905 M, or 0.91 M, or 0.915 M, or 0.92 M, or 0.925 M, or 0.93 M, or 0.935 M, or 0.94 M, or 0.945 M, or 0.95 M, or 0.955 M, or 0.96 M, or 0.965 M, or 0.97 M, or 0.975 M, or 0.98 M, or 0.985 M, or 0.99 M, or 0.995 M, or 1.0 M, or 1.005 M, or 1.01 M, or 1.015 M, or 1.02 M, or 1.025 M, or 1.03 M, or 1.035 M, or 1.04 M, or 1.045 M, or 1.05 M, or 1.055 M, or 1.06 M, or 1.065 M, or 1.07 M, or 1.075 M, or 1.08 M, or 1.085 M, or 1.09 M, or 1.095 M, or 1.1 M, or 1.105 M, or 1.11 M, or 1.115 M, or 1.12 M, or 1.125 M, or 1.13 M, or 1.135 1.14 M, or 1.145 M, or 1.15 M, or 1.155 M, or 1.16 M, or 1.165 M, or 1.17 M, or 1.175 M, or 1.18 M, or 1.185 M, or 1.19 M, or 1.195 M, or 1.2 M, or 1.205

M, or 1.21 M, or 1.215 M, or 1.22 M, or 1.225 M, or 1.23 M, or 1.235 M, or 1.24 M, or 1.245 M, or 1.25 M, or 1.255 M, or 1.26 M, or 1.265 M, or 1.27 M, or 1.275 M, or 1.28 M, or 1.285 M, or 1.29 M, or 1.295 M, or 1.3 M, or 1.305 M, or 1.31 M, or 1.315 M, or 1.32 M, or 1.325 M, or 1.33 M, or 1.335 M, or 1.34 M, or 1.345 M, or 1.35 M, or 1.355 M, or 1.36 M, or 1.365 M, or 1.37 M, or 1.375 M, or 1.38 M, or 1.385 M, or 1.39 M, or 1.395 M, or 1.4 M, or 1.405 M, or 1.41 M, or 1.415 M, or 1.42 M, or 1.425 M, or 1.43 M, or 1.435 M, or 1.44 M, or 1.445 M, or 1.45 M, or 1.455 M, or 1.46 M, or 1.465 M, or 1.47 M, or 1.475 M, or 1.48 M, or 1.485 M, or 1.49 M, or 1.495 M, or 1.5 M, or 1.55 M, or 1.6 M, or 1.65 M, or 1.7 M, or 1.75 M, or 1.8 M, or 1.85 M, or 1.9 M, or 1.95 M, or 2.0 M, or 2.05 M, or 2.1 M, or 2.15 M, or 2.2 M, or 2.25 M, or 2.3 M, or 2.35 M, or 2.4 M, or 2.45 M, or 2.5 M, or 2.55 M, or 2.6 M, or 2.65 M, or 2.7 M, or 2.75 M, or 2.8 M, or 2.85 M, or 2.9 M, or 2.95 M, or 3.0 M, or 3.05 M, or 3.1 M, or 3.15 M, or 3.2 M, or 3.25 M, or 3.3 M, or 3.35 M, or 3.4 M, or 3.45 M, or 3.5 M, or 3.55 M, or 3.6 M, or 3.65 M, or 3.7 M, or 3.75 M, or 3.8 M, or 3.85 M, or 3.9 M, or 3.95 M, or 4.0 M, or 4.05 M, or 4.1 M, or 4.15 M, or 4.2 M, or 4.25 M, or 4.3 M, or 4.35 M, or 4.4 M, or 4.45 M, or 4.5 M, or 4.55 M, or 4.6 M, or 4.65 M, or 4.7 M, or 4.75 M, or 4.8 M, or 4.85 M, or 4.9 M, or 4.95 M, or 5.0 M, or 5.05 M, or 5.1 M, or 5.15 M, or 5.2 M, or 5.25 M, or 5.3 M, or 5.35 M, or 5.4 M, or 5.45 M, or 5.5 M, or 5.55 M, or 5.6 M, or 5.65 M, or 5.7 M, or 5.75 M, or 5.8 M, or 5.85 M, or 5.9 M, or 5.95 M, or 6.0 M, or 6.05 M, or 6.1 M, or 6.15 M, or 6.2 M, or 6.25 M, or 6.3 M, or 6.35 M, or 6.4 M, or 6.45 M, or 6.5 M, or 6.55 M, or 6.6 M, or 6.65 M, or 6.7 M, or 6.75 M, or 6.8 M, or 6.85 M, or 6.9 M, or 6.95 M, or 7.0 M, or 7.05 M, or 7.1 M, or 7.15 M, or 7.2 M, or 7.25 M, or 7.3 M, or 7.35 M, or 7.4 M, or 7.45 M, or 7.5 M, or 7.55 M, or 7.6 M, or 7.65 M, or 7.7 M, or 7.75 M, or 7.8 M, or 7.85 M, or 7.9 M, or 7.95 M, or 8.0 M, or 8.05 M, or 8.1 M, or 8.15 M, or 8.2 M, or 8.25 M, or 8.3 M, or 8.35 M, or 8.4 M, or 8.45 M, or 8.5 M, or 8.55 M, or 8.6 M, or 8.65 M, or 8.7 M, or 8.75 M, or 8.8 M, or 8.85 M, or 8.9 M, or 8.95 M, or 9.0 M, or 9.05 M, or 9.1 M, or 9.15 M, or 9.2 M, or 9.25 M, or 9.3 M, or 9.35 M, or 9.4 M, or 9.45 M, or 9.5 M, or 9.55 M, or 9.6 M, or 9.65 M, or 9.7 M, or 9.75 M, or 9.8 M, or 9.85 M, or 9.9 M, or 9.95 M, or 10.0 M, or 10.05 M, or 10.1 M, or 10.15 M, or 10.2 M, or 10.25 M, or 10.3 M, or 10.35 M, or 10.4 M, or 10.45 M, or 10.5 M, or 10.55 M, or 10.6 M, or 10.65 M, or 10.7 M, or 10.75 M, or 10.8 M, or 10.85 M, or 10.9 M, or 10.95 M, or 11.0 M, or 11.05 M, or 11.1 M, or 11.15 M, or 11.2 M, or 11.25 M, or 11.3 M, or 11.35 M, or 11.4 M, or 11.45 M, or 11.5 M, or 11.55 M, or 11.6 M, or 11.65 M, or 11.7 M, or 11.75 M, or 11.8 M, or 11.85 M, or 11.9 M, or 11.95 M, or 12.0 M, or 12.05 M, or 12.1 M, or 12.15 M, or 12.2 M, or 12.25 M, or 12.3 M, or 12.35 M, or 12.4 M, or 12.45 M, or 12.5 M, or 12.55 M, or 12.6 M, or 12.65 M, or 12.7 M, or 12.75 M, or 12.8 M, or 12.85 M, or 12.9 M, or 12.95 M, or 13.0 M, or 13.05 M, or 13.1 M, or 13.15 M, or 13.2 M, or 13.25 M, or 13.3 M, or 13.35 M, or 13.4 M, or 13.45 M, or 13.5 M, or 13.55 M, or 13.6 M, or 13.65 M, or 13.7 M, or 13.75 M, or 13.8 M, or 13.85 M, or 13.9 M, or 13.95 M, or 14.0 M, or 14.05 M, or 14.1 M, or 14.15 M, or 14.2 M, or 14.25 M, or 14.3 M, or 14.35 M, or 14.4 M, or 14.45 M, or 14.5 M, or 14.55 M, or 14.6 M, or 14.65 M, or 14.7 M, or 14.75 M, or 14.8 M, or 14.85 M, or 14.9 M, or 14.95 M, or 15.0 M, 15.5 M, or 16.0 M, or 16.5 M, or 17.0 M, or 17.5 M, or 18.0 M, or 18.5 M, or 19.0 M, or 19.5 M, or 20.0 M, or 20.5 M, or 21.0 M, or 21.5 M, or 22.0 M, or 22.5 M, or 23.0 M, or 23.5 M, or 24.0 M, or 24.5 M, or 25.0 M, or 25.5 M, or 26.0 M, or 26.5 M, or 27.0 M, or 27.5 M, or 28.0 M, or 28.5 M, or 29.0 M, or 29.5 M, or 30.0 M, or 30.5 M, or 31.0 M, or 31.5 M, or 32.0 M, or 32.5 M, or 33.0 M, or 33.5 M, or 34.0 M, or 34.5 M, or 35.0 M, or 35.5 M, or 36.0 M, or 36.5 M, or 37.0 M, or 37.5 M, or 38.0 M, or 38.5 M, or 39.0 M, or 39.5 M, or 40.0 M, or 40.5 M, or 41.0 M, or 41.5 M, or 42.0 M, or 42.5 M, or 43.0 M, or 43.5 M, or 44.0 M, or 44.5 M, or 45.0 M, or 45.5 M, or 46.0 M, or 46.5 M, or 47.0 M, or 47.5 M, or 48.0 M, or 48.5 M, or 49.0 M, or 49.5 M, or 50.0 M, or 50.5 M, or 51.0 M, or 51.5 M, or 52.0 M, or 52.5 M, or 53.0 M, or 53.5 M, or 54.0 M, or 54.5 M, or 55.0 M, or 55.5 M, or 56.0 M, or 56.5 M, or 57.0 M, or 57.5 M, or 58.0 M, or 58.5 M, or 59.0 M, or 59.5 M, or 60.0 M, or 60.5 M, or 61.0 M, or 61.5 M, or 62.0 M, or 62.5 M, or 63.0 M, or 63.5 M, or 64.0 M, or 64.5 M, or 65.0 M, or 65.5 M, or 66.0 M, or 66.5 M, or 67.0 M, or 67.5 M, or 68.0 M, or 68.5 M, or 69.0 M, or 69.5 M, or 70.0 M, or 70.5 M, or 71.0 M, or 71.5 M, or 72.0 M, or 72.5 M, or 73.0 M, or 73.5 M, or 74.0 M, or 74.5 M, or 75.0 M, or 75.5 M, or 76.0 M, or 76.5 M, or 77.0 M, or 77.5 M, or 78.0 M, or 78.5 M, or 79.0 M, or 79.5 M, or 80.0 M

In some embodiments, at least a portion of 2 $CH_3COOH$ may be separated from at least a portion of $Na_2SO_3$ by distillation or crystallization.

In some embodiments, at least a portion of 2 $CH_3COOH$ may be separated from at least a portion of $Na_2SO_3$. For example, said separation may comprise, including, but not limited to, one or more or any combination of the following: a membrane based process, or reverse osmosis, or nanofiltration, or distillation, or crystallization, or high pressure nanofiltration, or high pressure reverse osmosis, or membrane distillation, or mechanical vapor compression distillation, or MVC distillation, or MVC crystallization, or MED, or MSF, or crystallizer, or falling film crystallizer, or heat recovery distillation, or cryodesalination.

In some embodiments, at least a portion of $CO_2$ generated from a reaction may comprise, including, but not limited to, one or more or any combination of the following: captured $CO_2$, or high quality $CO_2$, or high pressure $CO_2$, or high partial pressure $CO_2$, or high purity $CO_2$, or low temperature $CO_2$, or low water vapor $CO_2$, or low cost to utilize or convert $CO_2$, or $CO_2$ which may be at a sufficient concentration to form sodium bicarbonate or ammonium bicarbonate or potassium bicarbonate, or $CO_2$ at a partial pressure greater than 1 Bar, or $CO_2$ at a partial pressure greater than 2 Bar, or any combination thereof.

In some embodiments, at least a portion of the $CO_2$ (g) produced may be reacted with at least a portion of the NaOH produced, to form, for example, sodium carbonate or sodium bicarbonate. For example, in some lithium-ion battery recycling applications, or lithium processing applications, or any combination thereof, sodium carbonate may be employed. For example, in some lithium-ion battery recycling applications, or lithium processing applications, or any combination thereof, sodium carbonate may be employed to produce lithium carbonate.

In some embodiments, the salt or solution comprising sodium produced or comprising a product from the reaction of sodium sulfate with a salt or solution comprising calcium may be treated or further treated to, for example, at least a portion of residual calcium sulfate, or impurities, or heavy metal impurities, or any combination thereof.

In some embodiments, sodium chloride from, for example, may comprise a byproduct or output. For example, sodium chloride output may comprise a lower concentration of impurities than, for example, a sodium sulfate waste input with heavy metal impurities, and/or, in some embodiments, may be more easily disposed of or used for other applications.

In some embodiments, Sodium or Na, or Potassium or K, or any combination thereof may be provided as an example alkali or alkali-like chemical. Other alkalis, or alkali-like chemicals, may be employed instead of or in addition to sodium or Na, and/or may include, but are not limited to, one or more or any combination of the following: lithium, or sodium, or potassium, or rubidium, or caesium, or ammonia, or ammonium, or ammonia derivatives, or Li, or Na, or K, or Rb, or Cs, or $NH_3$, or $NH_4^+$, or monovalent cations, or monovalent compounds.

In some embodiments, magnesium or calcium or any combination thereof may be provided as an example alkaline-earth or alkaline-earth like chemical. Other alkaline-earths or alkaline-earth like chemicals may be employed instead of or in addition to magnesium or calcium or any combination thereof, and/or may include, but are not limited to, one or more or any combination of the following: beryllium (Be), or magnesium (Mg), or calcium (Ca), or strontium (Sr), or barium (Ba), or radium (Ra), or amines, or divalent amines, or divalent cations.

In some embodiments, carbon dioxide or carbonate may be provided as an example anion or acid which may form practically insoluble or low solubility salts or compounds with some alkaline earths or alkaline earth like cations or alkaline earth like compounds, which may include, but are not limited to, one or more or any combination of the following: beryllium (Be), or magnesium (Mg), or calcium (Ca), or strontium (Sr), or barium (Ba), or radium (Ra), or amines, or divalent amines, or divalent cations. In some embodiments, carbon dioxide or carbonate may be provided as an example anion or acid which may form practically insoluble or low solubility salts or compounds with some alkaline earths or alkaline earth like cations or alkaline earth like compounds, and practically at least partially soluble salts with alkalis, or alkali like cations or chemicals, or any combination thereof. Other anions or acids may be employed instead of or in addition to carbon dioxide or carbonate, which may include, but are not limited to, one or more or any combination of the following: citric acid, or oxalates, or oxalic acid, or citrates, or hydrosulfurous acid, or sulfide, or sulfite, or sulfur dioxide, or sulfurous acid, or phosphoric acid, or phosphate, or fluorine derivatives, or phosphorous derivatives, or sulfur derivatives.

In some embodiments, acetic acid or formic acid may be provided as example acids. In some embodiments, acetic acid or formic acid may be provided as example carboxylic acids. In some embodiments, acetic acid or formic acid or acetate or formate may be provided as example acids or acid anions weaker than sulfurous acid and stronger than hydroxide, or carbonic acid, or any combination thereof. Other acids or acid anions with one or more or any combination of the aforementioned properties may be employed instead of or in addition to acetic acid or formic acid.

In some embodiments, concentrating or separating may comprise, for example, including, but is not limited to, one or more or any combination of the following: reverse osmosis, or electrodialysis, or nanofiltration, reverse osmosis or membrane based process, or distillation, or MVC, or MED, or MD, or cryodesalination, or high pressure reverse osmosis, or forward osmosis, or osmotically assisted reverse osmosis, or electrodialysis, or electrodialysis reversal, crystallization, crystallizer, or a separation process, or evaporation, or cryo-desalination, or cryo-separation, or freeze separation, or freeze desalination, or cooling crystallization, or salting-out, or solventing-out, or precipitation, or condensation, or sublimation, or deposition, one or more or any combination of separation systems or methods described herein, or one or more or any combination of separation systems or methods known in the art, or any combination thereof.

Carbon dioxide may be provided as an example weak acid derivative, or acid gas, or any combination thereof. Other weak acid derivatives, or acid gases, or any combination thereof may be employed instead of, or in addition to, carbon dioxide where carbon dioxide is described, and/or may include, but are not limited to, one or more or any combination of the following: hydrogen sulfide, or carbon dioxide, or carbonic acid, or hydrosulfurous acid, or mercaptan, or nitrogen dioxide, or sulfur dioxide, or silicon dioxide, or iron oxide, or metal oxide, or transition metal oxide, or aluminum oxide, or a weak acid derivative described herein, or a weak acid derivative described in the art, or an acid gas described herein, or an acid gas described in the art, or a derivative thereof, or any combination thereof.

Example Definitions for Some Embodiments

High Purity: High purity of a component may be defined as a volume percent or weight percent concentration which may be greater than or equal to one or more or any combination of the following: 20%, or 30%, or 40%, or 50%, or 55%, or 60%, or 65%, or 70%, or 75%, or 80%, or 85%, or 90%, or 95%, or 96%, or 97%, or 98%, or 99%, or 99.5%, or 99.9%, or 99.99%, or 99.999%.

High Purity of Carbon Dioxide: High purity of carbon dioxide may be defined as a volume percent or weight percent concentration greater than or equal to one or more or any combination of the following: 20%, or 30%, or 40%, or 50%, or 55%, or 60%, or 65%, or 70%, or 75%, or 80%, or 85%, or 90%, or 95%, or 96%, or 97%, or 98%, or 99%, or 99.5%, or 99.9%, or 99.99%, or 99.999%.

High Purity of Chlorine: High purity of carbon dioxide may be defined as a volume percent or weight percent concentration greater than or equal to one or more or any combination of the following: 20%, or 30%, or 40%, or 50%, or 55%, or 60%, or 65%, or 70%, or 75%, or 80%, or 85%, or 90%, or 95%, or 96%, or 97%, or 98%, or 99%, or 99.5%, or 99.9%, or 99.99%, or 99.999%.

High Concentration: High concentration of a component may be defined as a volume percent or weight percent concentration greater than or equal to one or more or any combination of the following: 0.001%, or 0.01%, or 0.1%, or 1%, or 5%, or 10%, or 15%, or 20%, or 25%, or 30%, or 35%, or 40%, or 45%, or 50%, or 55%, or 60%, or 65%, or 70%, or 75%, or 80%, or 85%, or 90%, or 95%, or 96%, or 97%, or 98%, or 99%, or 99.5%, or 99.9%, or 99.99%, or 99.999%.

High Concentration of Carbon Dioxide: High concentration of a carbon dioxide may be defined as a volume percent or weight percent concentration greater than or equal to one or more or any combination of the following: 0.001%, or 0.01%, or 0.1%, or 1%, or 5%, or 10%, or 15%, or 20%, or 25%, or 30%, or 35%, or 40%, or 45%, or 50%, or 55%, or 60%, or 65%, or 70%, or 75%, or 80%, or 85%, or 90%, or 95%, or 96%, or 97%, or 98%, or 99%, or 99.5%, or 99.9%, or 99.99%, or 99.999%.

High Concentration of Chlorine: High concentration of a carbon dioxide may be defined as a volume percent or weight percent concentration greater than or equal to one or more or any combination of the following: 0.001%, or 0.01%, or 0.1%, or 1%, or 5%, or 10%, or 15%, or 20%, or 25%, or 30%, or 35%, or 40%, or 45%, or 50%, or 55%, or 60%, or 65%, or 70%, or 75%, or 80%, or 85%, or 90%, or 95%, or 96%, or 97%, or 98%, or 99%, or 99.5%, or 99.9%, or 99.99%, or 99.999%.

High Partial Pressure: High partial pressure of a component may be defined as a partial pressure greater than or equal to one or more or any combination of the following: 0.01 Bar, or 0.05 Bar, or 0.1 Bar, or 0.25 Bar, or 0.5 Bar, or 0.75 Bar, or 1 Bar, or 2 Bar, or 3 Bar, or 4 Bar, or 5 Bar, or 6 Bar, or 7 Bar, or 8 Bar, or 9 Bar, or 10 Bar, or 15 Bar, or 20 Bar, or 30 Bar, or 40 Bar, or 50 Bar, or 60 Bar, or 70 Bar, or 80 Bar, or 90 Bar, or 100 Bar, or 110 Bar, or 120 Bar, or 130 Bar, or 140 Bar, or 150 Bar, or 175 Bar, or 200 Bar, or 225 Bar, or 250 Bar, or 275 Bar, or 300 Bar, or 325 Bar, or 350 Bar, or 375 Bar, or 400 Bar, or 425 Bar, or 450 Bar, or 475 Bar, or 500 Bar, or 600 Bar, or 700 Bar, or 800 Bar, or 900 Bar, or 1,000 Bar, or 1,250 Bar, or 1,500 Bar, or 1,750 Bar, or 2,000 Bar, or 2,500 Bar, or 3,000 Bar, or 3,500 Bar, or 4,000 Bar, or 4,500 Bar, or 5,000 Bar, or 7,500 Bar, or 10,000 Bar.

High Partial Pressure of Carbon Dioxide: High partial pressure of a component may be defined as a partial pressure greater than or equal to one or more or any combination of the following: 0.001 Bar, or 0.01 Bar, or 0.05 Bar, or 0.1 Bar, or 0.25 Bar, or 0.5 Bar, or 0.75 Bar, or 1 Bar, or 2 Bar, or 3 Bar, or 4 Bar, or 5 Bar, or 6 Bar, or 7 Bar, or 8 Bar, or 9 Bar, or 10 Bar, or 15 Bar, or 20 Bar, or 30 Bar, or 40 Bar, or 50 Bar, or 60 Bar, or 70 Bar, or 80 Bar, or 90 Bar, or 100 Bar, or 110 Bar, or 120 Bar, or 130 Bar, or 140 Bar, or 150 Bar, or 175 Bar, or 200 Bar, or 225 Bar, or 250 Bar, or 275 Bar, or 300 Bar, or 325 Bar, or 350 Bar, or 375 Bar, or 400 Bar, or 425 Bar, or 450 Bar, or 475 Bar, or 500 Bar, or 600 Bar, or 700 Bar, or 800 Bar, or 900 Bar, or 1,000 Bar, or 1,250 Bar, or 1,500 Bar, or 1,750 Bar, or 2,000 Bar, or 2,500 Bar, or 3,000 Bar, or 3,500 Bar, or 4,000 Bar, or 4,500 Bar, or 5,000 Bar, or 7,500 Bar, or 10,000 Bar.

High Partial Pressure of Chlorine: High partial pressure of a component may be defined as a partial pressure greater than or equal to one or more or any combination of the following: 0.001 Bar, or 0.01 Bar, or 0.05 Bar, or 0.1 Bar, or 0.25 Bar, or 0.5 Bar, or 0.75 Bar, or 1 Bar, or 2 Bar, or 3 Bar, or 4 Bar, or 5 Bar, or 6 Bar, or 7 Bar, or 8 Bar, or 9 Bar, or 10 Bar, or 15 Bar, or 20 Bar, or 30 Bar, or 40 Bar, or 50 Bar, or 60 Bar, or 70 Bar, or 80 Bar, or 90 Bar, or 100 Bar, or 110 Bar, or 120 Bar, or 130 Bar, or 140 Bar, or 150 Bar, or 175 Bar, or 200 Bar, or 225 Bar, or 250 Bar, or 275 Bar, or 300 Bar, or 325 Bar, or 350 Bar, or 375 Bar, or 400 Bar, or 425 Bar, or 450 Bar, or 475 Bar, or 500 Bar, or 600 Bar, or 700 Bar, or 800 Bar, or 900 Bar, or 1,000 Bar, or 1,250 Bar, or 1,500 Bar, or 1,750 Bar, or 2,000 Bar, or 2,500 Bar, or 3,000 Bar, or 3,500 Bar, or 4,000 Bar, or 4,500 Bar, or 5,000 Bar, or 7,500 Bar, or 10,000 Bar.

Note: Carbon dioxide may be provided as an example weak acid derivative, or acid gas, or any combination thereof. Other weak acid derivatives, or acid gases, or any combination thereof may be employed instead of, or in addition to, carbon dioxide where carbon dioxide is described, and/or may include, but are not limited to, one or more or any combination of the following: hydrogen sulfide, or carbon dioxide, or carbonic acid, or hydrosulfurous acid, or mercaptan, or nitrogen dioxide, or sulfur dioxide, or silicon dioxide, or iron oxide, or metal oxide, or transition metal oxide, or aluminum oxide, or a weak acid derivative described herein, or a weak acid derivative described in the art, or an acid gas described herein, or an acid gas described in the art, or a derivative thereof, or any combination thereof.

Note: In some embodiments, a parameter which is described as 'high', or 'higher', or 'high', or any combination thereof may be defined as being greater than a parameter which may be described as 'low', or 'lower', or 'lesser', or any combination thereof.

The invention claimed is:

1. A process comprising:

reacting a component comprising calcium carbonate, or calcium sulfide, or calcium hydroxide, or calcium oxide, or calcium weak acid, or any combination thereof with a component comprising a halogen to form a component comprising a calcium halide and a component comprising carbon dioxide, or hydrogen sulfide, or water, or any combination thereof;

reacting at least a portion of the component comprising the calcium halide with a component comprising an alkali sulfate to form a component comprising an alkali halide and a component comprising calcium sulfate; and electrochemically reacting at least a portion of the component comprising an alkali halide to form a component comprising an alkali hydroxide and a component comprising a halogen.

2. The process of claim 1 wherein the alkali comprises lithium (Li), or sodium (Na), or potassium (K), or rubidium (Rb), or cesium (Cs), or ammonia ($NH_3$), or an amine.

3. The process of claim 1 wherein the halogen comprises Fluorine (F), or Chlorine (Cl), or Bromine (Br), or Iodine (I), or Astatine (At).

4. The process of claim 1 wherein the halide in the calcium halide comprises Fluoride ($F^-$), Chloride ($Cl^-$), Bromide ($Br^-$), Iodide ($I^-$), Astatide ($At^-$).

5. The process of claim 1 wherein the electrochemically reacting comprises employing a membrane cell, or a diaphragm cell, or a mercury cell, or electrodialysis, or bipolar electrodialysis.

\* \* \* \* \*